United States Patent
Blixt

(10) Patent No.: US 12,505,052 B2
(45) Date of Patent: Dec. 23, 2025

(54) DATA PROCESSING SYSTEM

(71) Applicant: Telesis Innovation AB, Bålsta (SE)

(72) Inventor: Stefan Blixt, Bålsta (SE)

(73) Assignee: Telesis Innovation AB, Bålsta (SE)

( * ) Notice: Subject to any disclaimer, the term of this patent is extended or adjusted under 35 U.S.C. 154(b) by 0 days.

(21) Appl. No.: 18/259,071

(22) PCT Filed: Jun. 30, 2021

(86) PCT No.: PCT/SE2021/050659
§ 371 (c)(1),
(2) Date: Jun. 22, 2023

(87) PCT Pub. No.: WO2022/139649
PCT Pub. Date: Jun. 30, 2022

(65) Prior Publication Data
US 2025/0284658 A1    Sep. 11, 2025

Related U.S. Application Data

(60) Provisional application No. 63/130,089, filed on Dec. 23, 2020.

(51) Int. Cl.
*G06F 15/167* (2006.01)
*G06F 15/78* (2006.01)

(52) U.S. Cl.
CPC ........ *G06F 15/167* (2013.01); *G06F 15/7825* (2013.01); *G06F 15/7867* (2013.01)

(58) Field of Classification Search
CPC . G06F 15/167; G06F 15/7825; G06F 15/7867
(Continued)

(56) References Cited

U.S. PATENT DOCUMENTS

| | | |
|---|---|---|
| 5,287,470 A | 2/1994 | Simpson |
| 5,345,563 A | 9/1994 | Uihlein et al. |

(Continued)

FOREIGN PATENT DOCUMENTS

| | | |
|---|---|---|
| JP | 2009104521 A | 5/2009 |
| WO | 2017120270 A1 | 7/2017 |

OTHER PUBLICATIONS

Hassan, et al. "An Enhanced Network-on-chip Simulation for Cluster-based Routing", Procedia Computer Science vol. 94, 2016, pp. 410-417.

(Continued)

*Primary Examiner* — Wing F Chan
*Assistant Examiner* — Leon Y Tseng
(74) *Attorney, Agent, or Firm* — Renner, Otto, Boisselle & Sklar, LLP

(57) ABSTRACT

There is provided a data processing system comprising a control processor having access to memory, and a plurality of Processing Elements, PEs, organized in multiple processing clusters, each cluster comprising a multitude of said Processing Elements. The multiple processing clusters are arranged in a Network on Chip, NoC, connected, via a switch block, to the control processor, which is provided as a central hub, i.e. a root, for the Network on Chip, and the multiple processing clusters of Processing Elements being arranged at peripheral nodes, also being referred to as cluster nodes, of the Network on Chip. The Network on Chip is a network having multiple data channels connecting the switch block with the multiple processing clusters, with a point-to-point channel for each processing cluster. The multiple processing clusters are logically organized as an array with specific locations for the processing clusters in the array, and the switch block is configured for enabling (Continued)

exchange of data between processing clusters of neighboring locations in the array via the switch block.

17 Claims, 35 Drawing Sheets

(58) Field of Classification Search
USPC .......................................................... 709/213
See application file for complete search history.

(56) References Cited

U.S. PATENT DOCUMENTS

| | | | |
|---|---|---|---|
| 5,890,007 A | 3/1999 | Zinguuzi | |
| 6,018,782 A | 1/2000 | Hartmann | |
| 6,094,715 A * | 7/2000 | Wilkinson | G06F 9/30189 |
| | | | 712/E9.055 |
| 6,145,072 A | 11/2000 | Shams et al. | |
| 8,060,727 B2 | 11/2011 | Blixt | |
| 12,346,694 B2 * | 7/2025 | Gurram | G06F 9/30036 |
| 2003/0033490 A1 | 2/2003 | Gappisch et al. | |
| 2007/0159488 A1 | 7/2007 | Danskin et al. | |
| 2007/0283037 A1 | 12/2007 | Burns et al. | |
| 2008/0037650 A1 | 2/2008 | Stojancic et al. | |
| 2010/0091787 A1 | 4/2010 | Muff et al. | |
| 2010/0191814 A1 | 7/2010 | Heddes et al. | |
| 2011/0307459 A1 | 12/2011 | Jacob (Yaakov) | |
| 2012/0124324 A1 | 5/2012 | Park et al. | |
| 2012/0290815 A1 | 11/2012 | Takahashi | |
| 2014/0156907 A1 | 6/2014 | Palmer | |
| 2014/0310467 A1 | 10/2014 | Shalf et al. | |
| 2017/0078385 A1 | 3/2017 | Dress | |
| 2017/0116153 A1 | 4/2017 | Takada | |
| 2017/0147513 A1 | 5/2017 | Hilton et al. | |
| 2017/0153993 A1 | 6/2017 | Palmer et al. | |
| 2017/0220499 A1 * | 8/2017 | Gray | G06F 13/36 |
| 2017/0230447 A1 | 8/2017 | Harsha et al. | |
| 2017/0286329 A1 | 10/2017 | Fernando | |
| 2018/0232148 A1 | 8/2018 | Saeed | |
| 2019/0042245 A1 | 2/2019 | Toll et al. | |
| 2019/0138237 A1 | 5/2019 | Palmer | |
| 2019/0158427 A1 | 5/2019 | Harsha et al. | |
| 2019/0191814 A1 | 6/2019 | Stuempfig et al. | |
| 2019/0303328 A1 | 10/2019 | Balski et al. | |
| 2020/0201690 A1 | 6/2020 | Sankaralingam et al. | |
| 2020/0301865 A1 | 9/2020 | Davies | |

OTHER PUBLICATIONS

International Search Report and Written Opinion for corresponding Application No. PCT/SE2021/050659, issued on Sep. 30, 2021.
CAPUTA "Efficient High-Speed On-Chip Global Interconnects", Linköping Studies in Science and Technology, Dissertation No. 992, Linköping University 2006.

* cited by examiner

8/128 bit data conversion

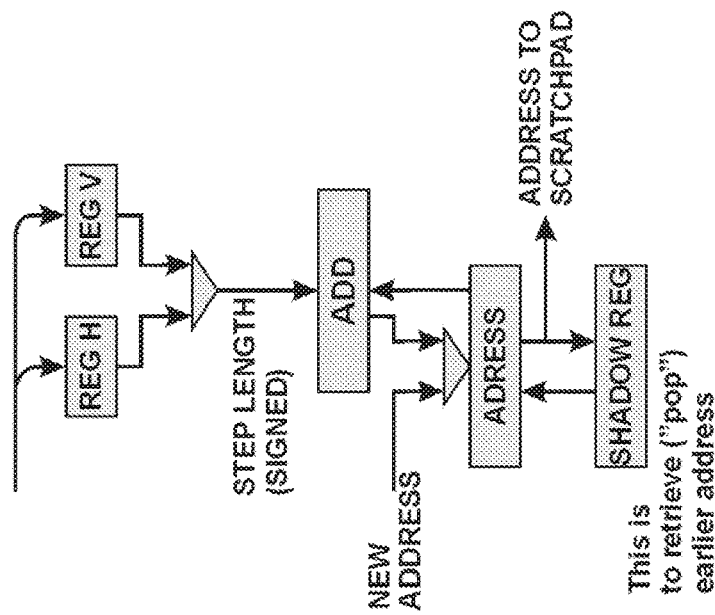
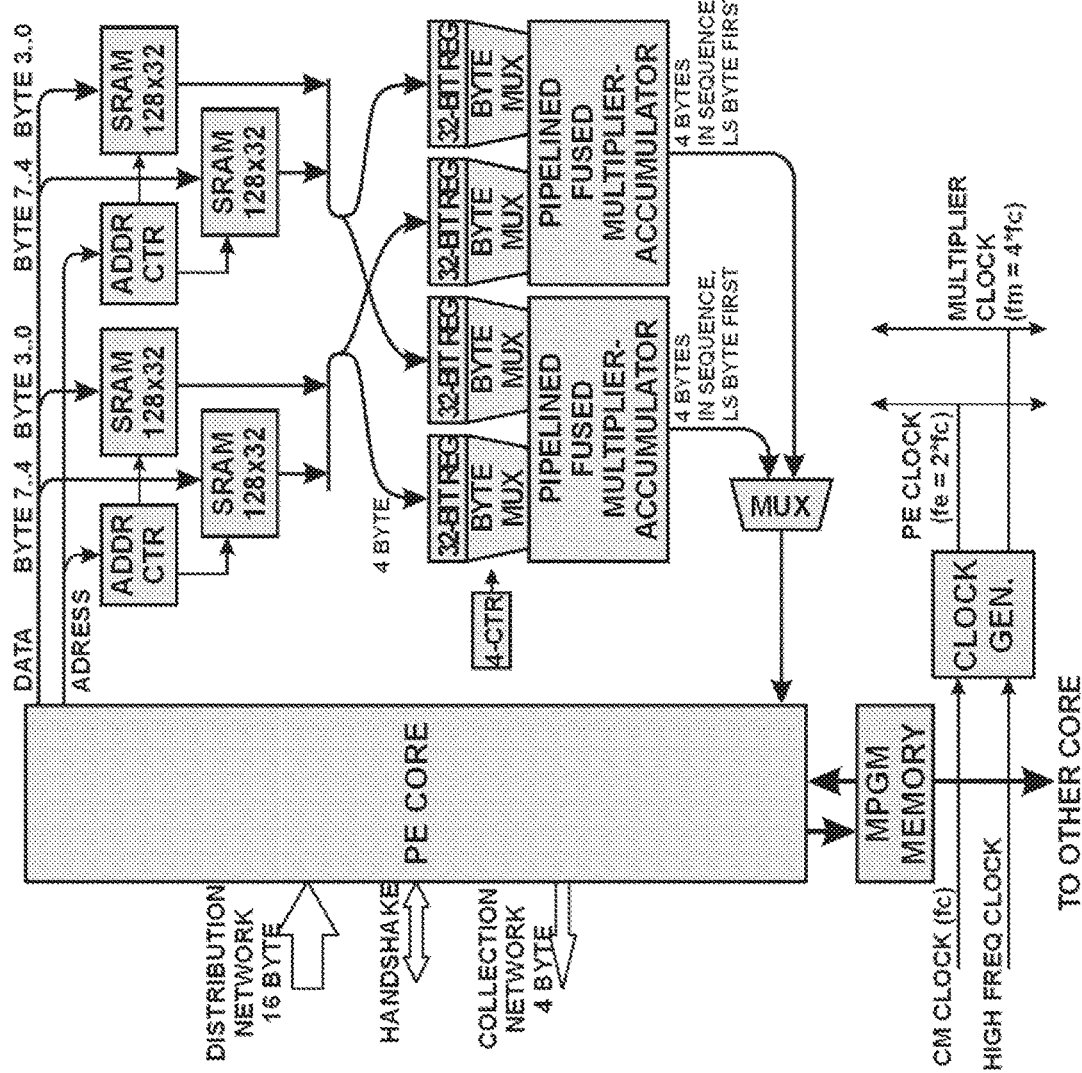
Fig. 16D

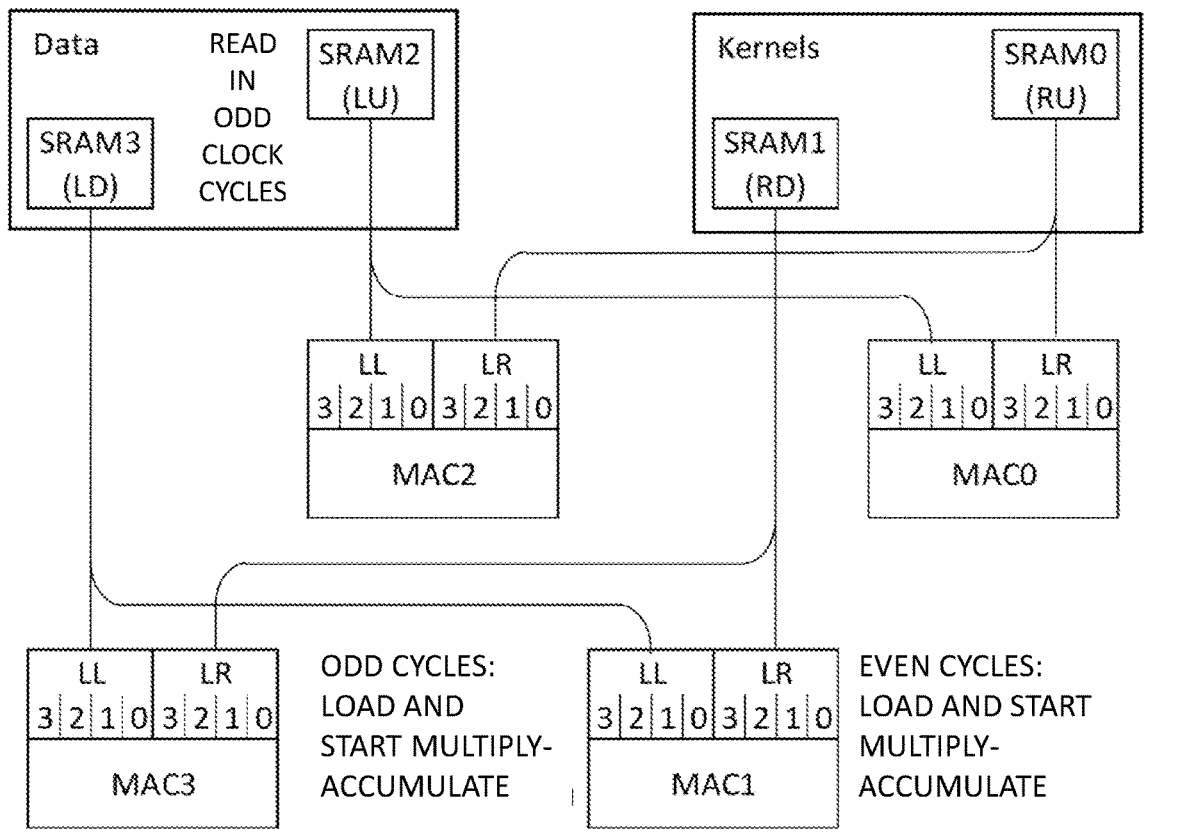
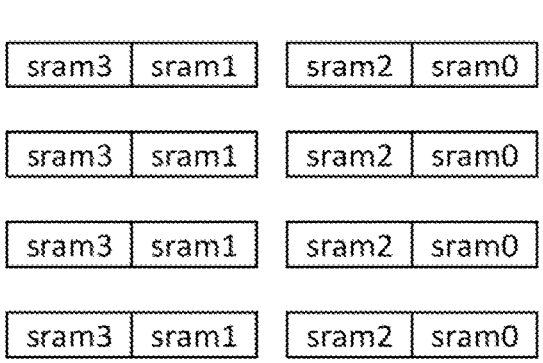
Fig. 17E

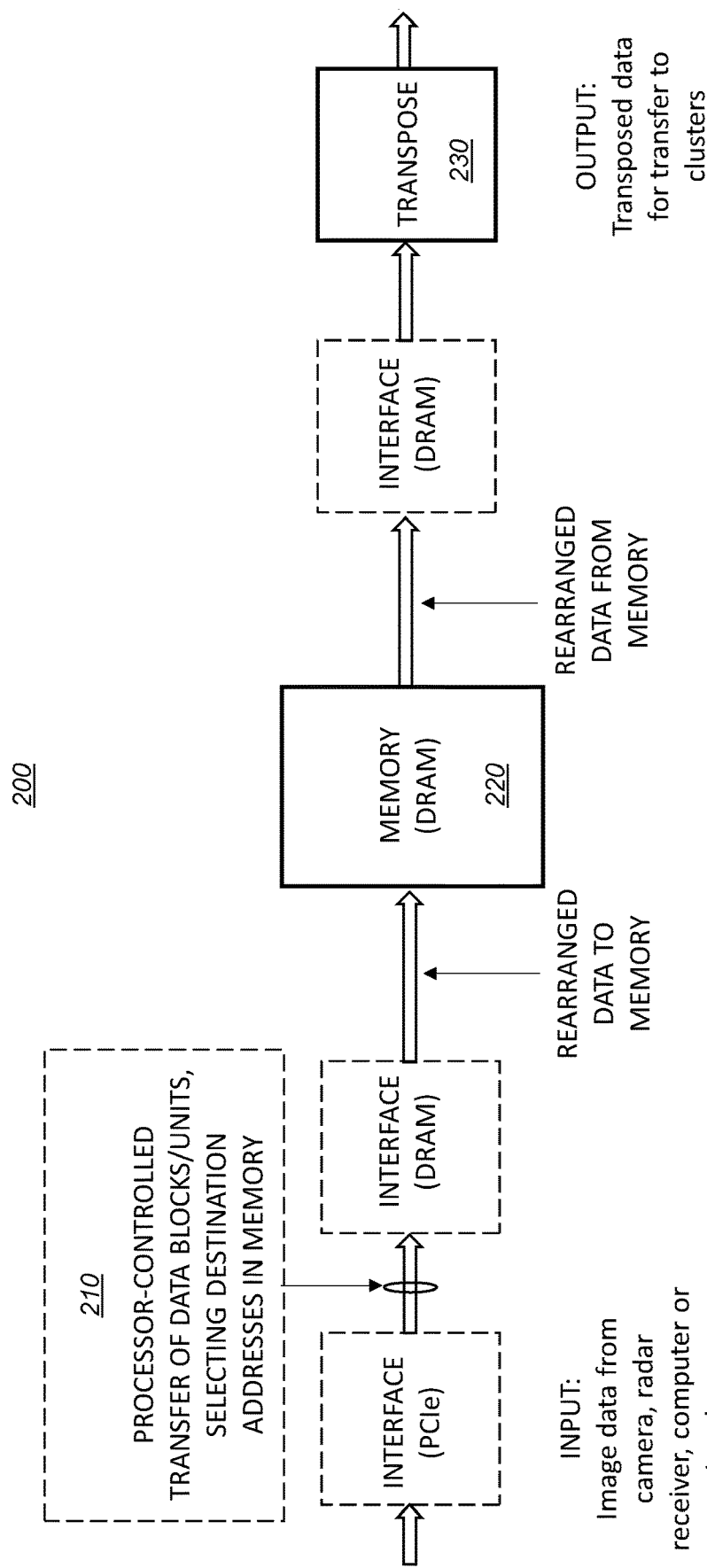

DATA PROCESSING SYSTEM

This application is a national phase of International Application No. PCT/SE2021/050659 filed Jun. 30, 2021, which claims priority to U.S. Application No. 63/130,089 filed Dec. 23, 2020, each of which is hereby incorporated herein by reference in its entirety.

TECHNICAL FIELD

The invention generally relates to computer science and hardware architectures, and more particularly to a novel data processing system and related procedures such as data processing, data storage, data transfer and code execution as well as related hardware improvements.

BACKGROUND

Among other things, the present disclosure concerns various innovative aspects of a novel data processing architecture or system, which may be especially useful for massive signal processing, image and/or video processing applications, radar applications, neural network implementations and/or other technical applications.

In computer science and engineering, the computer architecture defines the functionality, organization, and implementation of computer systems including processor capabilities and memory.

Typically, a processor is the logic circuitry that responds to and processes the instructions that drive a computer system. The processor, together with memory, is seen as the main and most crucial integrated circuitry (IC) chip in a computer, as it will perform most basic arithmetic, logic and I/O operations, as well as allocate commands for other chips and components running in a computer system.

In the following, a computer system or processor system will be used interchangeably with the expression data processing system, since the main overall purpose and application of any computer system is to perform data processing.

There is generally a continuous demand for improvements with respect to computer systems.

SUMMARY

It is a general object to provide improvements in computer science and for data processing systems.

It is a specific object to provide an improved data processing system.

According to a first aspect, there is provided a data processing system comprising a control processor having access to memory, and a plurality of Processing Elements, PEs, organized in multiple processing clusters, each cluster comprising a multitude of said Processing Elements. The multiple processing clusters are arranged in a Network on Chip, NoC, connected, via a switch block, to the control processor, which is provided as a central hub, i.e. a root, for the Network on Chip, and the multiple processing clusters of Processing Elements are arranged at peripheral nodes, also being referred to as cluster nodes, of the Network on Chip. The Network on Chip is a network having multiple data channels connecting the switch block with the multiple processing clusters, with a point-to-point channel for each processing cluster. The multiple processing clusters are logically organized as an array with specific locations for the processing clusters in the array, and the switch block is configured for enabling exchange of data between processing clusters of neighboring locations in the array via the switch block.

In this way, it is, for example, possible to build the data processing system based on a so-called star-shaped NoC, where each node in the network has its own connection to the switch block, while still being able to manage communication and data exchange between neighbouring nodes just as effectively as for a mesh network.

The proposed data processing system is generally applicable and useful for data processing in a wide variety of technical applications.

Other advantages of the invention will be appreciated when reading the below detailed description.

BRIEF DESCRIPTION OF DRAWINGS

The invention, together with further objects and advantages thereof, may best be understood by making reference to the following description taken together with the accompanying drawings, in which:

FIG. 16D is a schematic block diagram illustrating an example of a PE core, focusing on the new so-called vector engine, with two MAC blocks, and also the details of the address counters used.

Figures 17A, 17B, 17C, 17D:
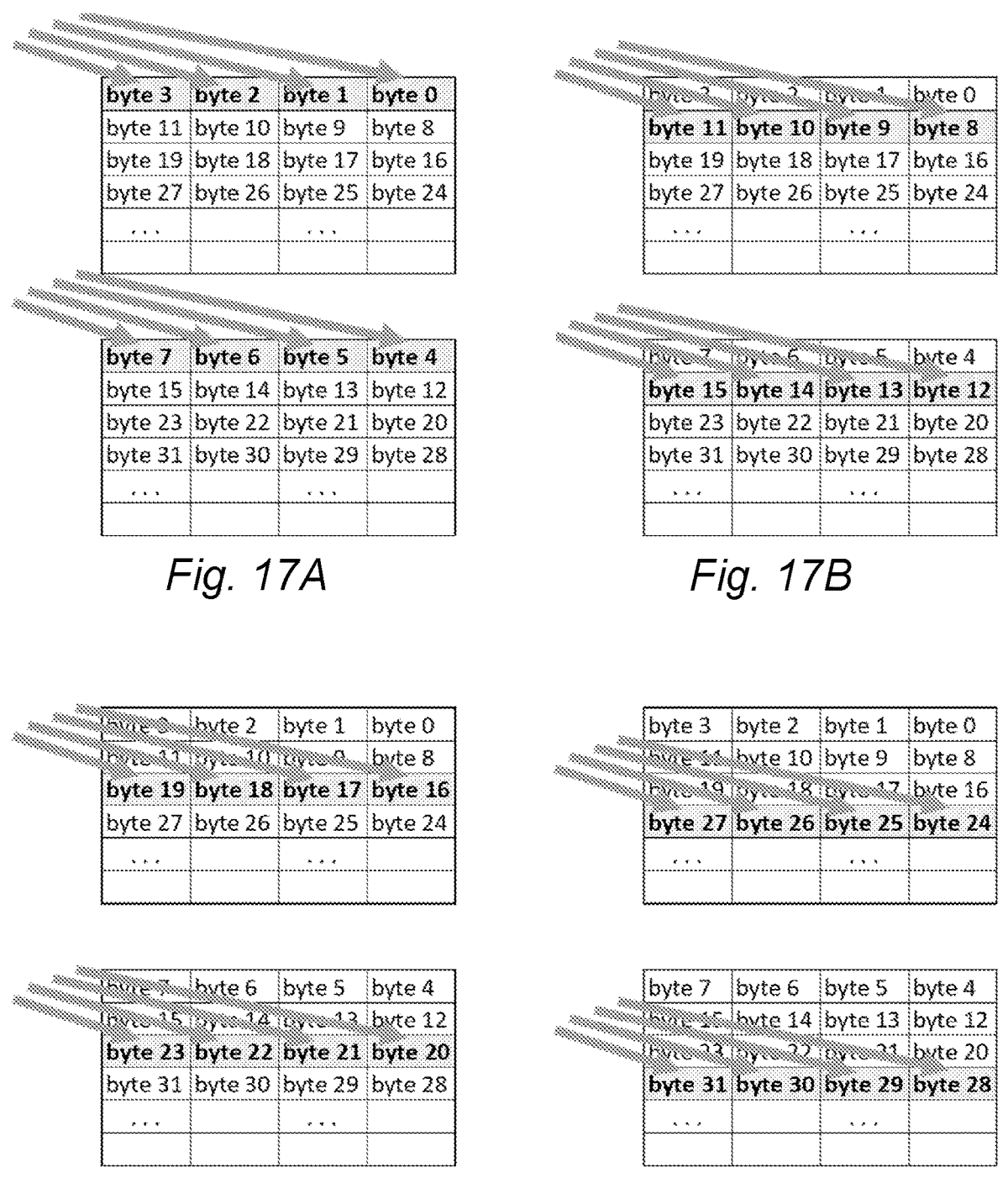

FIG. 17A-D are schematic diagrams illustrating an example of how a new pair of bytes is transferred from scratchpad to MAC unit for each MAC cycle.

FIG. 17E is a schematic diagram illustrating an example of reading from local data buffers for the multiplication phase of the MAC units.

FIG. 30 is a schematic block diagram illustrating an example of the rearrangement and transposing of an incoming image into transposed output data for transfer to the clusters.

DETAILED DESCRIPTION

Figure 1A:
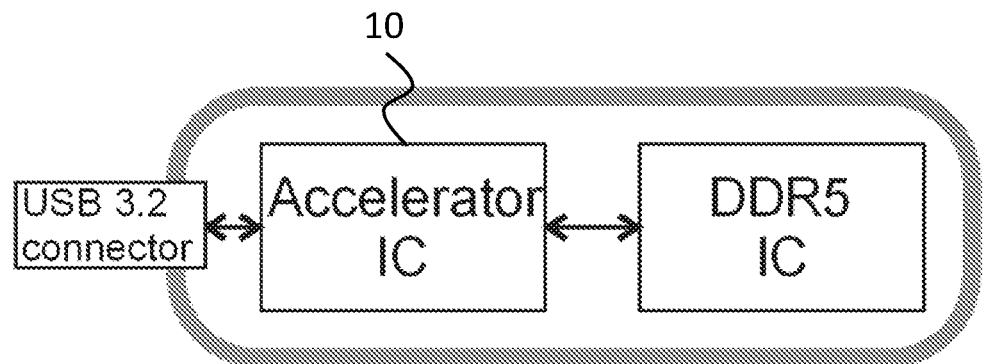
FIG. 1A is a schematic diagram illustrating an example of a system including an accelerator according to an embodiment.

In the following, non-limiting examples of these various aspects will be described with reference to illustrative figures of example embodiments.

When referring to specific numbers (e.g. data size, number of elements, processing speed, clock frequency and so forth), these numbers should normally be interpreted as merely non-limiting examples intended to provide an intuitive, technical understanding from a practical point of view.

According to a first aspect, there is provided a data processing system comprising a control processor having access to memory, and a plurality of Processing Elements, PEs, organized in multiple processing clusters, each cluster comprising a multitude of said Processing Elements. The multiple processing clusters are arranged in a Network on Chip, NoC, connected, via a switch block, to the control processor, which is provided as a central hub, i.e. a root, for the Network on Chip, and the multiple processing clusters of Processing Elements are arranged at peripheral nodes, also being referred to as cluster nodes, of the Network on Chip. The Network on Chip is a network having multiple data channels connecting the switch block with the multiple processing clusters, with a point-to-point channel for each processing cluster. The multiple processing clusters are logically organized as an array with specific locations for the processing clusters in the array, and the switch block is configured for enabling exchange of data between processing clusters of neighboring locations in the array via the switch block.

In this way, it is, for example, possible to build the data processing system based on a so-called star-shaped NoC, where each node in the network has its own connection to the switch block, while still being able to manage communication and data exchange between neighbouring nodes just as effectively as for a mesh network.

By way of example, the multiple processing clusters may be logically organized to have specific locations in an array with rows and columns, and the switch block may be configured for enabling i) each cluster node to send to its nearest neighbor to the right and receive from its nearest neighbor to the left in the array of columns and rows, or vice versa (enabling each cluster node to send to its nearest neighbor to the left and receive from its nearest neighbor to the right in the array of columns and rows) and/or ii) each cluster node to send to its nearest neighbor below and receive from its nearest neighbor above in the array of columns and rows, or vice versa (enabling each cluster node to send to its nearest neighbor above and receive from its nearest neighbor below in the array of columns and rows).

Normally, the data is not transferred directly between cluster nodes, but via the switch block, e.g. from a cluster node back to a memory at the root or an associated NoC register, and then from the root memory or the associated NoC register to another cluster node.

The control processor at the root has access to memory, and this may include one or more memories such as root memory, ROM, RAM, buffers, registers and so forth, either directly or via one or more buses and/or interfaces.

In a particular example, the data processing system is configured for receiving and performing data processing of input data, and the multiple processing clusters are configured for operating on respective subsets or regions of said input data, one region per processing cluster. The data processing of the input data may involve sharing specific data between neighboring regions, and the switch block may be configured for enabling transfer of the specific data between the processing clusters responsible for the neighboring regions.

For example, the specific data may include a specific subset of the input data of one region to be shared (for processing) with at least one neighboring region.

As an example, the specific data may be overlapping edge data between regions needed for performing multi-dimensional convolutions.

By way of example, the input data may be related to an input image, which is logically partitioned into a plurality of uniform regions, one region per processing cluster for processing by the respective processing cluster.

In a particular example, the switch block may be configured to operate based on at least a subset of the following data transfer settings:

first setting—normal setting;
second setting—move to next region in positive x direction if outbound, else opposite, or move to next region in negative x direction if outbound, else opposite; and
third setting—move to next region in negative y direction if outbound, else opposite, or move to next region in positive y direction if outbound, else opposite.

For example, the processing clusters may be configured to send data to memory and/or an associated NoC register (at the root) via the switch using the normal setting, and the switch block may be configured to activate the second setting and/or third setting such that data is transferred back through the switch block to desired destinations.

By way of example, the Network on Chip may be a so-called star network connecting the switch block with the processing clusters, with a point-to-point channel for each processing cluster.

In an optional embodiment, the control processor may be configured to control transfers of data between the root and the clusters of the Network on Chip.

Typically, the data processing system further includes a data bus interconnecting the control processor, memory, the Network on Chip and/or one or more Input/Output (I/O) interfaces.

For example, the switch block may include a multitude of switches and control logic for controlling the multitude of switches to support a set of different transfer modes over the data channels of the Network on Chip.

By way of example, the data processing system may include an NoC register for temporarily holding data to be distributed to the processing clusters via the switch block, and for holding data from the processing clusters.

In a particular example, the NoC register is connected between i) the switch block and ii) a data bus for interconnection to the control processor, memory, and/or one or more Input/Output (I/O) interfaces to enable data to be stored in the NoC register from any of the control processor, memory, and/or one or more Input/Output (I/O) interfaces and to enable data to be transferred from the NoC register to any of the control processor, memory, and/or one or more Input/Output (I/O) interfaces.

For example, the Processing Elements may be programmable processing elements, the functionality of each programmable Processing Element being defined by internal microcode in a microprogram memory associated with the Processing Element.

In a specific, non-limiting example, the switch block may be configured for enabling a hypercube type of data exchange between processing clusters of neighboring locations in said array.

For example, the switch block may be configured to operate based on a number of data transfer settings such that a processing cluster is able to receive data from multiple neighbours in a multi-dimensional hypercube.

The proposed technology is generally applicable and useful for data processing in a wide variety of technical applications. The proposed technology may be applied in the context of many different types of data processing systems having multiple processing elements arranged in one or more clusters. In the following, non-limiting examples of such data processing systems will be described.

Figure 31:
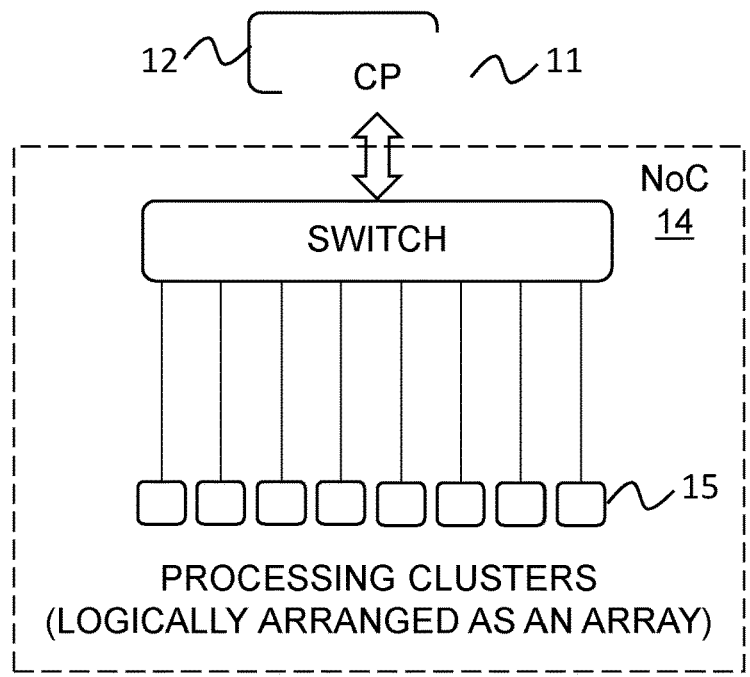
FIG. 31 is a schematic diagram illustrating an example of a data processing system according to an embodiment.

FIG. 31 is a schematic diagram illustrating an example of a data processing system according to an embodiment.

The data processing system comprises a control processor 11 having access to memory 12, and a plurality of Processing Elements, PEs, organized in multiple processing clusters 15, each cluster (15) comprising a multitude of said Processing Elements. The multiple processing clusters 15 are arranged in a Network on Chip, NoC, (14) connected, via a switch block, to the control processor 11, which is provided as a central hub, i.e. a root, for the Network on Chip, and the multiple processing clusters 15 of Processing Elements being arranged at peripheral nodes, also being referred to as cluster nodes, of the Network on Chip. The Network on Chip 14 is here a network having multiple data channels connecting the switch block with the multiple processing clusters 15, with a point-to-point channel for each processing cluster. The multiple processing clusters 15 are logically organized as an array with specific locations for the processing clusters in the array, and the switch block is configured for enabling exchange of data between processing clusters of neighboring locations in the array via the switch block.

By way of example, the data processing architecture or system may be regarded as a hardware machine, herein referred to as a data flow accelerator or simply an accelerator, comprising different processors, as will be explained in more detail later on. Sometimes, such a system is referred to as a multi-core data flow machine. Examples of the overall architecture as well as the interworking of the different processors, the data flows and the configuration for supporting and/or controlling such data flows through the system and the associated compiler and firmware will be described and illustrated.

For a better understanding it may be useful to begin with a brief overview of some example applications for such a hardware accelerator.

As mentioned, the accelerator may be used for artificial intelligence, e.g. for implementation of Convolutional Neural Networks (CNNs), but also for massive digital signal processing, e.g. for radar applications, as well as other types of data flow processing.

In radar applications, including automotive radar, the radar data extractor may benefit from using an accelerator system that can do millions of multiply/add operations per microsecond. The principle used for a radar data extractor may also be used for sonar and/or lidar. The processing is normally dominated by the Fast Fourier Transform (FFT), and may include range finding FFT, Doppler FFT, Constant False Alarm Rate (CFAR) filtering, azimuth angle estimation and/or elevation angle estimation.

Another application is beamforming for Massive MIMO antenna arrays. Digital complex-value ("I/Q") signals to/from elements of antenna array can be phase-shifted by multiplication by complex-value "twiddle factors". Like the different time delays for different light paths through a lens or prism, these phase shifts by properly selected constants can create beams in different directions. By adding signals having different sets of phase shifts, several beams can exist simultaneously (superposition principle). A high frequency of many multiplications is needed, which is suitable for an array of small processors.

There is a wide variety of systems and/or devices that can be built with the proposed hardware accelerator technology, some examples of which will be given herein.

For example, particular types of memories, interfaces, connections and/or other circuits may be mentioned herein, but it should be understood that the proposed technology is generally not limited thereto, but rather generally applicable.

FIG. 1A is a schematic illustration of an example of a system such as a USB pod basically comprising an Integrated Circuit (IC) of the accelerator 10 and a standard Double Data Rate (DDR) memory circuit.

Figure 1B:
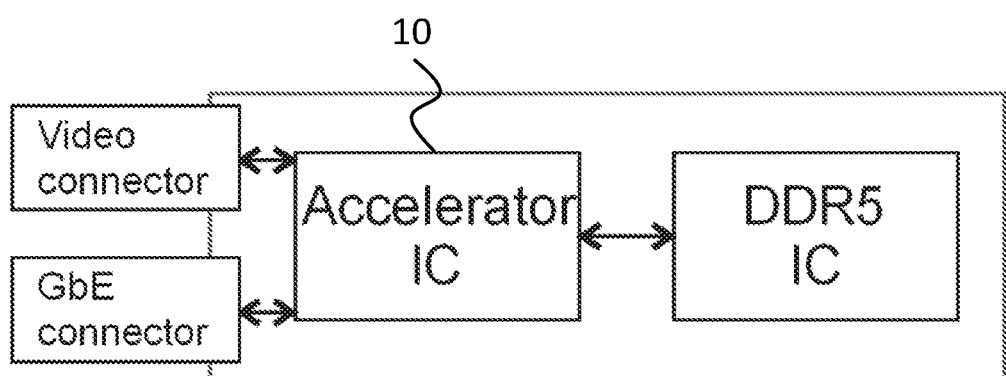
FIG. 1B is a schematic diagram illustrating another example of a system including an accelerator according to an embodiment.

FIG. 1B is a schematic illustration of an example of a similar system as that of FIG. 1A, but adapted for video and/or Gigabit Ethernet (GbE) connection. By way of example, this can be used for building a compact system suitable, e.g. for an intelligent automotive sensor with massive signal processing and convolutional neural network and communication through Gigabit Ethernet with timestamping. This system should also be able to work with massive signal processing (e.g. FFT-based signal processing) and neural network technology simultaneously.

Figure 1C:
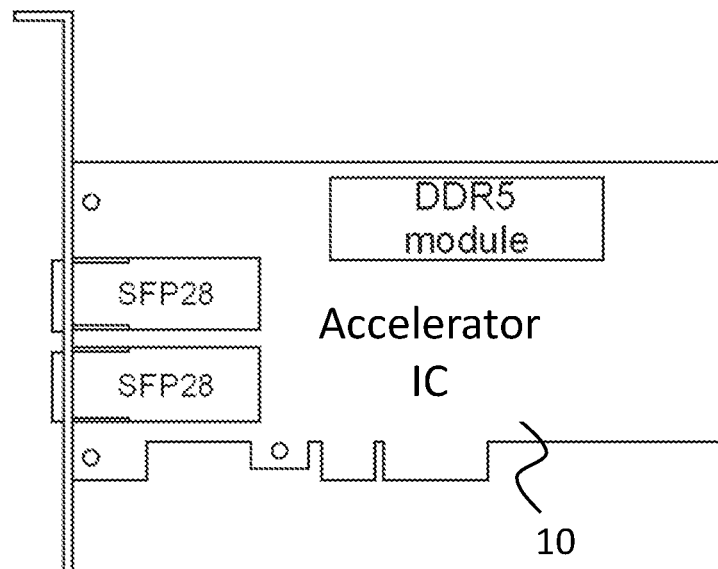
FIG. 1C is a schematic diagram illustrating yet another example of a system including an accelerator according to an embodiment.

FIG. 1C is a schematic illustration of an example of a Peripheral Component Interconnect express (PCIe) board with a DDR module and the accelerator 10, e.g. with image input/output and additional storage via a host computer PCIe slot. For example, this could be useful in a workstation for pathology image analysis, where the board would also do JPEG2000 decompression and generate very high-resolution annotated display images. As an example, it may have its own 25G/100G Ethernet connections to image databases.

Figure 1D:
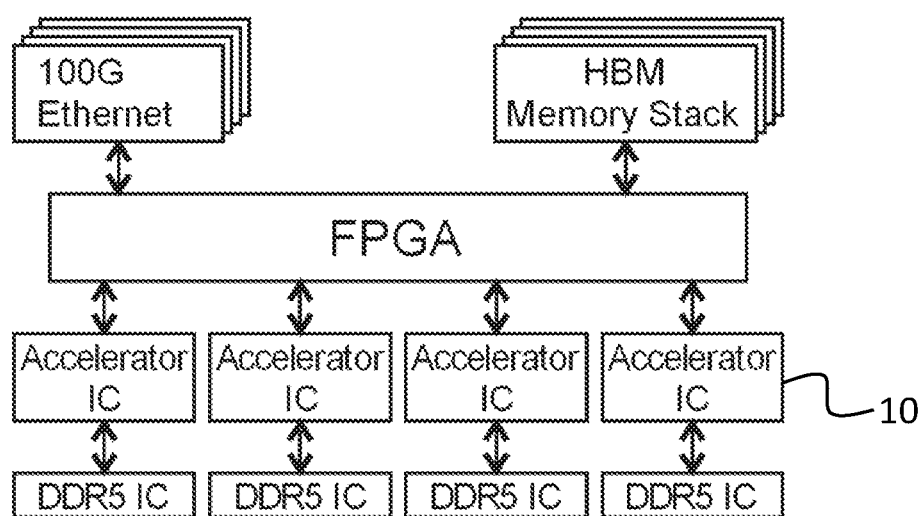
FIG. 1D is a schematic diagram illustrating an example of a system based on a hierarchical tree network of several accelerators according to an embodiment.

FIG. 1D is a schematic illustration of an example of a high-performance system for use as or in a datacenter, with a hierarchical tree network of several accelerator ICs 10. For example, at the root, this tree may have High Bandwidth Memory (HBM) and/or Remote direct memory access over Converged Ethernet (ROCE).

Figure 2:
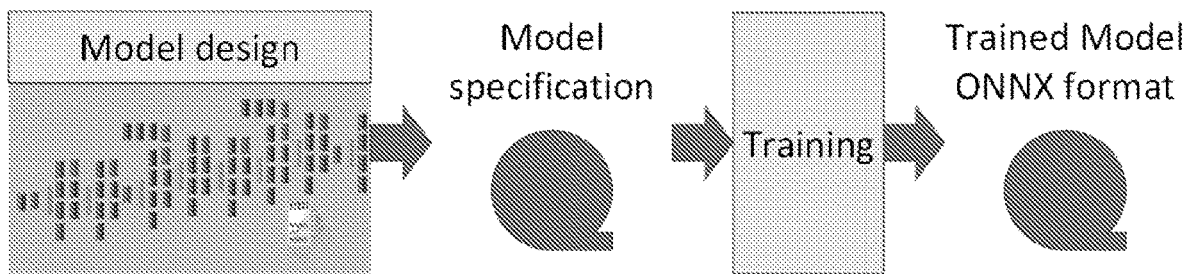
FIG. 2 is a schematic illustration of an example of creating a trained model using neural networks.

FIG. 2 is a schematic illustration of an example of creating a trained model using neural networks such as CNNs. By way of example, the accelerator may be used as a computer peripheral for neural network training, although it is primarily targeted for inference (which on the other hand may also be seen as part of the neural network training loop).

Figure 3:
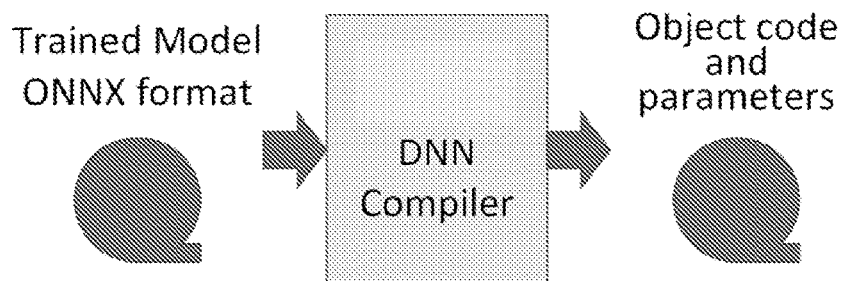
FIG. 3 is a schematic illustration of an example of using a compiler for compiling the model.

FIG. 3 is a schematic illustration of an example of using a compiler for compiling the model. For example, the compiler may be seen a computer program, which can be offered as a service; Complier as a Service (CaaS).

Figure 4:
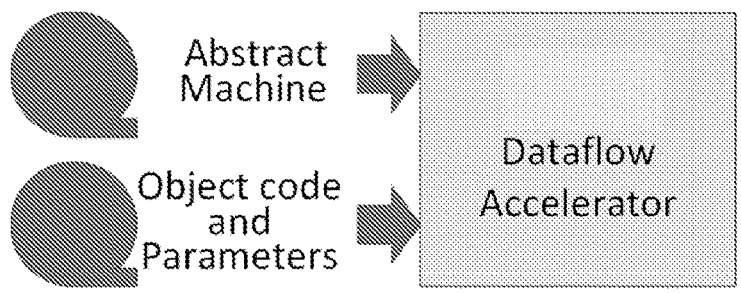
FIG. 4 is a schematic illustration of an example of loading the model into the accelerator.

FIG. 4 is a schematic illustration of an example of loading the model into the accelerator. For example, after loading its system software, including an abstract machine, the accelerator may load the object code into an on-chip primary memory and model parameter files into off-chip secondary memory (e.g. DDR or HBM).

Figure 5:
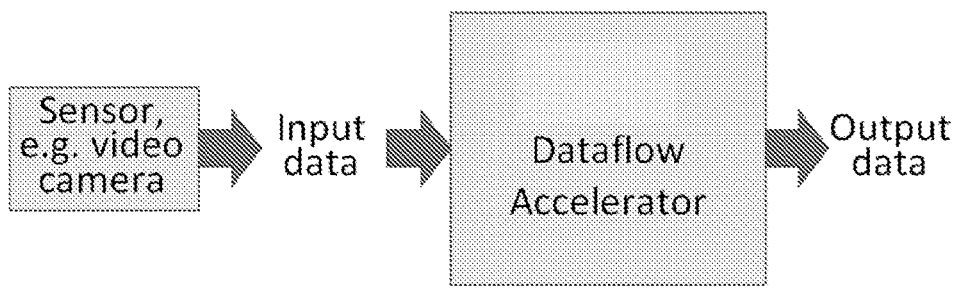
FIG. 5 is a schematic illustration of an example of running or executing the model in the accelerator based on input data to produce resulting output data.

FIG. 5 is a schematic illustration of an example of running or executing the model in the accelerator based on, e.g. sensor data as input to produce relevant output data. As an example, the input data can come from an automotive video camera or radar, but alternatively the data source can be, e.g., high resolution pathology images for cancer diagnostics. For example, high-resolution display driving can be integrated with the accelerator at low extra cost.

As mentioned, the overall accelerator may, by way of example, be a hardware machine, comprising at least two kinds of programmable processors. One is a General-Purpose Processor (GPP), at the root, and another is a programmable processor unit used in each of the many Processing Elements (PE), which are normally organized in clusters. The detailed functionality of both of these processor types—e.g. the instruction set of the GPP and the high-speed computation in the PEs—may be defined by internal microcode, which we call firmware.

Figure 6A:
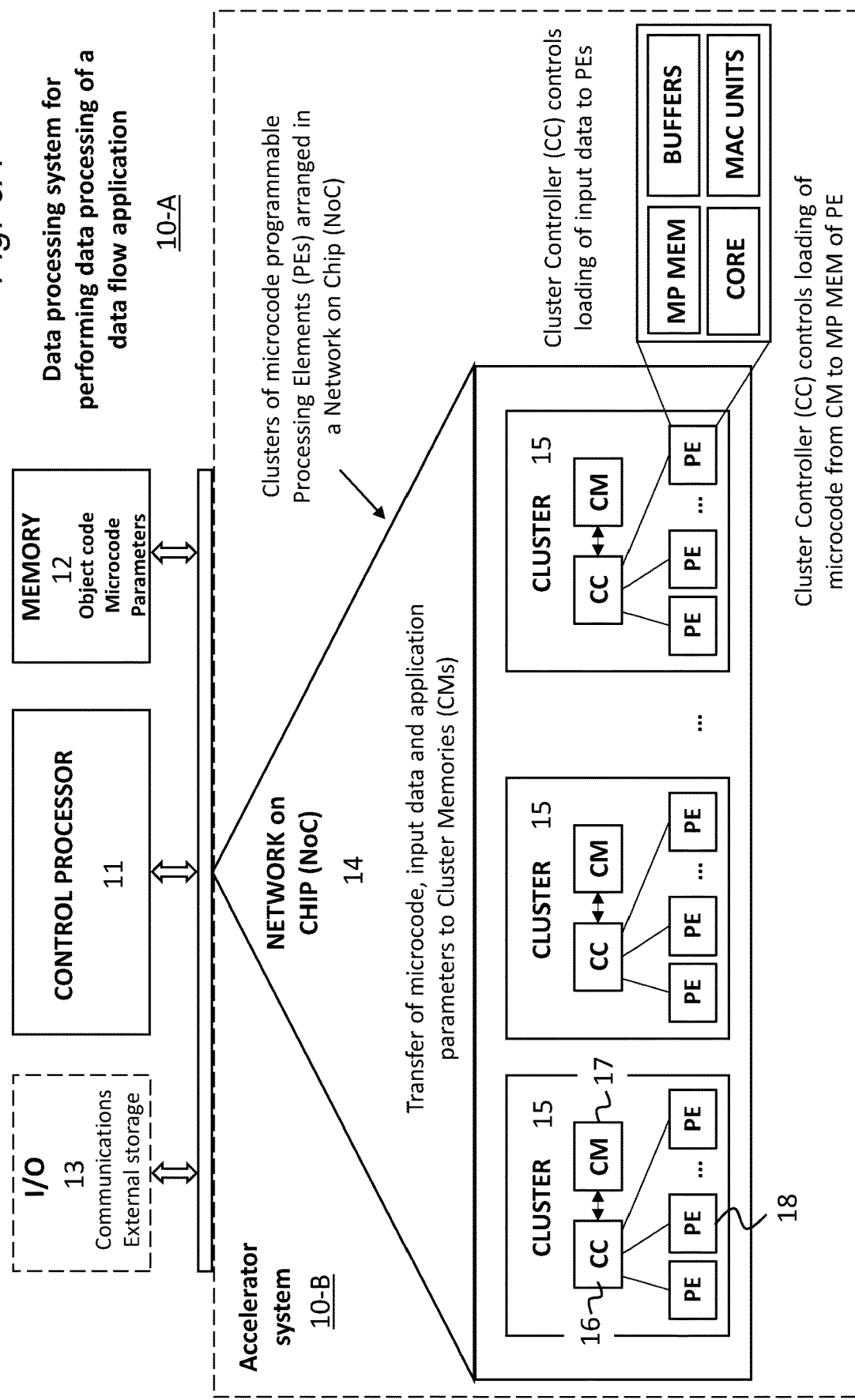
FIG. 6A is a schematic diagram illustrating an example of a data processing system and/or accelerator system.

FIG. 6A is a schematic diagram illustrating an example of a particular, non-limiting example data processing system and/or accelerator system.

The data processing system 10; 10-A is configured to perform data processing of a data flow application. In this example, the data processing system 10; 10-A includes:
 a control processor 11 having access to memory 12; and
 a plurality of programmable Processing Elements (PEs) 18 organized in multiple clusters 15, each cluster 15 comprising a multitude, i.e. at least two, of said programmable PEs 18, the functionality of each programmable Processing Element 18 being defined by internal microcode in a microprogram memory (MP MEM) associated with the Processing Element.

The multiple clusters 15 of programmable Processing Elements 18 may be arranged in a Network on Chip (NoC) 14 connected to the control processor 11, which is provided as a central hub, i.e. a root, for the Network on Chip, and the multiple clusters 15 of programmable Processing Elements are arranged at peripheral nodes, also being referred to as cluster nodes, of the Network on Chip 14.

It should be understood that the control processor 11 (with its associated memory) may be considered as the central hub or root of the NoC 14, even if the control processor is interconnected to the NoC via intermediate units such as one or more switches, buses and/or registers.

Each cluster 15 may further include a Cluster Controller (CC) 16 and an associated Cluster Memory (CM) 17 shared by the multitude of programmable Processing Elements 18 within the cluster 15.

In this particular example, the memory 12 that is accessible by the control processor 11 includes object code, created by a compiler, and the control processor 11 is configured to access the object code from memory 12 and execute the object code for controlling the data processing of the data flow application including controlling data transfers between the root and the clusters of said Network on Chip 14. In this way, the control processor 11 is configured to control, when executing the object code, transfer of: i) microcode, ii) input data, and iii) application parameters for the data flow application to selected locations in the Cluster Memories 17, and transfer intermediate data and/or results from the Cluster Memories 17.

The Cluster Controller 16 of each cluster 15 may then be configured for controlling loading of microcode from the associated Cluster Memory 17 into the microprogram memories of at least part of the Processing Elements 18 within the cluster.

The control processor 11 may be configured to command at least selected clusters to start processing the input data, using the microcode and application parameters that they have received.

For example, each Processing Element 18 includes one or more arithmetic units such as MAC UNITS, and each Processing Element 18 is configured to execute the microcode in its microprogram memory MP MEM to control the execution, by one or more of the arithmetic units within the Processing Element, of a dedicated part of the arithmetic work of the data processing of the data flow application to be performed by the Processing Element.

The control processor 11 may be any suitable processor configured to perform the tasks described herein. For example, it may be an on-chip processor on the same chip as the NoC, or it may be an external processor connectable to the NoC. The control processor may even be an ordinary digital computer or server, in which at least part of functionality is performed by a computer program.

The memory 12, which is accessible by the control processor 11, may be any suitable memory or collection of memory units. For example, the memory may include at least one memory unit, implemented as external memory and/or integrated memory with respect to the data processing system. Memory could be on-board (e.g. SRAM), external DRAM and/or a combination thereof. It could also be (at least partly) implemented by ROM, which provides high surface efficiency in IC implementation and high reliability.

By way of example, the control processor 11 may be configured to control, when executing the object code, at least part of the data transfers between the root and the clusters to be performed simultaneously with the execution of arithmetic work by the Processing Elements.

In a particular example, it may be beneficial for the data processing system 10; 10-A to be configured to broadcast at least part of the microcode and application parameters simultaneously to the Cluster Memories of at least a subset (all or a selected subset) of the clusters participating in the data processing.

Preferably, the arithmetic unit(s) of each Processing Element 18 includes one or more Multiply-Accumulate (MAC) units for performing MAC operations, and the execution of the MAC operations is normally controlled by local microcode and/or corresponding data bits originating from the microprogram memory associated with the Processing Element.

For example, the Cluster Controller 16 of each cluster 15 may be configured for controlling loading of input data and application parameters from the associated Cluster Memory 17 into the memory and/or registers of at least part of the Processing Elements 18 within the cluster to enable the arithmetic unit(s) to operate based on input data and application parameters.

Typically, the data processing system 10; 10-A may further include a data bus interconnecting the control processor 11, memory 12, Network on Chip 14 and/or one or more Input/Output (I/O) interfaces 13.

For example, the data processing system 10; 10-A may include a switch block for connection to data channels of the Network on Chip (NoC) leading to and from the clusters of programmable Processing Elements arranged at peripheral nodes of the Network on Chip. The data processing system may also include an NoC register for temporarily holding data to be distributed to the clusters of Processing Elements via the switch block, and for holding data from the clusters of Processing Elements.

Preferably, the switch block includes a multitude of switches and control logic for controlling the multitude of switches to support a set of different transfer modes over said data channels of the Network on Chip (NoC).

Optionally, the multiple clusters may be logically organized as an array with specific locations for the clusters in the array, and the switch block may be configured to enable exchange of data between clusters of neighboring locations in the array via the switch block. By way of example, the switch block may be configured to enable connection of such neighboring cluster nodes, e.g. for exchange of data from different regions of an input image.

As an example, the NoC register may be connected between i) the switch block and ii) a data bus for interconnection to the control processor, memory, and/or one or more Input/Output (I/O) interfaces to enable data to be stored in the NoC register from any of the control processor, memory, and/or one or more Input/Output (I/O) interfaces and to enable data to be transferred from the NoC register to any of the control processor, memory, and/or one or more Input/Output (I/O) interfaces.

In a particular example, the Network on Chip 14 may be a star-shaped network connecting the switch block with the clusters, with a point-to-point channel to each cluster.

Optionally, the data processing system 10; 10-A may include cluster-in-clusters, with broadcast on each cluster level.

The data processing system 10; 10-A may further include a control network for transfer of commands and/or status information related to data transfer to be done over the Network on Chip and/or for controlling the Cluster Controllers.

By way of example, the Cluster Controller 16 may include multiple interfaces including an NoC interface 16-1 with the Network on Chip 14, a PE interface 16-2 with the Processing Elements 18 within the cluster, as well as a CM interface 16-3 with the Cluster Memory 17 of the cluster.

For example, the clusters 15 may be laid out on a chip as an array of tiles, wherein each tile includes a block of a plurality of Processing Elements 18, which have their clock signals generated from clock signals coming into the cluster.

In each cluster 15, the Processing Elements 18 may, e.g., be physically arranged as an overall array of Processing Elements divided into two main sub-arrays, with a first set of one or more switches in the Cluster Controller 16, which divide the signal path into two trees, one for each main sub-array of Processing Elements, wherein the cluster further includes at least one additional set of one or more switches for dividing each main sub-array of Processing Elements into further sub-arrays. It may be possible to use a multi-port switch.

By way of example, the two main sub-arrays may be arranged on opposite sides of the Cluster Controller 16.

As mentioned, the control processor 11 may be any suitable processor. For example, the control processor may be an on-chip processor integrated on the same chip as the NoC. Alternatively, the control processor may be an external processor connected to logic for controlling the NoC.

As an example, the external processor may be a computer or server processor, in which at least part of functionality of the control processor is performed by a computer program, when executed by the computer or server processor.

In a particular example, the control processor 11 may be a microprogrammable General Purpose Processor (GPP), e.g. with microcode stored in a separate microcode code control store or with microcode in primary memory of the GPP.

As mentioned, the memory 12 accessible by the control processor may include at least one memory unit, implemented as external memory and/or integrated memory with respect to said data processing system.

Optionally, the control processor 11 may have at least two processor cores sharing primary memory and microprogram memory, wherein the primary memory and the microprogram memory are unified into a single accessible memory unit.

By way of example, at least a subset of the plurality of Processing Elements 18 may be processor cores arranged in pairs, each pair of processor cores sharing microprogram memory.

Normally, in each cluster, the relevant input data and application parameters are transferred to the Processing Elements 18 from the associated Cluster Memory 17 as and when needed by the overall data flow application.

Typically, the input data is processed according to the microcode and the corresponding application parameters. The application parameters, together with the microcode, are affecting and/or controlling how the input data is processed.

In a particular example, for each Processing Element 18, at least a subset, e.g. a local input data set, of the overall data set of the data flow application may be stored in one or more (at least two) local input data buffers accessible by the arithmetic unit(s), and/or application parameters are stored in one or more (at least two) local parameter buffers accessible by the arithmetic unit(s).

For example, the microcode in the microprogram memory MP MEM may include microcode instructions, and each Processing Element may be configured to at least partly operate based on a type of microcode instruction, the function of which is repeated for each clock pulse until a stop condition is reached without the need for determining an address to a next microcode instruction while repeating.

Optionally, source and destination locations and length of data blocks for transfer to the Cluster Memories 17 may be specified by the compiler in the object code.

As previously indicated, the data processing system 10; 10-A may for example be configured to load the object code into memory together with a virtual machine at system start, wherein the data processing system is configured to run the virtual machine on the control processor for executing the object code.

In a typical application example, the object code may be a representation of a data flow model, created by the compiler, enabling the control processor 11, when executing the object code, to transfer microcode, application parameters and input data in predefined order to the clusters and receive and deliver end results.

For example, the data flow model may be a Convolutional Neural Network (CNN) data flow model and/or a Digital Signal Processing (DSP) data flow model, comprising a number of data processing layers, and the data processing system may be configured for first transferring microcode and application parameters and then starting data processing, layer by layer of the dataflow model.

In yet another implementation example, the proposed technology provides an accelerator system 10; 10-B for a data processing system. The accelerator system 10; 10-B basically includes:

a plurality of programmable Processing Elements (PEs) 18 organized in multiple clusters 15, each cluster 15 comprising a multitude of said programmable PEs 18, the functionality of each programmable Processing Element being defined by internal microcode in a microprogram memory MP MEM associated with the Processing Element.

The multiple clusters 15 of programmable Processing Elements are typically arranged in a Network on Chip (NoC) 14, the Network on Chip (NoC) having a root and a plurality of peripheral nodes, wherein the multiple clusters 15 of Processing Elements are arranged at peripheral nodes of the Network on Chip 14, and wherein the Network on Chip is connectable to a control processor 11 at the root.

For example, each cluster 15 may further include a Cluster Controller (CC) 16 and an associated Cluster Memory (CM) 17 shared by the multitude of programmable Processing Elements 18 within the cluster 15.

The accelerator system 10; 10-B may be configured to be at least partly controlled by said connectable control processor 11, including at least partly controlling transfer of: i) microcode, ii) input data, and iii) application parameters for the data flow application, to selected locations in said Cluster Memories, and transfer intermediate data and/or results from the Cluster Memories.

The Cluster Controller 16 of each cluster 15 may be configured for controlling loading of microcode from the associated Cluster Memory 17 into the microprogram memories MP MEM of at least part of the Processing Elements 18 within the cluster 15, wherein at least selected clusters are configured to start processing the input data, using the microcode and application parameters that they have received.

Preferably, each Processing Element 18 includes one or more arithmetic units, and each Processing Element 18 may be configured to execute the microcode in its microprogram memory to control the execution, by one or more of the arithmetic units within the Processing Element 18, of a dedicated part of the arithmetic work of the data processing of the data flow application to be performed by the Processing Element 18.

In a particular example, at least selected clusters 15 may be configured to start, in response to commands from the connectable control processor 11, processing of the input data using the microcode and application parameters that they have received.

For a more in-depth understanding of certain aspects, the proposed technology will be described with reference to a number of non-limiting examples in the following.

Figure 6B:
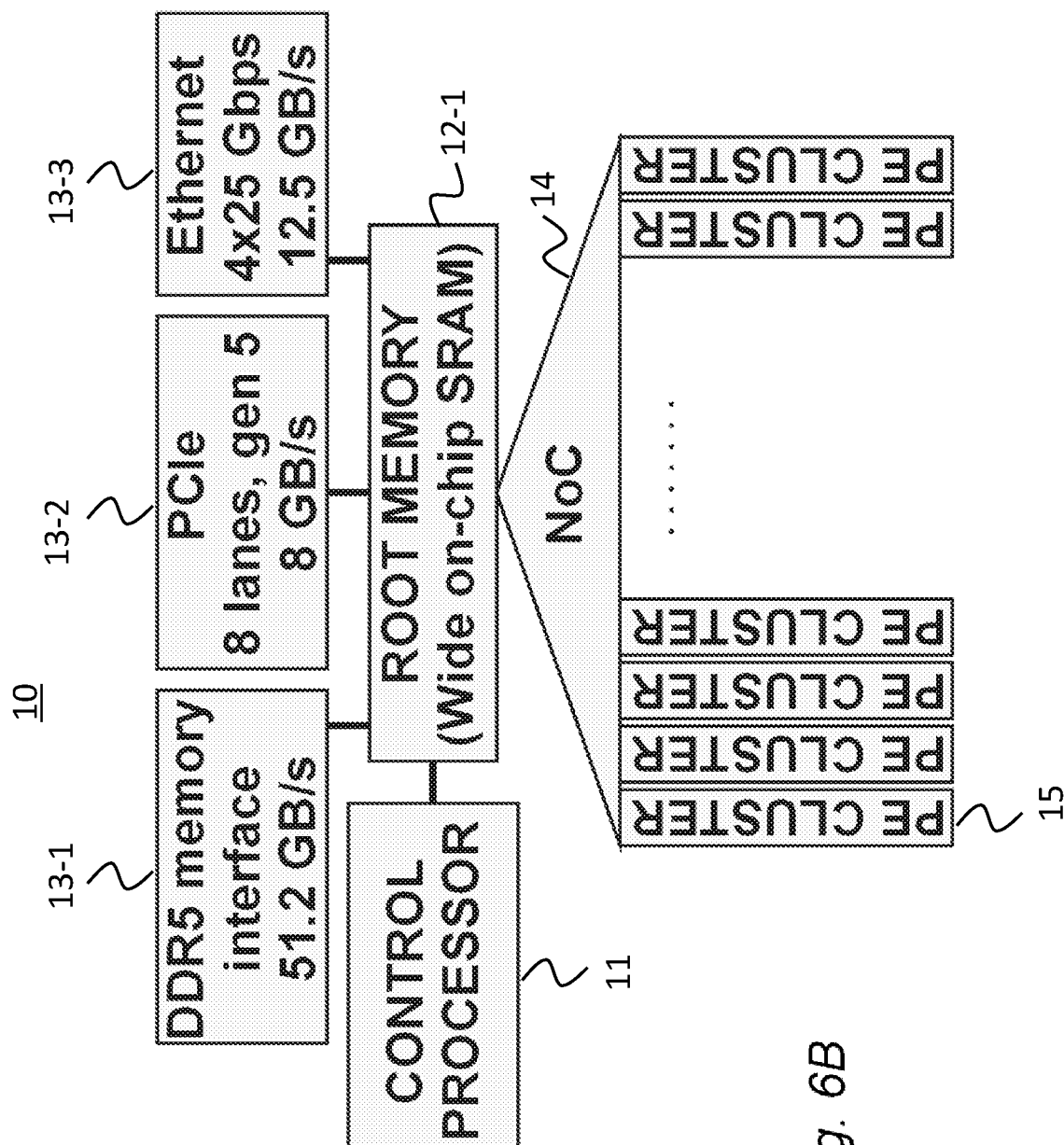
FIG. 6B is a schematic illustration of a non-limiting example of a data processing system and/or accelerator system.

FIG. 6B is a schematic illustration of a non-limiting example of an accelerator system comprising PE clusters 15 in a so-called Network on Chip (NOC) 14 connected to memory such as root memory 12-1 (e.g. wide on-chip SRAM) and/or other memory units, and a control processor 11, and DDR, PCIe and high speed Ethernet interfaces 13-1, 13-2, and 13-3.

Figure 7:
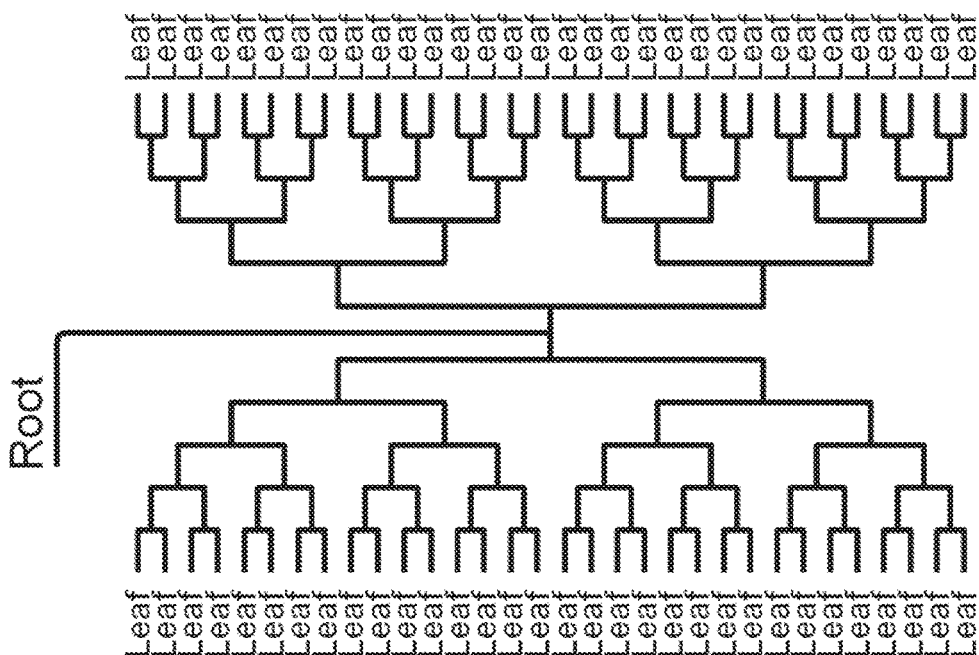
FIG. 7 is a schematic illustration of a non-limiting example a NoC structure.

FIG. 7 is a schematic illustration of a non-limiting example a NoC structure organized as a uniquely configured star network (or fat tree network), with a root (central hub) in the middle and branches (or a hierarchy of branches) reaching out to the leaf nodes.

Figure 8:
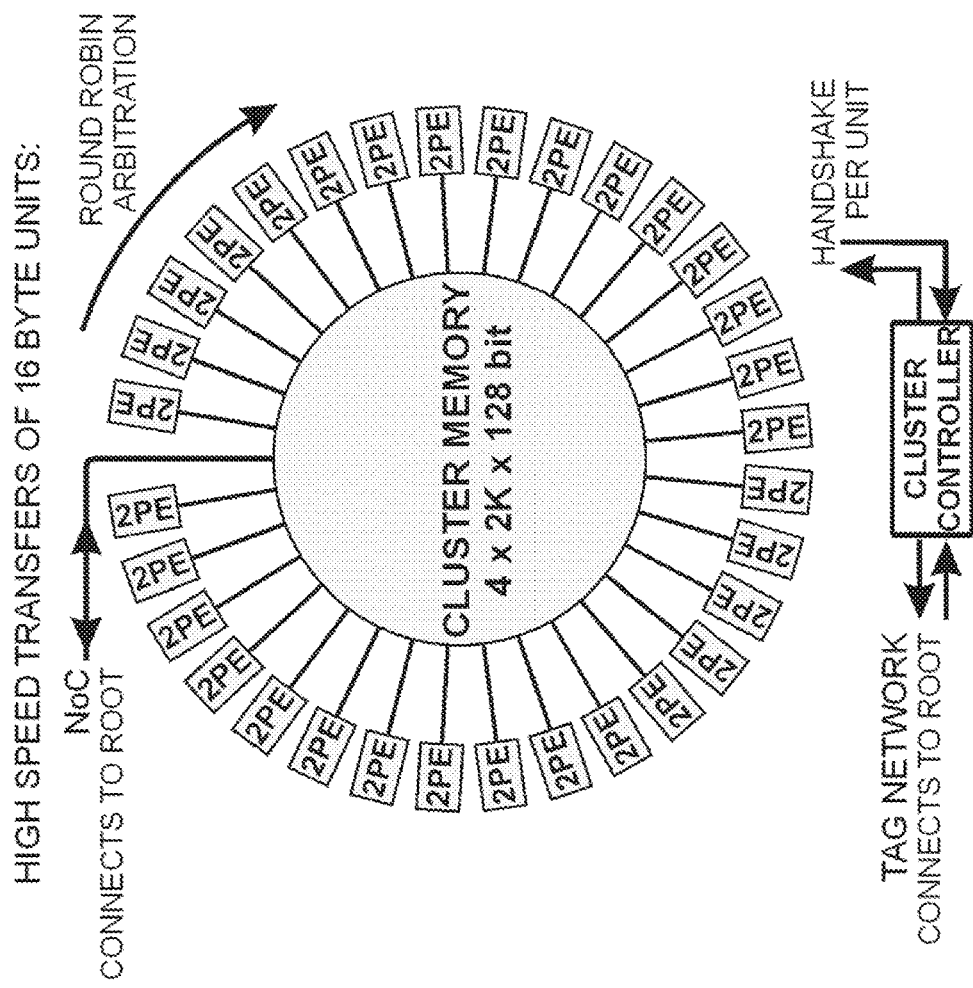
FIG. 8 is a schematic illustration of a non-limiting example of the organization of a cluster of PEs.

FIG. 8 is a schematic illustration of a non-limiting example of the organization of a cluster of PEs.

Figure 9:
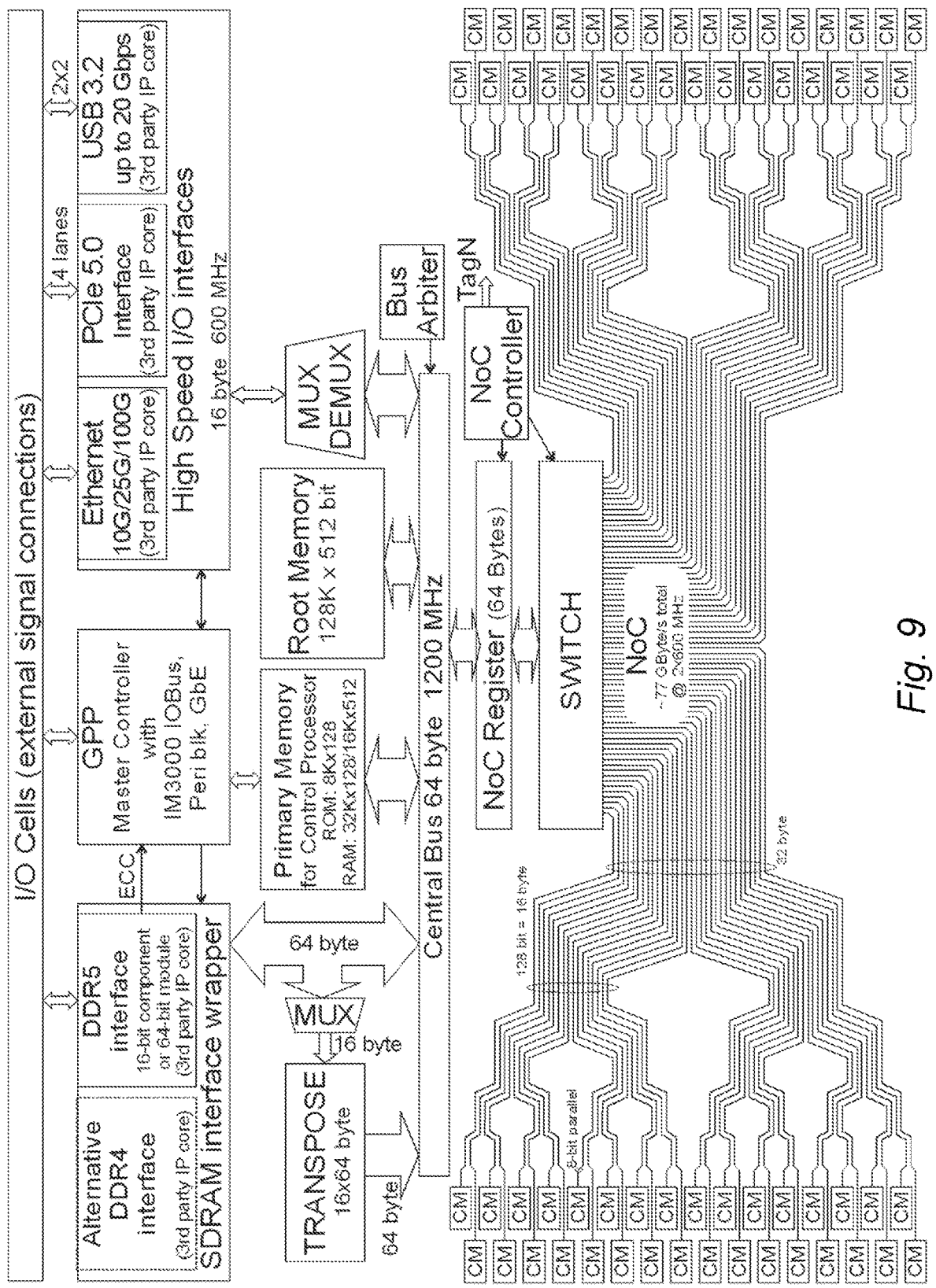
FIG. 9 is a schematic illustration of a non-limiting example of an overall system architecture including the root parts and the NoC.

FIG. 9 is a schematic illustration of a non-limiting example of an overall system architecture including the root parts and the NoC.

Figure 10:
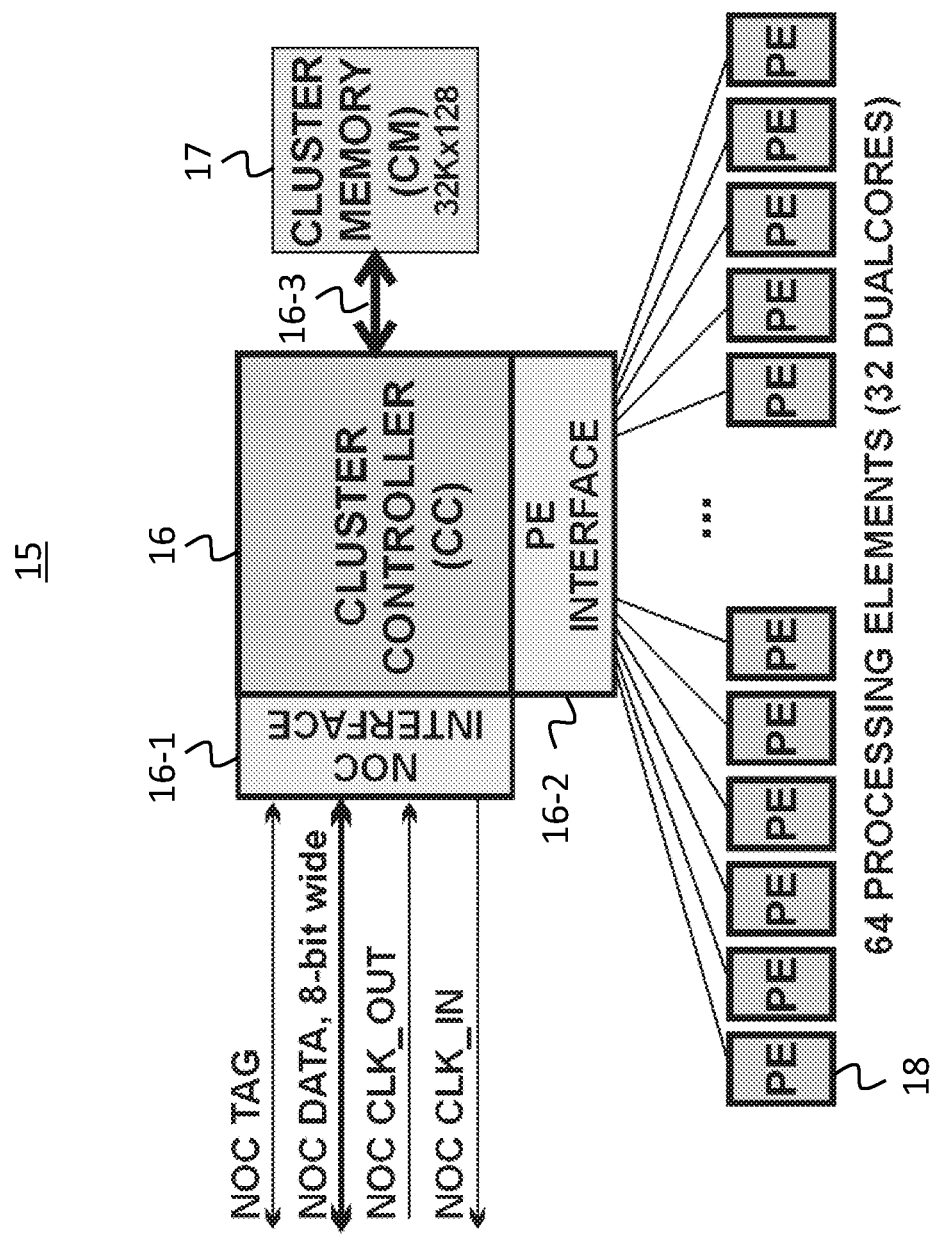
FIG. 10 is a schematic illustration of a non-limiting example of a cluster of PEs including cluster controller and cluster memory as well as interfaces.

FIG. 10 is a schematic illustration of a non-limiting example of a cluster 15 of PEs 18 including cluster controller 16 and cluster memory 17 as well as interfaces 16-1, 16-2, and 16-3.

Typically, massive amounts of data will flow through this accelerator at very high speed. A programmed processor core should not be involved in that, except for controlling these flows at high level, i.e. to set them up, start them, and repeat them in case of error. By way of example, this may be done by an on-chip General Purpose (programmable or microprogrammable) Processor (GPP).

The flows through the Network on Chip (NoC) are terminated in many Cluster Memories (CM), which in turn are shared by many Processing Elements (PE) which may be implemented as processor cores. The clusters are laid out on the IC chip as a regular array of tiles. Each tile has its own clock; it need not be synchronous with anything else than its own NoC connection, which is the source of its clock. Inside the tile is a block of a plurality of dual PEs, which have their clock signals generated from clock signals coming into the cluster and can use twice the clock frequency of the NoC and the cluster controller and CM.

In electronics and especially synchronous digital circuits, a clock signal normally oscillates between a high and a low state and is used like a metronome to coordinate actions of digital circuits.

In general, a clock signal is produced by a clock generator. Although more complex arrangements may be used, the most common clock signal is in the form of a square wave with a 50% duty cycle, usually with a fixed, constant frequency. Circuits using the clock signal for synchronization may become active at the rising edge or falling edge, or, in the case of double data rate, both in the rising and in the falling edges of the clock cycle.

The arithmetic work (as part of the data processing of a data flow application) is normally executed by the PEs. The work they do for each layer is usually not very complex (almost only long sequences of multiply-accumulate), but the data access patterns vary from layer to layer of the data flow model and each layer requires processing of very large amounts of data.

The main task of the rest of the system is typically to utilize as many PEs as possible in every cycle, which means providing them with thousands of operands in every clock cycle, i.e. many trillions of operands per second, and as far as possible perform the data transfers between root and clusters at times when the PEs are doing useful work.

High utilization requires careful planning, which is done automatically by the compiler, which processes, e.g., the CNN model description to create an object code program for a virtual machine, also called abstract machine, e.g. an interpreter program that with needed runtime support acts like a computer with a specialized instruction repertoire.

This instruction repertoire is the interface between the compiler and the GPP software. The compiler also needs to know the specifications of available PE microcode, i.e. the repertoire of available ready-made transformations. The compiler developer can suggest new such functions when needed for optimization of a certain model. The most common CNN models can be executed by a rather small selection of transformation types, but some networks, e.g., recurrent neural networks (RNN), used for interpreting audio signals, also use some less common types.

The object code and the abstract machine are loaded into the primary memory of the GPP at system start (FIG. 4) and the object code is then executed.

Typically, system processes images that are input at a rate of many images per second. The purpose of the processing is "inference", i.e. to draw conclusions from the input data, e.g. identify objects or situations pictured in the incoming images.

If everything is set correctly, the execution sequence of a CNN model-tens of billions of operations for each inference, many times per second—is exactly the same each time; there is no data dependency in the sequence itself, only in the results of its computation.

A digital processor is mainly specified by its instruction repertoire, which is the set of machine instruction types. A machine instruction usually consists of a number of bit fields. One of these contains the opcode, others may contain an address offset, a register number, or data. Machine instructions are the building blocks of the stored executable object code, which is produced by a compiler of assembler from the source code text written by the programmer.

In general, a microprogrammable processor, also referred to as a microcode-controlled processor, is a processor in which the machine instructions of the processor are executed by sequences of microcode instructions in the internal micro program memory (i.e. the control store, usually a read-only memory). These sequences are part of the internal processor design, and normally developed by the processor design team. Thus, a microprogrammable processor is a special type of processor that should not be confused with the expression "microprocessor", which simply means that the processor is built as an integrated circuit.

There is a distinct difference between machine instructions, on one hand, and microcode instructions on the other hand, in both nature and function.

Naturally, a microprogrammable processor may also be built as an integrated circuit, but a microprocessor is not by definition equipped with a micro program for controlling its internal operation.

In a microprogrammable processor, the normal procedure is to generate the control signals of the processor from microcode words (also referred to as microinstructions). These can be thought of as words consisting of bits or bit fields, each representing control signals as defined by their positions in the word, and each word specifying the respective signal levels to be produced during the current clock cycle. The microcode words form a microprogram that is stored in a special microprogram memory, also referred to as the control store, and the microprogram thus controls the details of the processor core as it controls the execution hardware to fetch and execute machine instructions. This corresponds to a microprogrammed, i.e. a microcode-controlled, processor.

In a microprogrammable processor, there is consequently an additional level of control, between the normal program and the executing hardware. This level usually treats the machine instructions of the program as data, which it, under the control of the microcode instructions, brings into the execution unit and operates on. It should thus be understood that there is a substantial difference between machine instructions (normally stored in an external RAM memory) and microcode instructions (stored in an internal microprogram memory), the microcode instructions being used for controlling the execution hardware to fetch and execute the machine instructions.

The description here is somewhat simplified, but the more complex details do not require any significant changes of the overall system suggested by the inventive concepts, configurations and procedures presented herein.

For example, the design of the compiler can first consider the simplified description, and then be refined as it is applied to the real models and to new microcode for the processing elements to process them as efficiently as possible.

Although the description mainly focuses on Multiply Accumulate (MAC) operations, other (simpler) operations such as ADD and MAX may also be used as and when needed.

Some parts of the description are mainly limited to the system parts outside the PEs, and how these system parts serve the PEs with blocks of data, parameters, and code at the right times such that as many as possible of the PEs can work continuously for as much of the time as possible.

Sometimes this can be difficult, but not necessarily for the system described here. Problems may be solved in the compiler and the PE microcode; they need not affect the requirements for the overall system described herein, since it can transfer blocks in any given order, to and from the clusters, as specified by the code the compiler has produced, without the need to know what they contain.

An example of this is layer fusion, which is described in the Appendix. The most efficient execution of a CNN model or FFT algorithm in the accelerator may in some cases require that the contents of the microcode buffer in the PEs is modified more than once during the execution of a layer, and we will not always finish one layer before starting on the next.

Another example is radar data extraction, where a PE can execute an entire FFT and size and latency can be increased by using multiple PEs, both pipelined and in parallel. Here, the layers are smaller, and the scratchpad of a PE therefore can store two complete layers, or a significant big part of two layers, simultaneously in its scratchpad. Transformations can then be made from the first to the second and then from the second to the first, etc., avoiding intermediate data storage outside the PE. In the case where the layers are not complete, two or more PEs can work in parallel. They then need to exchange data with other PEs in the cluster, via the shared cluster memory, and if more than one cluster is used, the clusters need to exchange data. This is very similar to the data exchange needed for CNN.

With special reference to FIG. 6, DDR4 may be used for the FPGA version but will probably not be of interest in an IC design. Memory capacities are preliminary and need not be the same for different implementations. Clock frequencies may be limited by the technology currently used, e.g. SRAMs for which 0.8V supply is assumed. Increased efficiency can be achieved with lower voltage, but frequencies will then need to be reduced. An extra bus may be used for peripheral interfaces. Smaller systems, e.g. with 16 clusters and/or half as many PE per cluster, can be built with other arrangements of the same IP blocks.

It should be understood that the proposed technology is not limited to any of these specific examples, but rather by a general understanding of the underlying concepts.

The proposed technology and/or different aspects thereof are based on a number of insights by the inventor (some of which may be optional depending on which aspect is considered):

In order to process an image, for example, or executing a more general processing task, by using many processing elements such as the PEs of the present invention, it is natural to divide the image into rectangular regions and assign a region to each cluster and/or each PE. It is then customary to connect the clusters and/or PEs into a so-called mesh network, especially since the regions in many cases need to exchange data with neighbouring regions.

However, it has been recognized that standard mesh-networks are not very efficient for massive input and output of data.

The inventor has realized that in contrast to using a standard mesh network, a very specific implementation of a star network configuration, e.g. with clusters-in-clusters, is much more suitable, especially when improved scalability is needed. As part of the inventive activity, the inventor was able to analyze and pinpoint what was needed for fast and power-efficient input and output of massive amounts of data. The so-called switch block (see below) proposed for managing communication and data exchange between neighbours can handle this just as effectively as for a mesh network, especially when most or all PEs operate at the same synchronized pace, but with the proposed star network configuration providing excellent scalability properties, almost without any limit by using star networks within star networks.

In a specific aspect, the proposed technology further suggests using common storage resources for nodes, and with a configuration based on clusters-in-clusters (can also be regarded as "star networks within star networks"), different levels of storage can also be provided, which is very beneficial when the system size and thereby the amount of data and the corresponding data bandwidth increases.

Another insight of the inventor has to do with the MAC operations to be performed. Normally, there is a number of MAC units that are using pipelining and each unit can start MAC operations with a given cycle time, e.g., one period of the clock frequency. The execution time for the total process cannot be shorter than the required number of MAC operations multiplied by this cycle time and divided by the number of MAC units. To be able to reach close to that limit, the forwarding of operands (which is generally a very complicated process) must be effective. The inventor has realized that the fastest configuration (in number of MAC cycles) is the one that can i) utilize as many as possible of the MAC units (i.e. providing them with operands), and ii) "hide" as much as possible of the time to get the operands in place. In other words, performing data transportation during the same time as the MAC units are working, i.e. simultaneous data transportation and MAC execution.

A number of MAC operations should be performed, each operating on two operands from different data structures, that should be read simultaneously, e.g. from fast SRAMs connected to the inputs of the MAC unit. The SRAM accesses and MAC operations require some amounts of energy, which depend on factors such as SRAM and MAC unit design and the fabrication technology. The insight here is that the system design that is the most energy efficient, apart from the factors above, is the one that most efficiently provides and/or forwards the correct operands to the SRAM memories.

It is far from trivial to get the image ready in place in the cluster memories, but the inventor has realized that effective memory buffering and a division into regions in a very short amount of time can be accomplished by means a special transpose procedure and corresponding hardware block.

Clusters-in-clusters, with broadcast on each level:

As a non-limiting numerical example, a peak total number of bytes/second consumed by 64 PEs in one cluster is 307 billion (with 2.4 GHz PE clock). This is much more than the bandwidth the shared cluster memory could reasonably have, and high utilization of the PEs therefore requires that operands must be stored in local scratchpads and reused as much as possible.

The scratchpads are many and they must be small. Due to the lean design, e.g. using single-port SRAM, the PE cannot use its MAC while the scratchpad is being loaded from the shared cluster memory. For high utilization, this loading must be fast compared to the consumption of the loaded data at the high speed.

Fortunately, most of what is transferred is kernel parameters that are the same for all PEs. They have been broadcast via the NoC to the CMs, and they will, when needed (and in smaller portions), be (local) broadcast from each CM to its PEs. This reduces the bandwidth requirement of the CM considerably, but not for the PE.

The PE, however, needs only its own, relatively small, part of the other data, that which is local for its part of the tensor being processed (typically being a small part of the x- and y-dimensions and extending through all or part of the z-dimension). But the PE sometimes needs to read CM contents repeatedly.

The transfer mechanism should be efficient and have very high bandwidth. The inventor has realized that it could beneficially utilize (local) broadcast, i.e. transfer such data to all PEs simultaneously and thereby much faster, and the connection between CM and PE must be wider than that of the NoC channel and the PE datapath.

By way of example, a special feature about the proposed NoC is that the nodes, in addition to being connected in a "star" network, also have specific locations in an array with "rows and columns" or equivalent array configuration, and that there is provided a switch in the hub that is designed to let us efficiently connect all nodes to other nodes in one of a number of specific ways. One such way can be that each node can send to its nearest neighbor to the right and receive from its nearest neighbor to the left (in the array of columns and rows), while another way may be that each node can send to its nearest neighbor below and receive from its nearest neighbor above. In other words, each node can send to its nearest neighbor in a specific direction of the array and receive from its nearest neighbor in another (e.g. opposite) specific direction of the array. For edge nodes in the array, these transfers can go over the edge to the opposite side. In a sense, this "hierarchical" configuration may be seen as a uniquely configured type of star network that emulates a "torus interconnect".

For a better understanding of the present invention, reference will now be made to a continued description and explanation of the proposed technology with particular focus on neural network (CNN) applications and the inference process therein. It should though be kept in mind that neural networks is merely one of many possible application areas of the proposed data flow accelerator.

Examples of Architecture Principles of Operation

Examples—Accelerator Hardware, Firmware and Compiler

As mentioned, the accelerator is a hardware machine, comprising two (or more) kinds of programmable processors. One is GPP, at the root, the other is used in each of the many Processing Elements (PE). The detailed functionality of both of these processor types—e.g. the instruction set of the GPP and the high-speed computation in the PEs—may be defined by internal microcode, which is typically called firmware herein. Firmware may also, mainly for GPP, refer to code that is developed like software, using software instructions, but belonging to the low-level control of the hardware (e.g. interfaces) and stored together with microcode, often in ROM.

In a typical application, massive amounts of data (e.g. tenths of Gigabytes/s or more) flow through this accelerator. A programmed processor core cannot be involved in that, except for controlling these flows at high level, i.e. to set them up, start them, and repeat them in case of error. By way of example, this may be done by an on-chip General Purpose (programmable or microprogrammable) Processor (GPP).

In a variant of the accelerator design, most suitable for either a smaller accelerator or a part of a bigger system built as a cluster of clusters, the GPP is not on the same chip as the rest of the accelerator. For example, a high bandwidth interface, typically PCI Express or USB 3.2 or USB4, may then be used to connect the external GPP to the logic (circuitry) controlling the NoC. The general function of the accelerator is the same as described here. However, in this variant it may be practical to replace the GPP with a general digital computer, such as a PC or server processor, in which case the GPP function is simulated by a computer program and the described details regarding GPP hardware design do not apply. FIG. 1A can be built with this variant of the system, in which case the DDR5 IC (as an example) would probably be omitted since the computer memory can be used instead. In the case of a cluster of cluster the DDR5 IC could be retained as "subcluster local" memory, and the GPP would then not be replaced by a computer but instead, e.g., an FPGA, which is well suited for connecting many such accelerator clusters and handling high throughput of data between them and secondary storage such as HBM (High Bandwidth Memory) DRAM.

In some example embodiments, the control processor may even be seen as a distributed processor system, e.g. with some parts on-chip and some parts off-chip.

The flows through the Network on Chip (NoC) are normally terminated in many Cluster Memories (CM), which in turn are shared by many Processing Elements (PE). By way of example, the clusters are laid out on the IC chip as a regular array of tiles. Each tile has its own clock; it need not be synchronous with anything else than its own NoC connection, which is the source of its clock. Inside the tile is a block of e.g. 32 dual PEs, which have their clock signal generated from two clock signals coming into the Cluster Controller from the hub of the NoC.

Almost all arithmetic work is executed by the PEs, and the details of that is controlled individually by local microcode. In an example system, there may be 4096 PEs, 64 PEs (32 pairs) in each of 64 clusters, or more generally K×M PEs in total, for K clusters, each of which includes M PEs, where K and M are integer values equal to or greater than 2. For many applications, it may be beneficial to have a system with at least 16 clusters, each which includes at least 16 PEs (e.g. 8 dual cores), totaling 256 PEs. The work they do for each layer is usually not very complex (almost only long sequences of multiply-accumulate), but the data access patterns vary from layer to layer of the data flow model and each layer requires processing of very large amounts of data. It is the responsibility of the compiler and the GPP to see to it that the relevant blocks of microcode, of data, and of coefficients (mainly kernel elements in the case of Convolutional Neural Networks) are in the proper locations in all Cluster Memories at the points in time when the PEs need them, and to take care of data that must be transported away from the memories, either to be stored and later retrieved, or to be delivered as results.

As previously mentioned, a main task of the system is to utilize as many PEs as possible in every cycle, which means sourcing the arithmetic resources of all PEs with a total of many thousands of operands in every clock cycle—in the example system described here this will mean on the order of a hundred trillions of operands per second—and as far as possible perform at least part of the data transfers between root and clusters at times when the PEs are doing useful arithmetic work.

High utilization requires careful planning, which is done automatically by the compiler, which processes a data flow model description such as a CNN model description to create an object code program for a virtual machine, also called abstract machine, e.g. an interpreter program that with needed runtime support acts like a computer with a specialized instruction repertoire.

This instruction repertoire is the interface between the compiler and the GPP software. In this example, the compiler also needs to know the specifications of available PE microcode, i.e. the repertoire of available ready-made transformations. The compiler developer can suggest new such functions when needed for optimization of a certain model. The most common CNN models can be executed by a rather small selection of transformation types, but some networks, e.g., recurrent neural networks (RNN), used for interpreting audio signals, also use some less common types.

The object code and the abstract machine are loaded into the primary memory of the GPP at system start and the object code is then executed.

Typically, it processes images that are input at a rate of many images per second. For example, the purpose of the processing may be so-called "inference", i.e. to draw conclusions from the input data, e.g. identify objects or situations pictured in the incoming images.

If nothing goes wrong, the execution sequence of a data flow model (e.g. a CNN model)—tens of billions of operations for each inference, many times per second—is exactly the same each time; there is no data dependency in the sequence itself, only in the results of its computation.

Examples—Compilation of a CNN Model

Model

In general, CNN models may be created continuously, both openly by researchers and by industrial companies for their proprietary use.

An example model can be seen as a data flow graph, which processes an input data set, typically a 3-dimensional data structure, by a sequence of transformations, each one typically producing another 3-dimensional data structure that is input to the next transformation. The model specifies operations and parameters for each transformation.

However, the parameters are not given by the model design itself; they are instead "learned" by "training" for a specific task, e.g. to classify objects in an image. Training creates the parameter values by repeating a loop, which requires the same kind of dataflow operations as those used in inference, and the same accelerator can be utilized.

CNN models are specified in a format defined by one of several known open-source frameworks.

The model, complete with parameters, can be compiled to a form that is suitable for execution. There are some open-source tools for the first step of this process, which can be less hardware dependent than the final steps are.

The parameters are mostly weight coefficients, which have been learned by training. The compiler may use them as they are, or it can be instructed to quantize them to lower precision to reduce the computation work. As a last step, the parameter files can also be compressed by the compiler, to reduce their size.

Normally the processing of the model is unconditional, there is no data dependence, the sequence is fixed, and the transformations are independent of each other; each layer is supposed to be finished before the next is started (but sometimes energy can be saved by modifying this and get the same result—so-called layer fusion). Sometimes the result of a transformation is stored and later retrieved and combined with another layer later in the process. In an RNN (Recurrent Neural Network) there is also feedback, i.e. results can be fed back to be combined with a layer that was produced earlier in the process.

The data structures ("tensors") have x-, y-, z-dimensions (width, height, depth). The model specifies the dimensions of each data structure and how they are aligned with each other in the x/y plane (which is the same as specifying how "padding" is done). The model also specifies the transformations to be done on the tensors.

Compiler

The term "compiler" may here be used for the tool chain that is needed to create the files that are loaded into the accelerator system to make it perform its task as defined by a specification, in a standard language, of the dataflow model. The tail part of that chain is hardware.

The compiler creates an object code for the accelerator to execute. This code mainly describes high-speed transfers of data blocks within the accelerator, serving the processing to be done by the PEs. However, the CNN compiler is normally not responsible for compiling any source code describing details of the transformations. Those details are controlled by short microprograms, which need to be hand coded, cycle by cycle. This is more like hardware design although fully configurable like software. Fortunately, they are very compact, and there is a well proven meta-assembler tool to generate them from humanly understandable source code. The predefined microprograms are made available for the compiler, which selects the proper one to use depending on what the model needs for the layer, or layer sequence, to be compiled.

The micro-coded transformations may be selected from a specific limited list of alternatives, and either inserted or referred to in the binary output, together with any associated function parameters (specifying access pattern etc.) and CM addresses, e.g. to where to find the weights (coefficients) and where to store results.

The dominating transformations are of only three types, and two of them can be modified by two function parameters (size and stride). There are also specific alternative variants of these transformations to choose between, depending, e.g., on relative size of the dimensions. The compiler will normally need to do the proper selection.

Some of the transformations can use pruning, supported by special microprogram versions that the compiler shall be able to utilize.

The compiler must also recognize when layer fusion can be used and decide how to implement that in the "binary" (object code) file it produces.

(That file need not be very compact since its size and the interpretation overhead it causes are negligible compared to normal software. Thus, it is not necessarily "binary" but could be readable text.)

When creating the detailed, fixed, scheduling for the execution, the compiler must model the process, such that it, e.g., knows exactly which part of the cluster memories that is available as destinations for new parameters.

Subdivision of the Input Image

Another task for the compiler is to generate the code that GPP needs to handle data input. For camera input the GPP will typically need to receive a digitized camera video signal and store the image in a prescribed way in DDR, while it is controlling the inference process for the preceding image. When the entire image has been received, and the preceding inference is finished, the GPP shall control the accelerator hardware to transfer the new image at full NoC speed to the cluster memories.

How the subdivision of the image should be done can be decided by the compiler, with this rule: Divide the image into two equal halves, through bisection of the longest of width and height. Do this a total of six times, i.e. repeat for each sub-division until a given level of division. This example results in subdivision of the image into 64 equal rectangles, provided that all dimensions are even before bisecting. If they are not, then the image is simply enlarged by padding as needed, before the first bisection.

Examples—GPP Software

The GPP normally boots from DDR at system start, and then also loads the abstract machine, which will execute the object code produced by the compiler. This object code is what the words "software" and "program" will here refer to, and what the GPP is said to do is done indirectly through the abstract machine (which effectively replaces the instruction set of the GPP).

The object code is during runtime normally resident in the GPP primary memory, and mainly controls the transfers to and from the CMs.

There are mainly two processes for this software to handle. One is the input, on regular interrupts, of data representing an image or radar signal, which may need to be preprocessed (scaled, quantized) and stored until it is complete in the needed format and can be delivered at high bandwidth to the NoC.

This process also rearranges the image by dividing it into e.g. 64 regions, one for each CM. As the last part of that rearrangement, the image is transferred from DDR to CM through the TRANSPOSE block. This may be done in just a few milliseconds. The GPP, which is not involved in that transfer except for initiating it, meanwhile starts receiving the next image, in a timeshared manner at camera speed, and will write it into the DDR in a special, reorganized, way, during the processing of the preceding image.

The second process is the inference that starts as soon as the CMs have been loaded with the new image.

The inference process loads the model parameters, in the order needed. It would be energy efficient to load them from RM, but that may not have the needed capacity. It can then be loaded either from DDR or directly from non-volatile storage, e.g., flash memory. A possible interface to use for flash, and also for camera (and display and audio if used) is USB 3.2. On-chip MRAM is a possible non-volatile memory alternative, which is available with the target IC fabrication technology GF 22FDX, and also GF 12FDX, which is a natural next step, with simple migration for further improvement of performance and efficiency.

The object code, in the GPP primary memory, is a representation of the DNN or DSP dataflow model, layer by layer, created by the compiler so as to give the GPP all it needs to know (but nothing else) to transfer microcode and parameters and input data in the correct order to the NoC throughout the process and receive and deliver results at the end.

The GPP need not know which is microcode and which is model parameters, it only needs to know the source and destination locations and the length of a block to transfer. This information has been specified by the compiler in the object code.

GPP program code will also be involved in storage/retrieval of intermediate data at certain fixed points in the process (determined beforehand by the compiler) when cluster memory capacity is insufficient. This storage will use Root Memory (RM) for highest bandwidth and lowest power consumption but will use external memory—DDR or perhaps remote storage via Ethernet—if needed, in which case FIFO buffering in RM can make the NoC transfer times shorter.

The microcode for the layer is normally to be placed at address 0 in CM; that is where the PE normally fetches a given number of words to its microcode buffer before starting to execute. It may be practical that the transfer of microcode is done for each layer transformation. Note that the microcode for the previous transformation is usually not needed anymore and can be overwritten. If there is enough space in CM for it, then the microcode for several layers may be transferred together, or even be resident, i.e., loaded only at system start. The PEs can, under microprogram control, download new microcode sequences from CM as needed.

Before processing of the transformation, its weight parameters must also be transferred from root to CM, taking care that nothing essential is overwritten.

The GPP commands, through the Tag Network (TagN), the clusters to start processing the image, using the microcode and parameters they have received.

When the first processing step is finished, the GPP continues interpreting the code, which will probably make it transfer some new microcode, overwriting the used microcode (not needed anymore) and may command some data transfer over the NoC.

The process will continue in the same fashion, first transferring microcode, then parameters, and then starting processing. This is done layer by layer, until the end of the dataflow model. Then the result is in the cluster memories and will be properly assembled and output.

The GPP software will also include drivers for the DDR and I/O interface blocks. All interfaces supported by commercially available IM3000 processor can also be used. A smaller AI of DSP accelerator, with one or a few 16-PE or 64-PE IP blocks, may be used as part of a SoC (System-on Chip) device, where the GPP will have more of a "general-purpose" role in addition to the role described here. For such a system, 1 Gbps Ethernet (e.g. with Imsys' own interface IP) can be used instead of the higher-speed Ethernet interface.

Examples—Root Memory

A high-bandwidth buffer may be used to even out the data flows between the bus clients, and an on-chip SRAM is also a preferred resource for common storage of intermediate data because it is more energy efficient than using external DDR. The Root memory will also be made indirectly accessible from the GPP, via a 512-bit wide bus connection to its on-chip Primary Memory. The GPP can then use the Root memory as a high-speed secondary memory and via that also transfer blocks of data to/from all other bus clients.

The RM—and external DDR when needed—may be used for temporary storage during the inference process, and the capacity is therefore larger than what is needed for the buffering. The RM is connected via the bus to the root of the NoC tree. The bandwidth there should preferably match both what the PEs together need and the bandwidth that the DDR can offer.

Program code and parameters for the layer to be processed are usually the same for all participating clusters and is therefore broadcast to the cluster memories. Broadcast is faster than transfer of different contents to different leaves of the NoC. It is practical to do this broadcast before transferring data for the layer, since the application data may need to be loaded and processed in several batches.

Whether a cluster (which has not been turned off) is "participating" or not may be indicated by a flipflop in the cluster control logic.

Examples—Central Bus

All transfers with high throughput (many Gigabytes per second) pass through a 512-bit wide bus, controlled by a Bus Arbiter. The arbiter receives request and acknowledge signals from the bus clients and determines which of them will have its output enabled on the bus and which will read the bus contents. The arbiter operates according to a protocol that is, in turn, controlled by the GPP.

Clients of the bus include one or more of the following:
The NoC Register
The Root memory
The GPP primary memory.
The High-speed interfaces
  PCIe
  10G/25G/100G Ethernet
  USB 3.2
The DDR interface
The Transpose block.

Initial Image Load

The initial loading of the image is often the biggest NoC transfer, and it is more difficult to "hide", because it needs to be done before the first transformation.

The input is typically an image, although it can also be. e.g., a set of signals from the A/D converters of a radar RF unit. For an automotive video camera, the image can be 20 MB and the frame rate 20 fps, i.e. execution time should be 50 ms or less. A pathology image system may have an image size of many GB, but longer execution time is then of course accepted.

The reception of an image from a camera is spread out in time over an entire frame cycle, and this is also the case for a radar frame. The entire image needs to be present in the accelerator before efficient processing of it can start. This is because the layers of a CNN have to be processed strictly in sequence, i.e. one transformation needs to be finished (at least for part of the layer) before the next one can be processed.

Thus, while we process one image, during a frame time of 50 ms, we receive the input data for the next one from the camera and store it in operating memory (e.g. DDR). We then transfer it as fast as we can to the cluster memories. We can do this more than 10 times as fast as the camera throughput, which leaves us more than 90% of the frame time to process the image. We don't need the full bandwidth of the NoC and the bus to do this transfer, so we might be able to overlap it with delivery of the previous result (typically smaller than the image) to one of the high-speed I/O interfaces (via buffer in RM and/or in the interface block).

The image should be stored in operating memory (e.g. DDR) in a manner suitable for loading it into the cluster memories. However, it is not possible to fully do that, since adjacent bytes on the bus are connected to different clusters and writing into the DDR must be done in blocks of 16 consecutive bytes.

The rearrangement we need to do is done in two steps. The first is performed when writing data into the DDR; This is done such that each incoming scanline is broken up in as many parts as there are regions across the image width, and these parts are not stored in sequence but instead in a way that places lower lying regions at higher addresses than the upper regions, and such that when the data is read out in normal address order the line parts come in the desired order. The second step breaks up the 16-byte sequences in the desired way. This may be done by the TRANSPOSE block.

The switch block should here just transfer each byte of the NoC register to its corresponding cluster, just as with Mode 3.

The efficient delivery of the final result will need to undergo a similar rearrangement, but in the opposite direction.

The Transpose Block

We can get the image from a camera or radar receiver via a high-speed interface, e.g. PCIe or USB 3.2. We may use a part of the root memory as a FIFO buffer to even out the flow, and transfer from there to DRAM.

For improved performance and for efficient use of DRAM, it is desirable to store data as long consecutive sequences (16 bytes), while we for transferring at high speed to all clusters need to take these sequences apart and rearrange the bytes such that we can send corresponding bytes to all clusters simultaneously.

By way of example, when the image is complete in DRAM and it is time to send it to the cluster memories, we make that transfer via the TRANSPOSE block, which solves the problem by taking in 1024 bytes and changing the order of them in the proper way, which is a matrix transpose operation.

We need this hardware block for the efficient distribution of different parts of an image to different clusters for processing, but it can be useful also for other tasks. Matrix transpose is sometimes needed and cannot be efficiently executed by an ordinary processor, especially with data in DRAM. It looks like a hardware transpose block may become valuable for the matrix multiply needed for DNN training. This kind of operation is also important for 2-dimensional FFT.

For example, the transpose block can be seen as a matrix of e.g. 16*64 elements, each element being an 8-bit register. The registers are interconnected both in rows and columns, and data (whole bytes) can be shifted through the matrix-both horizontally and vertically. We always read and write 16-byte sequences in DRAM. As we read, we shift in 16 bytes in width from the right. With 64 shift steps, we fill the matrix, and can then empty it to the 512-bit register and on to the clusters.

The logic that transfers data to and from this block should allow us to use it in different ways if we find that useful, perhaps in both directions and also without DRAM, e.g. to transpose a matrix from and to the root memory.

As an example, the naive design of the block as described could use 16*64*8=8192 flipflops, connected as shift registers in two alternative selectable ways. For example, they would all be clocked at 1200 MHz while the block operates. However, there is a better way to do this, which reduces the number of flipflop clocking events from (64+16)*8192=655360 to only 64*16*8+16*64*8=16384. A custom layout would be preferred, organized as 8 identical "bit-slice" blocks that are laid out like normal RAM arrays (64*16) and use standard RAM cells as flipflops. Counters are driving demultiplexers that control the cells like controlling the word and bit lines of a normal RAM array, with the difference that there are alternative word and bit lines-horizontal/vertical in one mode and vertical/horizontal in the other. It should be clear to someone skilled in digital hardware design how this can be further developed to make it possible to selectably change the direction (input/output) of the flow through the block if needed.

Examples—On-Chip Networks

Figure 11:
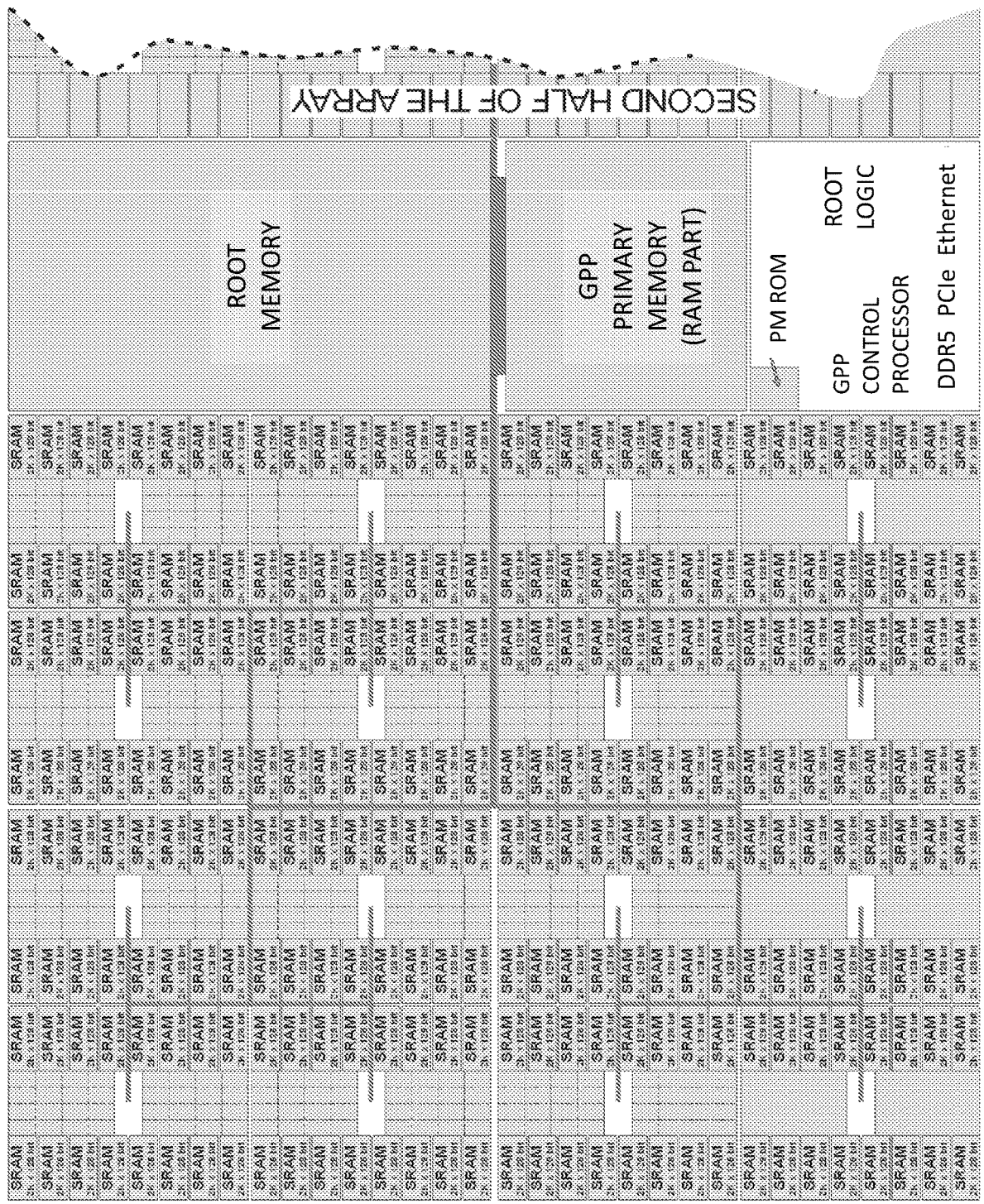
FIG. 11 is a schematic layout sketch showing an example of one half of a PE array and its root system including RM, GPP and interfaces.

Data transfer between root and clusters uses a uniquely designed starshaped network, although physically on the IC it will be laid out as a hierarchical tree as shown in FIG. 11 and, schematically, in FIG. 7. Its control logic is concentrated at the root. The cluster memories are the network leaves, and each of these is also accessed by e.g. 64 (or more generally M) PEs (e.g. 32 pairs of PEs) as shown in FIG. 8. The illustrative non-limiting example of a 64-PE cluster can alternatively be configured to work as four 16-PE clusters, each with ¼ of the memory capacity. This may be preferable with some dataflow models. It should be understood that any subdivision by N (i.e. 1/N) is feasible.

For the reference CNN being studied, an average of almost 10 gigabytes per second must be transferred between the root system and the clusters. About 83% of this is outward, from root to clusters. For good utilization it should be transferred at much higher rate than this average.

In this particular example, data is transferred through 64 byte-wide channels, one per cluster, as big blocks-typically megabytes are transferred from root to CMs for each layer (although a big part of it consists of kernel values, which are broadcast, which means the same contents are transferred on all channels).

The channels form a star-shaped NoC (Network on Chip). For example, the peak total transfer rate is 76.8 GB/s at 1200 MT/s (megatransfers/s) i.e. it needs to do outward transfers about 10*0.83/76.8=~11% of the time and inward transfers 2.2%.

The transfers may be initiated by control information, which is transferred separately. This control communication is transferred bit-serially, on a different network, called Tag Network (TagN), which is structured as a hierarchical tree, with logic in its branch points. The separation between data and control has several advantages; two of them that save time is that a transfer can be set up during another transfer, and that erroneous transfers can be stopped and restarted without delay.

The hub of the star-shaped NoC is at the same location as the root of the TagN tree, and the two networks are routed together.

Example—the Control Network (Tag Network-TagN)

TagN complements the NoC by carrying control information. It utilizes the clocks and regeneration stations of the NoC and can therefore operate at the same high frequency. It uses one output line, on which commands and associated parameters are communicated serially, and one input line, on which command responses and interrupt requests are received. They are not used simultaneously, instead one of them is held low while the other is used. Unsolicited sending to the root, i.e. interrupt requests, are allowed only when a command has set a status bit that allows it, and that command has ended and the cluster sees that the outward tag line is low.

The TagN line follows the NoC data and clock lines but it is not a star network. The TagN outgoing signal continues, after resynchronization, in both outward directions from each branching point in the NoC tree, and thus reaches all clusters simultaneously, with the same control information to all.

The root is the master, the cluster controllers are the slaves. GPP can address any group of clusters—from one to all, using 8 bytes with one bit for each cluster, and then send a command to the addressed clusters. The command can concern a transfer to be done. It can be issued well in advance, even when a preceding data transfer is in progress, and give the cluster(s) the parameters needed, i.e. direction, start address and length. The data transfer itself can later be triggered by a short command without addressing.

A command can also concern reading of status information from a cluster. Then, after this command, when the TagN line is low, the addressed Cluster Controller (CC) outputs its clock on the inward clock line (if it is not already active there due to an inward data transmission) and sends its response on its inward TagN line.

Inward TagN lines are ORed together when they combine in the branch points, allowing one cluster to get its signal through when the others are idle. A read command can be issued to more than one CC if the expected response can be only 0 or 1, and the responses are then logically combined (AND/OR) in the branch points. Depending on polarity chosen by the command, the response can mean either that all are responding or that none is responding.

Example—The NoC

The high bandwidth data transport may be controlled at low level by autonomous logic controllers (state machines) built from counters and gate logic and clocked with the root clock (e.g. 1200 MHZ). These receive simple commands from, and deliver status information to, the "I/OBus" of the GPP, a simple 20-signal interface directly controlled by the GPP microprogram and supported by I/O instructions in the instruction sets.

The Network on Chip (NoC) is a star network of high-speed (e.g.) 8-bit wide half-duplex data channels, one for each cluster. The channels may use one signal line per bit, or one in each direction like the tag network. This is up to the physical design, and it does not change the way the system works.

These signals are routed as a hierarchical tree, which has the effect that all paths can have the same length.

In order to reach high bandwidth per signal line, a high transfer rate (e.g. 1.2 GT/s) is used and the signals are regenerated at regular intervals and resynchronized in each branching point using a clock signal that follows the same path. The distances between these regeneration points are not longer than the extension of each cluster tile, which means that the high clock frequency specified for the internal logic of the tile, 1.2 GHz, is also usable for the NoC transfer. The clock signal following the channel tracks may be, e.g. a 600 MHz symmetric square wave, where both edges are used for clocking. The interval between clock transitions is therefore not shorter than those of the data or tag signals. A second clock signal, with higher frequency, may be distributed in the same way. It will be used for creation of the local higher frequency clocks needed by the PEs.

The source of the outgoing clock signals is the clock that is also used for the root system. The outgoing clock signal follows the branches of the tree, and it is received and used by each cluster controller, which also uses it for generation of the clock for its PEs. The outgoing clock is therefore active all the time.

For inward data, each cluster sends, when needed, its clock as an inward clock signal on a separate line in its NoC connection. This may be reduced to one inward clock at the regeneration in each branching point (where two practically identical clocks meet). At the root, this clock is used to latch all 64*8 data signals before they are entered into the NoC register by the root clock. For general information on resynchronization, reference can be made to [1].

Often, all or at least many of the cluster nodes are sending at the same time, and the cluster nodes may perform the transfer by using its own inward clock signal. The inward clock can be sent with data (NoC and/or Tag) if it is required to regenerate it on the way to the next branching point (the branches get longer closer to the root). There may be differences in phase between different clusters. It is reasonable to assume that the phase difference is larger as the distance between clusters in the tree gets larger. The phase difference between two clusters that are connected to the same outermost branching point is the smallest possible, since both clusters get their reference from this relatively close branching point. In this branching point, it is advisable to use the outward clock (being the current reference clock in that point) to synchronize inward data (NoC and/or Tag) and as inward clock that is accompanying data on the next step inwards. This clock is a common reference for both nearby cluster nodes, and the flanks of this clock are located in time just before the cluster's own clocks, and thus ideal for regeneration. The same reasoning and implementation are used on the next level, when two such combined inward clocks meet. In this way, secure synchronization is ensured all the way to the root.

In a particular example, data to/from each cluster is transferred as complete CM words, here 16-byte units, i.e. a sequence of 16 transfers on the byte-wide NoC channels. This sequence can (by setting a bit in a control register) be extended to 17 cycles, in which case the extra byte is an LRC code (Longitudinal Redundancy Check) based on the 16 data bytes. At some (perhaps many) points in time of the process the NoC transfer rate does not need to be the highest possible (because the PEs are busy processing), and this mode should then be chosen. It may of course be chosen also in other cases if highest possible speed is not needed. It is used (at least) by a process that monitors the quality of service. If high reliability is needed, then the CC should react on a data transfer error by requesting (through the Tag Network) retransmission of the block. The tag line will normally be free to use for such request during the transfer, and the transfer can therefore be stopped immediately, without waiting for the end of the block.

"Hiding" the Transfers

The NoC transfers can often be "hidden" by being done while the PEs work with code and parameters that have been transferred earlier and/or with data (activations) that they themselves have created in local CM. If this previously started work needs sufficiently many cycles it may completely "cover" the NoC transfer time, which will then not add to the total execution time. However, we must avoid NoC transfers as much as possible by making good use of the cluster memories.

This needs to be studied, using relevant DNN models. See Appendix A, for a description of layer fusion.

Examples—PE Sharing of the Cluster Memory

By way of example, a peak total number of bytes/second consumed by the 64 PEs in one cluster is 307 billion if 2.4 GHz PE clock is used. This is much more than the bandwidth the shared cluster memory could reasonably have, and high utilization of the PEs therefore requires that operands must be stored in local scratchpads and reused as much as possible.

Normally, the scratchpads are many and they must be small. Due to the lean design, the PE cannot use its MAC while the scratchpad is being loaded from the shared cluster memory. For high utilization, this loading must be fast compared to the consumption of the loaded data at the high speed.

Fortunately, most of what is transferred is kernel parameters that are the same for all PEs. They have been broadcast via the NoC to the CMs, and they will, when needed (and in smaller portions), be broadcast from each CM to its PEs. This reduces the bandwidth requirement of the CM considerably, but not for the PE.

The PE, however, needs only its own, relatively small, part of the other data, that which is local for its part of the tensor being processed (typically being a small part of the x- and y-dimensions and extending through all or part of the z-dimension). But the PE sometimes needs to read CM contents repeatedly.

The transfer mechanism must be efficient and have very high bandwidth. It must utilize broadcast, i.e. transfer such data to all PEs simultaneously and thereby much faster, and the connection between CM and PE, especially in the direction from CM to PE, must be much wider than that of the NoC channel and the PE data path.

Examples—PE Microcode

As an example, 64 (or more generally M, where M is an integer) PEs are connected to each CM (Cluster Memory), e.g. as shown in FIG. 10.

The work done in the PEs is preferably coded mainly in pure microcode, although something similar to software instructions can sometimes be used, since the functions needed for that are inherent in the basic PE core and can result in more compact code. However, the "instruction set" will then typically be extremely small and extremely special ("domain specific"), defined for the task at hand. The PEs can efficiently replace parts of their microcode in runtime. This ideal for neural network processing, which consists of a long sequence of different transformations of big data structures.

The GPP does not need to know anything about this code. It will transfer it into the cluster memories when needed, just like it transfers CNN kernels (or FFT coefficients) when those are needed. The PEs will then fetch the code to their microcode caches, just as they fetch operands (tensor and kernel elements) to their scratchpads. Microcode in CM is typically overwritten for each new layer, just like operands that are no longer needed.

Examples—Throughput vs. Latency; Clock Frequency

The described accelerator design has many processor cores and is optimized for throughput. For example, the proposed processor core design is fully microprogram-controlled and typically has no L1 cache, which makes its clock frequency very dependent on the frequency that SRAM blocks can support. The speed of logic has developed at the same rate as SRAM speed, and the clock frequency limit of a logic design is not as fixed as that of a memory block of given size. When deciding on a target clock frequency for a processor migrated to finer technology, it is therefore sufficient to study the possible clock frequencies of the needed SRAM blocks.

This study assumes that the fabrication technology is GlobalFoundries 22FDX, for which higher throughput per watt can be achieved at the cost of reduced clock frequency (i.e. longer latency), by proper choice of supply voltage and bias voltage. We assume here that the supply voltage is 0.8 V for those SRAMs that set the limit for clock frequency.

SRAM performance data has been generated for many configurations, using a memory compiler from a SRAM IP vendor. Most important for performance is the PE clock, which we select to be as high as is reasonable for the small scratchpad SRAMs. For the much bigger memories CM and RM, however, we need to use bigger and more efficient SRAM instances and those have lower frequency limits. The Cluster Controller (CC) can double the CM frequency to generate the clock for its PEs.

For an implementation with maximum energy efficiency, the supply voltage should be reduced. It can for example be reduced to 0.5 V or perhaps even 0.4 V, but the frequencies then need to be reduced, perhaps to one half. To achieve the same throughput, the number of PEs would then have to be doubled, by doubling the number of clusters, which will almost double the total silicon area of the accelerator. But the energy consumption per inference will be reduced, which means that the supply current will be reduced in spite of the halving of the voltage. The supply current needed per mm2 will be much less compared to the design for 0.8 V, and the heat generated will be reduced even more. However, the manufacturing cost will increase.

With 0.8 V supply voltage, the NoC can be clocked with 1.2 GHZ and the PEs with 2.4 GHZ, resulting in up to ~20 Top/s (trillion operations per second)=~10 Tmac/s.

In the following, a number of non-limiting implementation examples will be described.

IMPLEMENTATION EXAMPLES

Examples—the GPP and its Interfaces

By way of example, the control processor such as a GPP like a dual-core processor at the root may be equipped with an ISAL instruction set, with added instructions for handling one or more of the following:
  accelerator control
  vector and matrix operations
  data compression/decompression
  signal processing (FFT)
  Java and Python interpretation
  interfaces
  test
  initial program load
  security
  monitoring
  debugging.

For example, the GPP may be a general-purpose variant of the type of processor described in Appendix A, a dual-core processor similar to that of the existing "Imsys" 65 nm IC, using a patented method of memory sharing (U.S. Pat. No. 8,060,727, "Microprogrammed processor having multiple processor cores using time-shared access to a microprogram control store", which is incorporated herein by reference) and also including power management functions that were implemented in a later 180 nm test chip.

As an example, it is responsible for system start, debug support, diagnostics, fault monitoring, security, power management, I/O interface control, as well as the high-level control of the execution of the dataflow process.

It may have a firmware ROM memory with special microcode for the above-mentioned functions and implementing software Instruction Set Architectures (ISAL+ISAJ) for its LLVM standard instruction set and for direct bytecode interpretation of Java/Python respectively. Most of the microcode is well proven and can be used with suitable modifications and recompilation.

The ROM may also include software-level code (firmware compiled from C/C++ or other language), for I/O control, basic OS functions, etc.

In this example, the primary memory (PM) for the GPP is also on-chip. The GPP sees it as one 128-bit wide memory, from which it can read 128-bit microinstructions or the same size word containing up to 16 instruction bytes or data bytes, or it can write—or read-modify-write—up to 16 data bytes. However, for example, the PM may include a ROM (if this is 16K×128 it is <0.56 mm2) and four 128-bit wide SRAMs. When the GPP steps through consecutive addresses in the RAM part of its PM address range, it steps the SRAM instance number before it steps the address to the SRAM instances.

The RAM part of the PM has a 512-bit wide interface to the Central Bus of the accelerator. When data is transferred over this interface, the four 128-bit words that are transferred will have consecutive addresses as seen from the GPP.

Through this interface, the GPP can efficiently read and write in the Root Memory and can use it as a buffer when exchanging blocks of data with the host system. It can initiate the high-speed transfers of parameters and data between the NoC and the high-speed interfaces, including DDR, via the Root Memory, but cannot itself read or write at such data rate. The GPP can issue commands and read status for low-level controllers in the root part of the system and, via the NoC also reach cluster controllers and indirectly PEs.

The GPP can, via the low-level controllers, interrogate and control the PEs, e.g. for debug, using the two networks. Thus, it can address a cluster memory (CM), and by accessing memory-mapped registers communicate both with a given PE and with the cluster controller (e.g. to get the ID of a PE requesting attention).

Logic at the CM interface decodes special addresses that are used for this, i.e., memory mapped registers used to directly access a PE through the NoC. These addresses are in a range close to 0, where also the default microprogram start address is.

Unified Memory

By way of example, the GPP may have two cores, which share control store and primary memory in a patented way (U.S. Pat. No. 8,060,727). Through a further new development, these are also unified, meaning that microcode is contained in the primary memory. The unified memory includes both ROM and SRAM, which are accessed as one memory, where ROM and SRAM occupy different address ranges.

In a particular example, some of the microcode is dedicated optimized code for above-mentioned functions and other microcode implements software Instruction Set Architectures (ISAL+ISAJ) for an LLVM-optimized standard instruction set and for direct bytecode interpretation of Java/Python respectively. Much of this microcode is well proven and can be used with only small modifications and recompilation.

For example, the unified memory may be 128 bits wide and can be accessed at high frequency. By using several memory instances that can be accessed partly simultaneously, i.e., with partly overlapping cycle times, the frequency of access to SRAM words can sometimes be higher than the maximum SRAM access frequency of each memory instance. This is particularly useful for accessing microcode. Each core has a buffer for microcode. It will typically transfer sequences of 128-bit microinstructions to this buffer when needed. Most often this will be microcode for implementing instructions that are not sufficiently small and/or frequent enough to be included in the ROM part of the memory. One important advantage of this is that continued development of microcode is not limited by the size of a dedicated microcode SRAM. The primary memory, needed for software and data, is always bigger that what is reasonable for a dedicated microcode SRAM.

The replacement of microcode in the buffer is controlled by microcode in ROM, sometimes automatically, somewhat like the automatic microprogrammed handling of the evaluation stack buffer in Imsys' JVM implementation, and sometimes initiated by commands inserted by the compiler.

In a particular example, the ISAL instruction set contains over 1100 opcodes, and the instructions may include one or more bytes, never more than 16. The compiler arranges the object code into a sequence of 128-bit words, each containing as many instructions as can be packed into the word, i.e., instructions never cross the 16-byte boundaries.

The GPP cores read such words into a prefetch buffer, from which they read the instructions to execute.

By way of example, the ROM contains not only microcode. It also contains software-level type of code (system software compiled from C/C++ or other software programming language), for I/O control, basic OS functions, etc.

Thus, the on-chip unified primary memory (PM) is seen by the GPP as one 128-bit wide memory, from which it can read 128-bit microinstructions or the same size word containing up to 16 instruction bytes or data bytes, or it can write—or read-modify-write—up to 16 data bytes. However, the PM may include a ROM (if this is 16K×128 it is <0.056 mm2) and four 128-bit wide SRAMs. When GPP steps through consecutive addresses in the RAM part of its PM address range, it steps the SRAM instance number before it steps the address to the SRAM instances, which allows higher access frequency. Logic detects if successive accesses are done in the same instance and adjusts the access time accordingly.

Peripheral Interfaces

All logic and microcode for peripheral interfaces of IM3000 can be included or at least offered as optional IP blocks. This includes any of the interfaces that are available on- or off-chip in Imsys Velox and some Qulsar products, e.g. video/audio input/output, efficient configurable high resolution TFT display driving (e.g. for a pathology workstation), and Gigabit Ethernet with IEEE1588 timestamping (which may be of interest in an automotive system). One of the cores is responsible for the internal operation of the accelerator, the other for I/O, system monitoring, etc.

There will probably not be any analog circuitry from IM3000 on the chip but the digital parts of the sigma-delta ADC and DAC designs can still be used; their serial bitstream interfaces will then connect to external integrator/comparator and filters, respectively. This is a technique recently introduced in modern microcontrollers (see, e.g., AN4990, "Getting started with sigma-delta digital interface", from ST).

Some GPIOs will be kept, with connections to the timer system for PWM input/output, timestamping, etc., and SPI/I2C and UART serial interfaces will also be retained.

The DRAM interface should also be retained in silicon, to simplify for legacy firmware, even though it may disappear in future accelerator systems. (The cost of the logic is low, since all its complexity is in microcode, and the chip will have room for many pads.)

The 10/100 Mbps Ethernet will not be needed, since we will rather choose the 1 Gbps Ethernet instead, which has until now only been implemented in FPGA. Both are Imsys designs and well proven.

The CRC hardware from these designs could perhaps be used also as a separate block, made a little more general, turned into something like Hyperstone's "Galois Factory coprocessor", which can be used for efficient computation of checksums. This might be worthwhile because of the big amount of fixed parameter information, which needs to be checked.

Debug, Startup, Power Management, Non-Volatile Memory

The debug port will be present. There will also be interface for relevant flash chips, including eMMC and SPI flash, which can be selected as boot sources. However, if non-volatile memory is needed for millions of parameters, then devices with higher bandwidth will be used, e.g. SSD, and these can be accessed through PCIe or USB 3.2. On-chip MRAM, which is available for the GF 22FDX fabrication process, should also be considered.

The GPP subsystem will have its own power domain; it will be possible to power it up before anything else is powered. There exists at least one library of $3^{rd}$-party standard cells for switching the supply voltage for different parts of the IC and changing the bias voltage to get the best trade-off between power consumption and performance, and the GPP will use such cells for the controlling operating point of different regions of the chip as needed. The GPP will also measure chip temperature and will take that into account in the power management.

GPIOs and SPI interface will be usable for controlling external power supplies, to ensure safe startup and operation. The IO Bus will be brought out, allowing for external expansion of the I/O system for both DMA and programmed I/O. This will be used, e.g., in the case when an FPGA is connected at the root, in a system with a cluster of accelerator ICs.

DMA

The DMA controller may use a buffer memory that is softly divided into several FIFO buffers, one per I/O channel. Sizes and directions are set by the microcode. 10/100 Mbps Ethernet, as an example, uses two input channels and one output channel. Each channel has an I/O side, controlled by automatic logic exchanging request/acknowledge signals with the external device, and a processor side controlled by the microprogram, which monitors the counter states without involving software. The DMA system will be modified such that FIFO buffer areas reserved in the 512-bit wide Root Memory can be created, and that it will be possible to set up transfers between I/O units, and between I/O units and the NoC, through these buffers. Such transfers should not pass through the GPP, but this processor handles the high-level control and monitoring of them. The GPP can transfer data to/from these buffers, and also to/from any other part of the Root Memory, via its primary memory, which can exchange data with the Root Memory, 64 bytes at a time, over the Central Bus.

DDR

The DDR interface may be a 3rd party DDR5 interface block. DDR5 is the greatly improved generation that will become available this year. A DDR5 component can be 16 bits wide and can have up to 8 GB capacity at up to 12.8 GB/s bandwidth. A standard module has two independent channels, each 32 bits wide, and can have up to 64 GB capacity at up to 51 GB/s total bandwidth.

We may also need to consider having an alternative interface for DDR4, because we don't know when DDR5 for automotive temperature ranges will be introduced. (DDR4 is available for up to 125° C.) We have here chosen, primarily, 16-bit width for both cases, which means we are using one component rather than a module. One component can give us enough capacity and bandwidth for a system of this size. Note that we can build larger systems out of several of these systems, expanding "in the root direction" through the PCIe interface. In such an expanded system the root can be controlled by a high-end FPGA and use larger storage, e.g. multiple DDR modules or HBM (High Bandwidth Memory) stacks and/or RoCE (Remote DMA over Ethernet).

Note that if a standard DDR module is used, instead of a single component, then the root memory capacity is less important since DDR can take over much of its role without reducing speed, but DRAM accesses consume more power than accesses to on-chip RAM.

On-chip support for ECC (Error Correcting Code) and error check and scrub (ECS) is included in the DDR5 standard. Assuming it works like in GDDR5, it generates 8 bits of ECC based on a 64-bit burst, i.e. 2 bytes for each sequence of 16 bytes, and since it is built into the chip, it should work even if we use just one component rather than a module with 4 or 8 components. Presumably the entire parity bit generation and analysis is built-in. ("DDR5 also features one-die error-correcting code, post-package repair, error transparency mode, and read/write cyclic redundancy check modes.")

Interface Blocks for External I/O

Ethernet

As mentioned, the GPP can, without further development, be equipped with any of the proven interfaces that exist for the IM3000 processor. This includes Gigabit Ethernet (including precision timestamping, which can be used for Automotive Ethernet).

For higher speed Ethernet (10G/25G/100G) a 3rd party IP block will be interfaced to the 512-bit central bus in the accelerator. The chip edge will have connections for two (?) SFP28 ports, which can be used for both Ethernet alternatives.

PCI Express (PCIe)

A 3rd party interface block for Gen. 5.0 will be used. Its bandwidth is 3.94 GB/s per lane. Four lanes will be sufficient; the total bandwidth will then be 15.7 GB/s. Non-volatile memory can be attached to this interface; there are now SSD available with up to 5 GB/s.

USB 3.2 and USB4

This may also be of interest, as a 3rd party IP block. USB 3.2 is the new, greatly improved generation. It uses the new compact Type C connector and can transfer up to 2.4 GB/s and supply current in either direction. It can be used with many kinds of peripherals (including converters to HDMI for monitors). It is suggested that two USB 3.2 interfaces are included on the chip or, perhaps more appropriate, USB4, which is the next, further improved standard.

Examples—Networks Connecting GPP to the Clusters

Networks for control and data are separate but share clock signals and physical routing. They may include one or more of the following:
Control (Tag) network
NoC Register and controller
Switch Block
Data channels.

Example—Control (Tag) Network

This network is used for transfer of commands and status information. This may be related to data transfer to be done on the NoC, or control of the cluster controller, which handles the CM and its interface to the PEs of the cluster.

The Tag network uses bit-serial communication and is organized as a hierarchical tree, with logic (for the inward line) in each branching point. It adds one half duplex 1-bit wide channel to the 1 to 64 bundles of half duplex 8-bit wide data channels.

In the outermost link, connecting to a cluster, there is one 8-bit wide data channel and one 1-bit wide tag/control channel, but in the next level of the tree there are two 8-bit wide data channels and still only one tag channel. For each level closer to the root, the number of data channels double. Finally, in the trunk of the tree there are 64 data channels and one tag channel.

The clock lines used for the data channels—an outward clock and an inward clock in every link—are used also for the tag network. Amplification and resynchronization is done the same way for data and tag channels. However, the data channel signals are not changed in the forking points of the tree, they are just forwarded, while the outgoing tag signal is copied to both outgoing branches, and the inward tag signals combined with OR.

Start of Data Transfer

Although the two networks, i.e. the control network (TagN) and data network (NoC), share resources and are routed together, what is communicated on them at any point in time is in general not directly related. However, there is one exception—the startup of the transfer of a data block on the NoC. When all needed control information for the data transfer has been communicated over the tag line and the root wants to trigger the actual transfer, it issues a short Start command. When that ends, the data transfer starts. If needed for an efficient solution of the cluster control logic, there can be a fixed delay (a few clock cycles) before the first byte is transferred. The cluster controller already knows the length of the transfer (always a multiple of 16 bytes). Both sender and receiver thereby know when the transfer is complete.

The NoC Register and Controller

The high bandwidth data transport is controlled at low level by high-speed control logic-Finite State Machines (FSMs)—clocked by the root clock (1200 MHZ). This control logic is normally included in the Switch block. It receives simple commands from, and delivers status information to, the "IOBus" of GPP, a simple 20-signal interface directly controlled by the GPP microprogram and supported by I/O instructions in the instruction sets.

The purpose of the NoC register is to guarantee the Switch block and the NoC channels a full clock cycle for any transfer, regardless of which bus client is communicating with the NoC. Another important purpose is to hold data during broadcast.

The register is loaded either from the Central Bus or from the Switch block.

These blocks and the register and the two networks are controlled by the above-mentioned control logic, which also selects who should drive the bus and which mode should be used for the switch.

The Switch Block

The switch block may be regarded as part of the Network on Chip. In addition to the abovementioned control logic, this block may include e.g. 512 (more generally J, where J is an integer greater than or equal to 2) more or less identical switches and the additional logic needed for controlling those to support the various transfer modes described below:
1. Broadcast
2. Store CM data in RM or DDR
3. Retrieve stored data to CMs (also used for initial image load)
4. Exchange overlap data
5. Hypercube.

Data is mainly transferred between cluster memories and either the on-chip Root memory (RM) or DDR. An alternative to DDR can be other storage media, accessed via, e.g., PCIe or high-speed Ethernet. Especially for mode 1, non-volatile storage (flash memory) can be used for parameters.

For modes 1 and 3, the direction is outward toward the clusters, for mode 2 it is inward from the clusters, and for the others it is inward immediately followed by outward.

By way of example, RM may be 512-bit wide and clocked by the root clock (1200 MHZ), and one such RM word can be transferred by the NoC channels in each clock cycle. The word is then divided into 64 bytes, one byte for each cluster.

Examples of different modes of NoC data transfers and the corresponding operating blocks and their uses are described below:

Mode 1

The Switch block has some logic dedicated to support broadcast. This is an 8-bit wide multiplexer, selecting one byte at a time from the 512-bit (64-byte) wide NoC Register and sending it to all 64 clusters in parallel. Each cluster thereby receives data at full bandwidth, e.g. 1200 MB/s, all together 77 GB/s, while the NoC hub reads only 18.75 million words/s from, e.g., Root Memory or DDR, i.e. using<1.6% of the cycles of the Central Bus.

Using Broadcast for Fully Connected Layer

Efficient processing of a fully connected layer requires all clusters to exchange a small amount of data, typically one byte, such that every cluster gets all this data in its memory. This can easily be accomplished by letting all clusters first simultaneously send their byte to the NoC Register (as in Mode 2), and then receive all 64 bytes through broadcasting (Mode 1). This can of course be repeated if more than one byte is needed (which is nowadays uncommon).

Modes 2 and 3

Mode 2 is used for sending data from clusters for storage in RM or DDR (or possibly external storage connected to PCIe), and Mode 3 is used later to retrieve it. Each cluster will have its data stored as one byte-column, i.e. in a certain byte position in each one of many 64-byte words. This order is perfect for the retrieval via the NoC, even though it might otherwise be awkward.

Data is exchanged between all clusters and the memory. Each cluster saves some data (all save the same amount, simultaneously), and then they retrieve the same data. This is like giving each cluster its own secondary memory, one byte wide, where it can store data and then retrieve it in the same order (or perhaps different order if needed). It is not a natural order for receiving an image from outside or delivering the final result, since each 512-bit memory word contains one byte for each of the clusters.

The address where to store (same for all) need not be known by the clusters. The Root memory is addressed by one of several dedicated address counters, which can be loaded and (perhaps) read by their respective users (controllers). Accessing the memory is often associated by automatically stepping the counter.

There are two natural ways to store multiple words of data. The address counter hardware can easily support both. One is LIFO (Last In First Out, word by word) like putting objects on a stack, which is simpler in some situations (see Mode 4), but the memory words are written and read in different directions. The other is to always increase the address for each accessed word, but this requires more administration. The memory is then often divided into sectors, which can be allocated and deallocated.

Mode 4

For 2- and 3-dimensional convolutions, the regions need to send some data one step to the right, and some other data one step down. This is overlap edge data that needs to be shared with neighboring regions to the right and below. In addition, there is a need to share corner elements obliquely to the right downward, but this can be done in two steps (right+down). For example, the Switch block may include 512 switches, which work like railroad switches with shared control. By way of example, three data transfer settings may be used for the execution of a convolutional neural network or similar data flow application:

no change (normal setting);

move to next region in positive x direction if outbound, else opposite; and move to next region in negative y direction if outbound, else opposite.

The first setting is used for all transfers except for the exchange of overlap data between neighbouring regions. Using this normal setting, all the clusters can simultaneously store and retrieve data in Root Memory, using full NoC bandwidth, i.e. 1200 MB/s per cluster, for a total of ~77 billion bytes/s to/from Root Memory.

Using the second and third settings, messages can be transferred between the regions. This is Mode 4.

All regions send their messages (an integer number of cluster memory words) in unison to the root memory using the normal setting, and then the switches are set to the "right" or "down". The messages are then transferred back through the switch block to the desired destinations, and the switches are reset to normal. Transfer in the opposite direction can be done by using the second or third setting for the transfer to root memory and the normal setting for the return.

Note, for transferring multiple words (i.e. multiple bytes per cluster, which will always be the case when transferring cluster memory words), that LIFO stack way of storing is suitable in this case.

Mode 5

Even though it is not needed for the typical CNN inference process, a Hypercube type of data exchange is useful in some algorithms. This can be accomplished by a set of multiple (e.g. 6) settings. For more information on the Hypercube concept as such, reference can be made to . . . For example, a particular setting exchanges data between clusters having binary ID number abcde0 and abcde1, for all a, b, c, d, e, which means that clusters #0 and #1 exchange data, but also #2 and #3, and #4 and #5, etc. Each even-numbered cluster exchanges data with the cluster having the same ID number except for its least significant bit being 1. Another setting works the same way, except that all clusters numbered abcd0e exchange data with cluster numbered abcd1e with the same a, b, c, d, e. The other settings work in the same way, with other bit positions. Thus, the first of the six settings exchanges data between even and odd clusters, while the sixth setting exchanges data between the 32 lowest numbers and the 32 highest.

By using these settings we can, in seven cycles, let every cluster receive one byte from each one of its 6 nearest neighbors in a 6-dimensional hypercube. The first cycle would transfer one byte from each cluster to the NoC register, and the following six would copy back with the six different pair-wise exchanges.

Examples of Data Channels of the NoC Network

The NoC channels transfer data bytes between the root and clusters. At the root, the source/destination is the 512-bit NoC register, where each byte position corresponds to one of the 64 (M) clusters. In each cluster, the destination/source is one of 16 eight-bit registers in the Cluster Controller (CC).

These 16 registers are used in sequence, and when they all have received data from the NoC channel, the accumulated 128-bit word (16×8) is written into the CM. If transferring in the opposite direction, the 16 registers are loaded from CM and their contents are then transferred over the channel in sequence.

For simplicity, NoC transfers involve all the clusters (unless some are disabled from participating), and each cluster does the same thing as all the others, simultaneously.

Routing of the Networks

FIG. 11 is a schematic layout sketch showing an example of one half of a PE array and its root system including RM, GPP and interfaces. The second half is to the right; only a small part of it is shown. The two halves are identical, except for the direction of their network link to the root. In this example, 1024 PEs (512×2) are connected by the NoC. Although having different structures, the NoC data network and the tag network are routed together.

As an example, a 2048 PE system can be built by putting the two 512-PE blocks (each with a pair of PEs, like a dual-core block) together, replacing the central system with a branching point, and then copying the resulting 1024-PE block above or below, with a new central system, with bigger RM, as a horizontal bock between them. This can be repeated, copying horizontally, creating a 4096-PE system with the central block vertically oriented again, like it is in FIG. 11.

By way of example, the network tree connects a cluster tile (in its midpoint) at each endpoint, and each tile has 32 PE pairs. All cluster connections have the same path length to the root connection. Each CM is divided into sixteen 2K×128 bit SRAM instances. PE pairs and CM are close to the CC with its NoC connection in the middle of the tile. There, in the middle, is also the clock generator for CC and all the 64 PEs. It gets its timing from the NoC connection. Each PE sees the memory instances as one memory with 32 K words of 128 bits.

In this example, the NoC is a starshaped network connecting the Switch block with the 64 (or more generally K≥2) clusters, with an (8-bit wide) signal path connected to each cluster. In the cluster end, the data is transferred to/from one of 16 registers of 8 bits each. These together form a 16-byte register, which exchanges data with the cluster memory at certain points in time under control of a simple arbiter (also referred to as an allocator or access controller), which also controls the transfers between cluster memory and the 64 PEs that share the cluster memory. Associated with the cluster memory and arbiter is also a mux/demux (or corresponding) logic selecting the 8-bit register, based on the current state in the multi-cycle transfer.

By way of example, each of the 8-bit wide NoC paths, or channels, is a point-to-point connection. Since the communication is only half duplex, the two directions could use the same signal wire between the regeneration points. However, presumably the idle driver in the receiving end will add to the load, which means that higher signal current will be needed. A perhaps better alternative would be to use two wires, both of which drives only a receiver input. The unused driver should then drive its wire low during transfer in the opposite direction. That wire will then act like a shield, allowing the wires to be closer together. This would be just like the two tag lines, except those are combined in different ways in the forking points, while the NoC data channels are only forwarded.

In a particular example, the data channel signals may be routed in a tree-like pattern between the cluster tiles, and they are regenerated by flipflops (or latches, which consume less power) at every fork point along their path, using a clock signal that travels alongside the data signals. Clock and data signals are also amplified in every tile corner between these points. This allows the same high data transfer rate as is used internally in the tiles. The increased latency due to resynchronization does not matter, since the typical data blocks are big.

The same frequency is used by the root system in the other end of the data channels. This should also not be a problem since the dimensions of the root logic are not bigger than a cluster tile and the GPP is built on the same basic processor core as the PEs.

In computer technology, electronics and synchronous digital circuits, a clock signal alternates between high and low states and is used like a metronome to coordinate the actions of circuits.

Normally, a clock signal is produced by a clock generator. Although more complex arrangements may be used, one of the most common clock signals is a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle.

Most integrated circuits (ICs) of sufficient complexity use a clock signal in order to synchronize different parts of the circuit. In some cases, more than one clock cycle may be required to perform an action. As ICs become more complex, the problem of supplying accurate and synchronized clocks to all the circuits becomes increasingly difficult.

A clock signal might also be gated, i.e., combined with a controlling signal that enables or disables the clock signal for a certain part of a circuit. This technique is often used to save power by effectively shutting down parts of a digital circuit when they are not in use, but this comes at the cost of increased complexity.

In an example embodiment, a clock signal from the root is included in the signal bundle. The signal is symmetric, and its frequency is one half of the root and cluster tile clock frequency, but both of its edges are used for clocking the transfer of bytes through the channels.

The outbound clock is received and used by the cluster not only for receiving from the NoC but also to generate the internal clock for the CC (cluster controller) and the CM. The CC also receives a higher frequency clock signal, synchronous with the first, and it distributes both clocks to all its PEs who, in the example system uses twice the CM frequency and for parts of the logic also four times the CM frequency.

When the NoC changes direction to inbound (such a change is normally done by first going to idle state) the cluster will use its own clock for transferring data toward the root. This inward clock signal will, like the outward clock, follow the data line bundle, but in the opposite direction. This clock will be used at the root to receive the inbound data.

NoC Transfers

The clock, which is routed together with the signal lines, is generated by the transmitting side, but the hub of the star, at the root of the tree, initiates all transfers. The PEs work independently from the NoC; they have no contact with it. The compiler must organize the work such that the PE will have access to code and data and parameters in CM when they need it and/or have space where to write their results.

Note that latency of the NoC transfer (caused by repeated resynchronization of the signals along the signal paths) is of no importance (due to high frequency and big data blocks); what is important is that the bandwidth is sufficient.

For example, there may be three types of transfers that can be massive, involving large parts of the memory capacity in all participating clusters:
1. Broadcasting code and application parameters such as kernels to at least a subset of or all clusters;
2. Transfer of individual data contents to at least a subset of or all clusters from the root (e.g. when an input image is distributed or when taking back a feed-forward layer from storage; and
3. Transferring individual data contents from at least a subset of or all clusters to the root (e.g. when storing a feed-forward layer or delivering the result of an inference).

The bandwidth we actually need at the leaves depends on how much of the transfer time we can "hide", through transferring while the PEs execute operations, and of course how much extra time for transfer we can tolerate. There will, for example, be some transfer in the beginning that we cannot hide.

At the root we want the bandwidth to at least match that of the (e.g. DDR) memory we will use. For example, a 64-bit wide DDR5 module can have a bandwidth up to 51 GB/s, while a 16-bit wide DDR5 component can have 12.8 GB/s. Our root bandwidth of 77 GB/s seems to be a good choice. It is, as mentioned, possible to do trade-off between speed and energy efficiency by optimizing the choice of supply and bias voltages. Note that these voltages can be different in different parts of the system, and at least the bias voltage can even be changed dynamically, i.e. be different in different phases of the inference process.

Transfer Rate

As mentioned, the transfer latency does not matter. The transfer rate, however, is important. If the number of times CM contents is reused is high, then the NoC will not be limiting the rate at which MAC operations can be executed. For transfers of types 2 and 3 above, we could then live with lower bandwidth at the leaves.

However, during certain periods, e.g. during initial loading of the input image, when lack of data is holding up the processing, the NoC bandwidth will definitely affect the total execution time.

The initial loading of the image may involve a special rearrangement of data in order for this to be loaded rapidly into the cluster memories.

Data Alignment

All data transfers over the NoC use 128-bit words. It may be practical to align parameter blocks to the width of the NoC register, 512 bits, i.e. four 128-bit words, which simplifies broadcast, as is seen in the description of Mode 1 for the Switch block. Broadcast will then only use 512-bit words. The NoC transfers two bytes per clock cycle to/from each cluster, which means that the 512-bit words will each require 32 clock cycles.

Examples—the Cluster Memory and Cluster Controller

Block Diagram of Cluster

With reference once again to FIG. 10, the Cluster Controller (CC) may handle the Cluster Memory (CM) and interfaces to the NoC and the PEs. It gets its clock from the NOC CLK_OUT. Its function is controlled by commands from the tag line and the PEs, respectively.

Cluster Memory (CM)

For example, CM may be a 32K×128-bit memory. It is clocked by the CC clock generated from the Outward clock signal from the NoC interface. The clock to CM is gated, such that CM current consumption is limited to leakage current when CM is not accessed.

By way of example, to the 64 (or more generally M) PEs in a cluster, the CM may be a shared random access secondary memory, in which they, under control of their respective microprograms, read and write 16-byte sectors, similarly to how a CPU reads and writes sectors on a disk. Comparing the PE schematic with that of Imsys IM3000 reveals that it corresponds to the external DRAM memory, which is the main memory rather than a secondary memory; the IM3000 reads instructions from DRAM. The PEs, executing a dataflow application, load microcode from CM for one transformation, e.g. a convolution, and then execute that internally. This microcode, when executed, or dedicated circuitry activated thereby, performs read and write accesses in CM, by issuing requests that the CC executes.

The microcode loading should normally not be done as an ordinary read, since the same CM accesses can be utilized for loading also other PEs in the cluster with the same microcode. This is then done by a local broadcast. This function is controlled by the CC, when the PEs have indicated that they are ready for it. Note that the local broadcast function is not at all related to the NoC broadcast.

Local broadcast—also called Cluster Broadcast—is used not only for microcode but also for copying other CM contents to the PEs, e.g. kernels, when the same should be sent to all.

CM arbitration (allocation/access) The CM can be accessed once per CC clock cycle, for transfer of one 128-bit wide word to or from either the PE- or the NoC-interface logic.

Seen from the CC, the PE-interface logic serves 64 (or more generally M) PEs and has much higher bandwidth than the NoC interface. It therefore needs to be physically wider. Also, sequences are much shorter, requiring the wide CM addresses to be transferred more often. Therefore, the wide data interface is also utilized for addresses, rather than using a separate control channel as is done in the NoC design.

Data transfer between PE and CM has the full CM word width of e.g. 128 bits (16 bytes), and one CM word can be transferred in every available clock cycle. A NoC transfer sequence must not be interrupted, and the CM accesses needed by the NoC interface logic therefore has priority. However, the NoC interface logic can only use one out of at least 16 cycles, since the NoC channel transfers only one byte, one sixteenth of a CM word, per clock. This means that 15 out of 16 cycles can be used for PE transfer during a NoC transfer without LRC. All cycles can be used if NoC is not active. During NoC transfer with LRC, NoC will use every $17^{th}$ cycle for CM access, which means that 16 out of 17 cycles are available for PE transfer.

Examples—NoC<=>CM Data Transfers

If NoC has no ongoing transfer to/from this cluster, then no cycle will be wasted for it, and PEs are then free to use all CM cycles. If there is a NoC transfer, then NoC will have priority even though it may thereby steal a cycle from any ongoing PE<=>CM transfer sequence. The reason is that we would otherwise need a FIFO buffer in the NoC interface, since the high-speed NoC transfer cannot be interrupted.

If neither NoC nor PEs have any need for CM access, then the clocking of CM SRAMs is disabled by clock gating, to save power.

Note that PE<=>CM and CM<=>NoC transfers are never directly related; both PEs and NoC exchange data only with CM, and not directly with each other.

In a particular example, the NoC interface part of CC addresses CM as 32K×128, i.e. with 15-bit address and with 16 bytes data width. The NoC data channel interface is only 8-bit wide, which means that 16 bytes are transferred—in 16 CC clock cycles—for every CM access given to NoC.

A counter in CC selects which one of 16 eight-bit registers connects with the NoC 8-bit channel. This counter also initiates, every 16 (or 17) clock cycles during NoC transfer, the transfer of a complete 128-bit word between these registers and CM. This process continues uninterrupted as long as the data block length counter is not zero. The counter, when wrapping around, decrements the length counter, which counts every transferred 16-byte block. The block length is always an integer multiple of 16 bytes.

Other CM cycles than those used by NoC, i.e. at least 15/16 of cycles (or 16/17 if LRC is used), are available for PE<=>CM transfers. All clock cycles are available for polling the PEs.

Optional NoC error check: The 16-cycle sequence for transferring a 128-bit word over NoC can be extended to 17 cycles. Whether this should be done or not is controlled by a bit in a control register for the NoC at the root, and also in the CC, to which it has been distributed, along with other control information, via the Tag Network. If the extended sequence has been chosen, the 17th byte is an LRC code (Longitudinal Redundancy Check) based on the 16 data bytes. At some points in the process the NoC transfer rate does not need to be the highest possible, and this mode should then be chosen. It may of course be chosen also in other cases if highest possible speed is not needed. It is used (at least) by a process that monitors the quality of service. If high reliability is needed, then the CC should react on an error by requesting (through the Tag Network) retransmission of the block.

Differences Between CM<=>PE and CM<=>NoC Transfers

The PEs are connected in a star-shaped network like the clusters themselves are. The transfers between each CM and its 64 PEs can be unicast or broadcast (multicast) like NoC transfers but they are performed differently and are not directly related to the NoC transfers.

A block that has been transferred to CM is available there to the PEs, which can, under control of their own microcode, read parts of it when needed. There is also a local broadcast function, by which data can be broadcast from CM to all its PEs simultaneously.

Compared to NoC transfer much fewer bytes are transferred each time, but the same data is often transferred many times. The same transfer rate is used, but more bits are transferred in each transfer cycle. The average total intensity of the CM=>PE flow is therefore much higher than that of the Root=>CM flow, but the physical distance the data travels is much shorter since the local read or broadcast transfers data locally inside the cluster tile. The transfers are requested by the microcode in the PEs.

Transfers over the two CC data interfaces are thus not connected. The local broadcast needs to be much faster because the same data is transferred to PEs many times. Another important reason for higher bandwidth is that CM<=>PE transfers, unlike CM<=>NoC transfers, cannot be hidden, i.e., PEs cannot perform MAC operations while they are engaged in such transfer.

When a part of a block in CM is to be broadcast to the PEs, it is CC that controls that transfer but, just like in the case of individual transfer, it does it only after it has been requested by the PEs. At a frequency of 1.2 GHZ, each CC transfers 16 bytes in parallel to all its PEs. In a 4096-PE system, the PEs together receive 64*64*16=65536 bytes 1.2 billion times per second, i.e. in total 78.6 trillion bytes/second, which is about ten times higher than the total NoC bandwidth.

Cluster Controller (CC)

Figure 12:
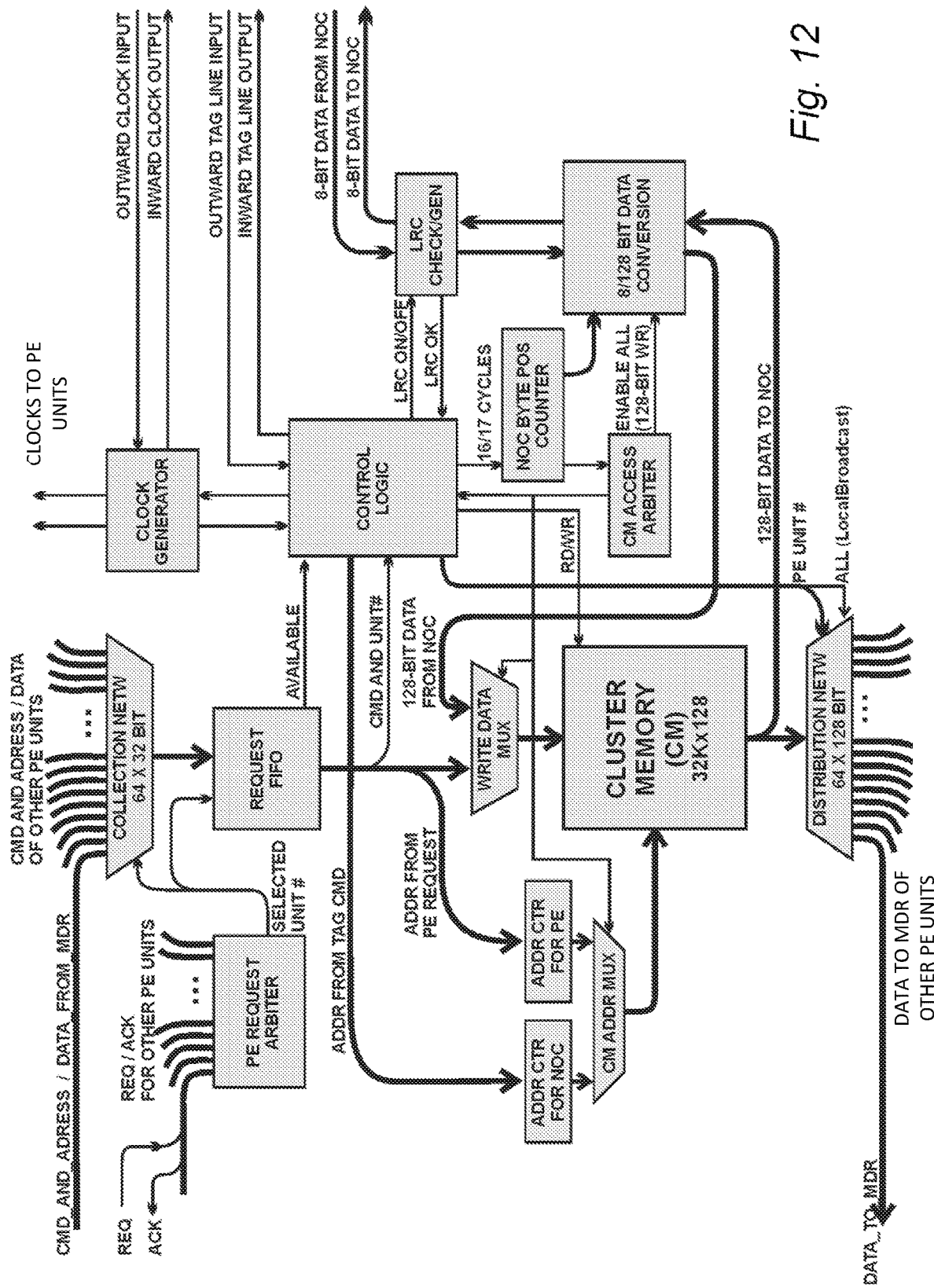
FIG. 12 is a schematic diagram illustrating an example of a Cluster Controller (CC) including a cluster memory (CM).

FIG. 12 is a schematic diagram illustrating an example of a Cluster Controller (CC) including a cluster memory (CM). The CC is basically the logic circuit controlling the CM and its interfaces to NOC and PEs. The tasks for this block may include one or more of the following:

- Executing read and write requests from PEs, using (for read) a 16-byte wide interface for the transfer and 1.2 billion transfers/s.
- Executing local broadcast from CM to PEs.
- Executing and responding to commands from the tag line. These usually specify NoC transfers to be done between root and CM. When started, these transfers have priority and will never be delayed; on the other hand, they can only use 1/16 or 1/17 of the CM cycles. (Their influence on performance is therefore small if they can be "hidden", i.e. performed while the PEs are active with their processing.)
- Generating a 2.4 GHz clock for its 32 PE pairs, and also for generating inward NoC clock whenever needed for inward NoC data transfer and/or responses or interrupt requests on the inward tag line.

Examples—Cluster Controller Interfaces

Clock Signals

By way of example, the Outward clock Input may receive, distributed with the NoC data channel from the root, a 1200 MHz clock, or a 600 MHz symmetric square-wave from which a 1200 MHz clock can be generated. This is used to drive the clock to CM and CC, including its NoC, tag, and PE interfaces. A higher frequency clock signal is also received, and distributed to the PE, which in the example system needs both 2400 and 4800 MHZ.

A second signal will also be received. Depending on physical design considerations, it has two or four times the frequency of the CM clock and is intended for the generation of the local PE clock signals. The PE logic uses twice the CM clock frequency, but the MAC units in the PE uses twice the PE clock frequency. Both clock signals are passed from the CC to the PEs, which by combining them can create its two clock signals for its control logic and MAC units.

When sending on its tag line output or NoC data output, CC outputs an Inward clock signal, driven from the CC clock.

Examples—Command/Control/Tag Interface (for Exchanging Control Information with Root System)

The incoming tag line to the CC, i.e. the Outward Tag line, is a serial data signal clocked by the Outward clock. It transfers commands and parameters (e.g. address and block length in CM words). This transfer can overlap previously initiated NoC transfer, without limitation. There is no dependence, except that a NoC transfer must have been set up by the GPP, by a message to the cluster through the tag line, before it can start. It is always GPP that requests NoC transfers, in both directions, although inbound transfers are clocked from the cluster end.

The outgoing tag line from the CC, i.e. the Inward Tag line, sends messages from the cluster to the GPP. These are either interrupt requests or responses to commands that were previously sent on the outward tag line. Inward messages are clocked by the Inward clock, just like inward NoC data transfers are. This clock line is driven only when needed.

Examples—NoC Interface (for Exchanging Data Blocks with Root System)

Figure 13:
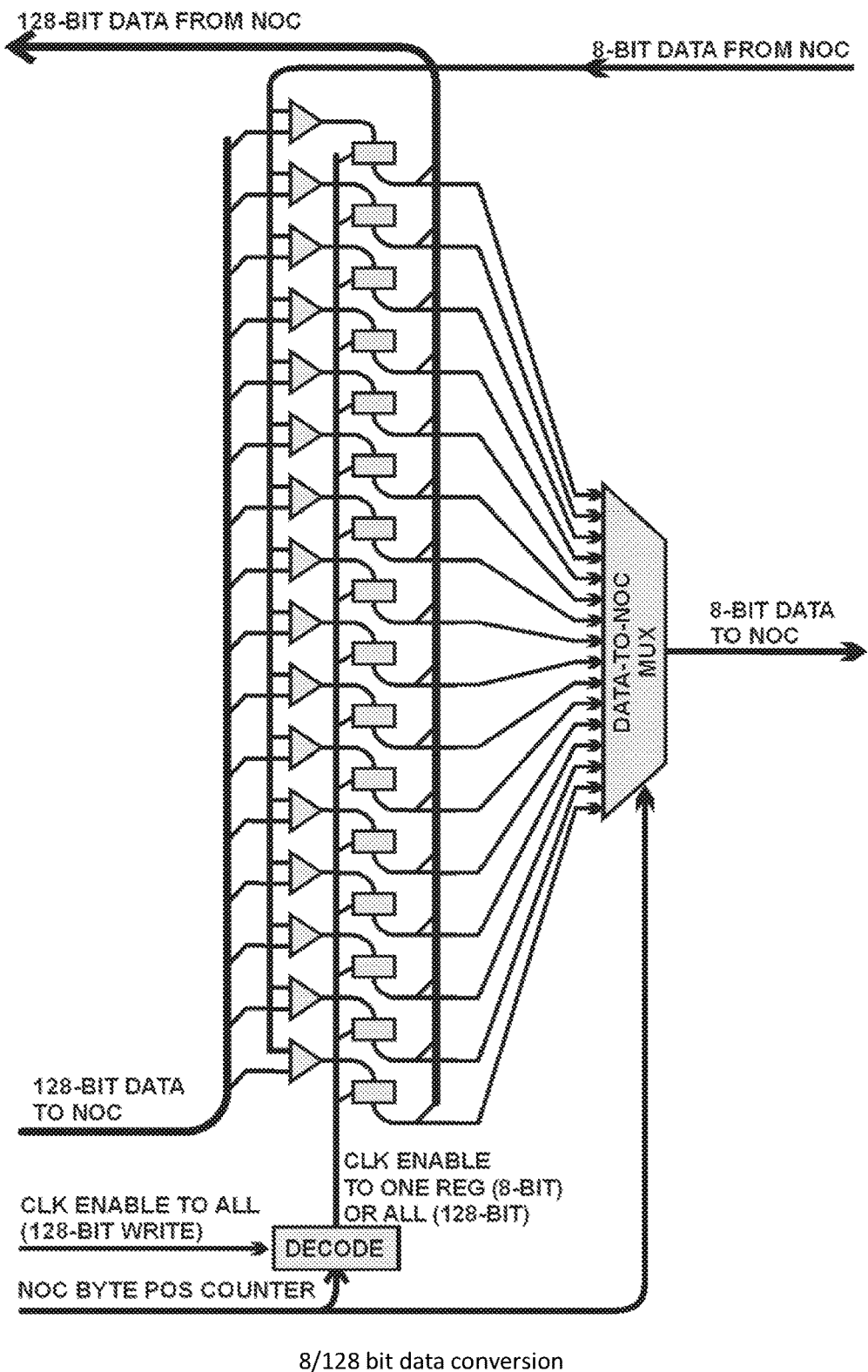
FIG. 13 is a schematic diagram illustrating an example of a relevant data conversion.

FIG. 13 is a schematic diagram illustrating an example of a relevant data conversion. For example, the NoC interface may transfer data through 128 flipflops, which are seen from the NoC side as 16 eight-bit wide registers and from the CC side as one 128-bit register.

2-way multiplexers select input for the 8-bit registers, depending of the transfer direction.

When receiving data from the NoC, the NOC BYTE POS COUNTER will keep track of how many bytes have been loaded into the register (one byte per clock cycle). When receiving from the NoC, a decoder decodes the counter and its outputs gate the clock to each 8-bit register, such that only one register at a time is clocked and energy thereby saved.

When all 16 eight-bit registers have been filled, the full 128-bit word is written into CM in the next cycle, at an address produced by an address counter.

If the Longitudinal Redundancy Check (LRC) mode is not selected, then this will be the same cycle in which the first byte-register is filled again (unless this was the last 128-bit word in a sequence). If the LRC mode is selected, there will be a 17th cycle, which transfers a LRC value. That value is stored into a 17th 8-bit register, which is then compared to an XOR-accumulated sum of the received 16 data bytes, and an error flipflop is set if there is a difference. This will cause the CC to report the error to GPP by requesting interrupt via the tag line.

Examples—PE Request Arbiter

Figure 14:
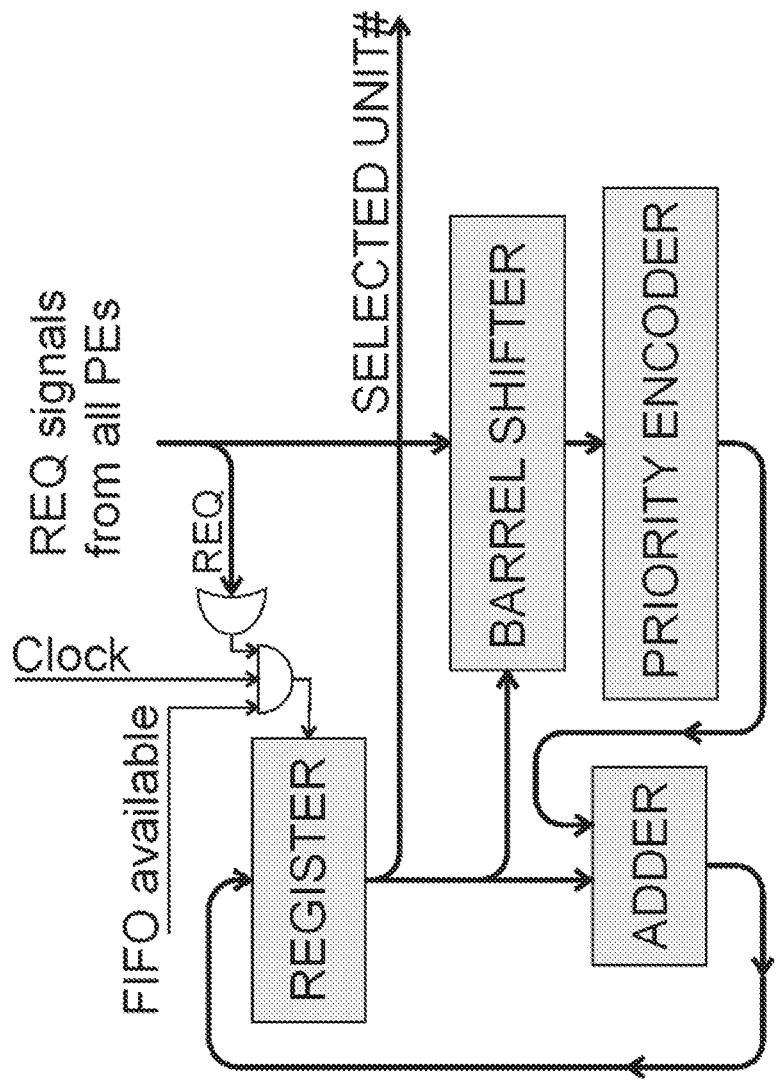
FIG. 14 is a schematic diagram illustrating an example of a PE Request Arbiter.

FIG. 14 is a schematic diagram illustrating an example of a PE Request Arbiter. As an example, a PE transfer may be requested by PE, by outputting information on its 32-bit wide inward data interface to CC and raising a request signal (REQ). This signal is received by a PE Request Arbiter, which handles the requests in order after the unit number of requesting PE, skipping from the last served unit number to the number of the next unit that has its request activated.

There may be any number, up to the 64 or more generally M PEs of the accelerator system, that have raised their request, and it may take some clock cycles—in rare cases up to ~80—before the request is detected. The unit number is then obtained immediately, from a priority decoder looking at all incoming requests simultaneously through a barrel shifter.

The intention is to service all PE units in increasing unit number order if all have their REQ signals activated (i.e. true). When one has been serviced, then the one with the next higher unit number (wrapping over from 63 to 0) should be serviced—if its REQ is true. If not, then the next one should be serviced if its REQ is true, etc. If there is no active REQ, then nothing should be done. However, we do not want to waste time by stepping through REQ signals that are false.

For example, 64 incoming REQ signals could be fed to an OR gate to determine if any of them is active, and only then enable clocking of the register mentioned below. But the gate is not necessary; unnecessary activity can be avoided without it.

Think of the 64 REQ signals as being arranged in a circle, in clockwise order with position number=unit number. The signals are passed through a barrel shifter, the output of which can be seen as a similar circle of unit numbers. The shifter is controlled by a 6-bit unsigned number in a register. If the number is zero, the output circle is exactly like the input, with the unit numbers in the same places. If the number, let's call it N, is in the range 1 . . . 63, then all the output unit numbers are shifted counter-clockwise by N positions in the output circle.

The barrel shifter outputs are fed to a priority encoder, which outputs a 6-bit unsigned number. This number may be:
=1 if the signal in pos 1 is true, else
=2 if the signal in pos 2 is true, else
=3 if the signal in pos 3 is true, else
. . .
=63 if the signal in pos 63 is true else
=0.

When a unit is being serviced, its unit number is held in the register. Its REQ signal is therefore present in position 0 in the "output circle". The REQ from the next higher unit number is in position 1, etc.

Therefore, unless all REQ signals are false, the number on the output of the priority encoder is the distance, clockwise in positions along the circle, to the next REQ signal that is true, skipping over false REQ signals in between. By adding this number to the contents of the register we get the unit number of the next PE to serve.

If the Request FIFO is full, then the PE Request Arbiter waits. When there is room, it clocks the new unit number into its register (unless more words are expected, as described below), thereby setting a new reference for finding the number of the next request.

Servicing the PE Requests

Storing the Request in the FIFO

The unit number in the register of the Request Arbiter controls the Collection Network (which is a tree of logic gates distributed in the PE array to reduce wiring) and thereby selects the information pertaining to the incoming request. This information is to be clocked into the 32-bit wide FIFO.

The first word of a request includes the request type code from the microinstruction of the selected PE to the Request FIFO. In the case of Write, it also includes data to write, as described above.

In the case of Read, there is no data to write in the Request FIFO; only one word is used. The destination is known to the requesting PE. It can be one or more of the following:

Microcode, in which case one entire microinstruction is transferred from CM directly to the microcode buffer of the PE.

Scratchpad, in which case a CM word is transferred to the Data From Memory (DFM) register in the Memory Data Register (MDR) block of the PE and then, in 2 PE clock cycles=1 CC/CM clock cycle, transferred to 16 consecutive byte locations in one half of the scratchpad.

ALUREGS, also via DFM, in a similar way as with scratchpad.

If the received word is the first word since the register in the arbiter was clocked—i.e. the word containing the request code—then the unit number, from the register, is stored together with the information received through the Collection Network. For example, that information may therefore use only up to 26 of the 32 bits, since six bit positions have to be reserved for the unit number. The 26 bits may include:
- a code for the type of request
- a 3-bit number giving the length of the request (a Read consists of only one word but a 128-bit Write consists of five words in total)
- a 15-bit CM address (possibly more)

A one-word request, e.g., a Read, will release the PE Request Arbiter to search for new requests.

By way of example, a 128-bit Write request will inhibit the clock to the register in the arbiter, load the length into a length counter, then read the next word from the same PE through the Collection Network, store it in the FIFO when there is room, and decrement the length counter. This will be repeated until the length counter is zero.

An ACK pulse will be sent to the requesting unit each time a word has been received. The PE should then take down its REQ and is free to change its data output. In the case of multi-word requests, both the PE and the CC know that there is more to come, and the REQ signal is not needed to keep the arbiter pointing at the same PE. If the PE has another word to send, belonging to the same request, then it outputs that word immediately after the ACK and holds it on its output until it gets the next ACK pulse.

Executing the Request

If the FIFO is not empty, the oldest word will be read and processed.

If it is a Read, then all needed information is in the one word at the FIFO output—the PE unit number and the CM address—and a read access is performed in CM and a 128-bit word is sent to the Distribution Network. The transfer through that network will be done during the clock cycle following the CM read cycle, but this is pipelined such that Read requests from PE units can be executed at the full maximum clock frequency the CM is capable of.

Signalling the Delivery to PE

For example, the PE needs to know when its DFM has been loaded from CC. No signal should be needed in the interface for this; the PE can sense (through a new condition the microinstructions can select) when the loading has been done and immediately take care of DFM contents in the case of a chained (multi-cycle) Read request.

High-Bandwidth Data Interface Between PEs and CC

To keep the MAC units of the 64 PEs busy most of the time—i.e. to feed large amounts of data (e.g. more than 300 billion operands per second) to them—the CC must have a plurality (e.g. 128) of outward data signal lines to each PE. Like with the NoC, this requires some thought on the physical layout before we can specify the signal interface.

Examples—Physical Connections Between CM and PE

For example, consider the 128 CM outputs. A read cycle in the CM produces one 128-bit word on these outputs. This is 16 bytes. Let us assume we want all of these to be transferred to one PE in one cycle, and the next word, which appears in the next cycle, to be transferred to the next PE, and so on.

Let us focus on the first-mentioned cycle. We transfer the data to its destination through a series of switches. We know already at the beginning of the cycle how these should be controlled, so the signal delay through each switch is only one gate delay. For example, the PEs may be physically laid out as one or more arrays, such as a G×H array, where G and H are integers equal to or greater than 2 (e.g. an 8×4 array—or, rather, two 4×4 arrays) of dual-core blocks, on the left- and right-hand sides of the CC logic, respectively. The first set of switches is in the CC and divides the 128-bit wide signal path into two trees, left and right. The switches lead the signals in one of these directions, the signals going in the other direction do not change from their idle state. A second set of switches similarly divides the 4×4 half-array into two parts, and a third set lead the signals to the centers of groups of at least 2 (e.g. 4) dual-core tiles (as an example, 4 dual-core tiles would correspond to 8 PEs), where each such tile has its connections in the corner at the center of the group. For example, there may be a 128-bit wide 8-way DEMUX distributes data directly to 8 PEs.

No flipflops are clocked, except in the destination register. No signals change (i.e. consume energy), except those along the active signal path.

However, this approach alone, as described, does not support broadcasting one complete word per cycle to all PEs, which we want to be able to do. But all the signal lines needed for this approach, placed where they are for this purpose, can be utilized also for broadcast. It is possible to modify the control of the switches that are used in the direction from CM towards PEs. For example, we may configure each switch such that it let the signals pass through both outputs. All signals will then get through to all PEs. No extra hardware is needed. Consumption will of course be higher during broadcast since many more nodes will change.

When reading from CM, we will gate a clock enable signal to the receivers in a similar way. If doing broadcast, the clock will be enabled to all, but otherwise only the PE that should receive data gets its register clocked.

Physical Layout of the Cluster

Figure 15A:
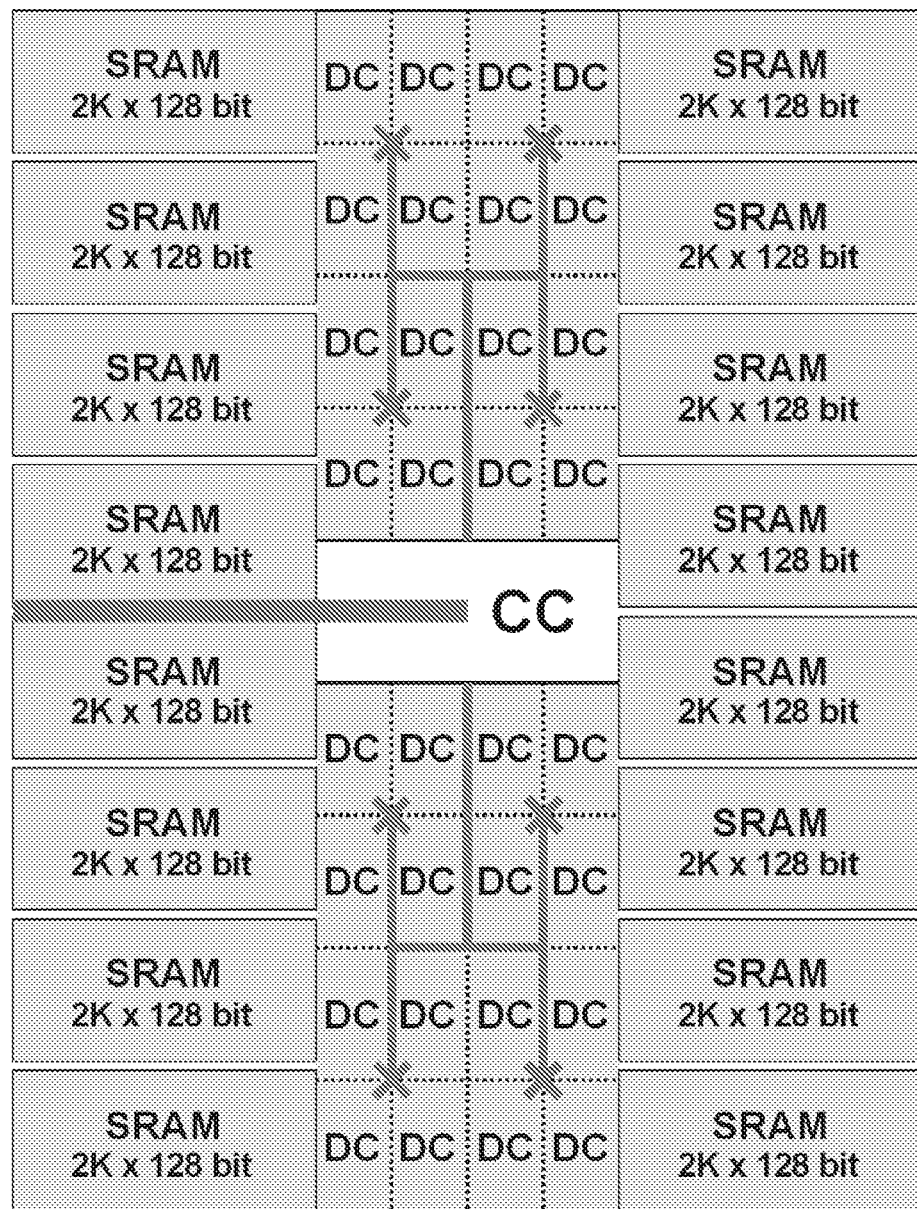
FIG. 15A is a schematic layout sketch showing an example of a physical layout of a cluster.

FIG. 15A is a schematic layout sketch showing an example of a physical layout of a cluster. This may be more relevant for a dedicated IC than for an FPGA. The PEs of the cluster are laid out in two rectangular areas, placed on opposite sides of the Cluster Controller. For example, these areas each have 16 dual PEs. Each such dual-core block (marked DC in the figure) has all signal connections (Distribution Network, Collection Network and clock signals) concentrated to one corner of the DC block, and four such blocks are placed with their connection corners together. These 8-PE connection points (four on each side of the CC) are connected to the CC through signal links forming a tree in each of the two arrays.

Figure 15B:
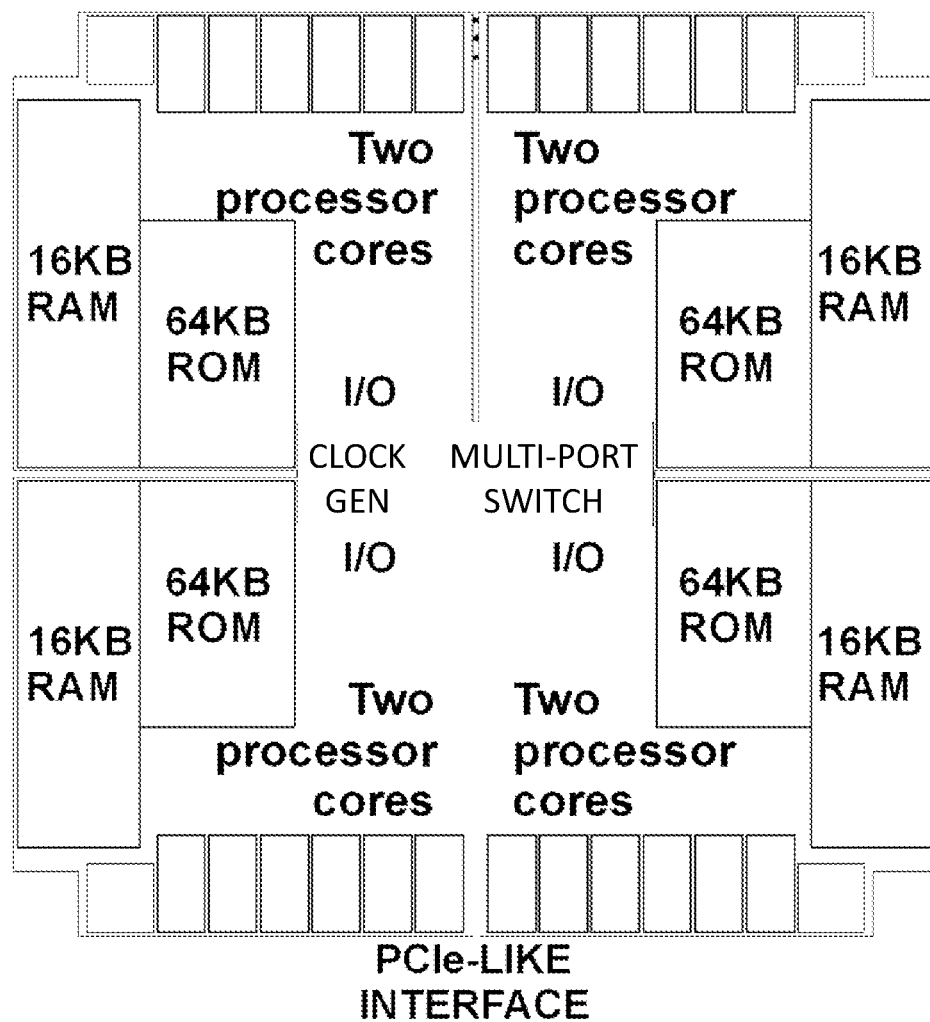
FIG. 15B is a schematic diagram illustrating an example of a circuit assembly of an 8-core block implemented as four dual-core tiles according to an embodiment.

FIG. 15B is a schematic diagram illustrating an example of a circuit assembly of an 8-core block implemented as four dual-core tiles according to an embodiment. By way of example, the dual-core tiles may be rectangular, with their switch interface in a corner. These corners may then be placed close together and joined by a multi-port switch. The shared circuitry that includes the switch, also has clock generating circuitry for generating clock signals for the four dual-core blocks. The clock generator is normally locked to a reference clock distributed from the central main controller.

Figure 15C:
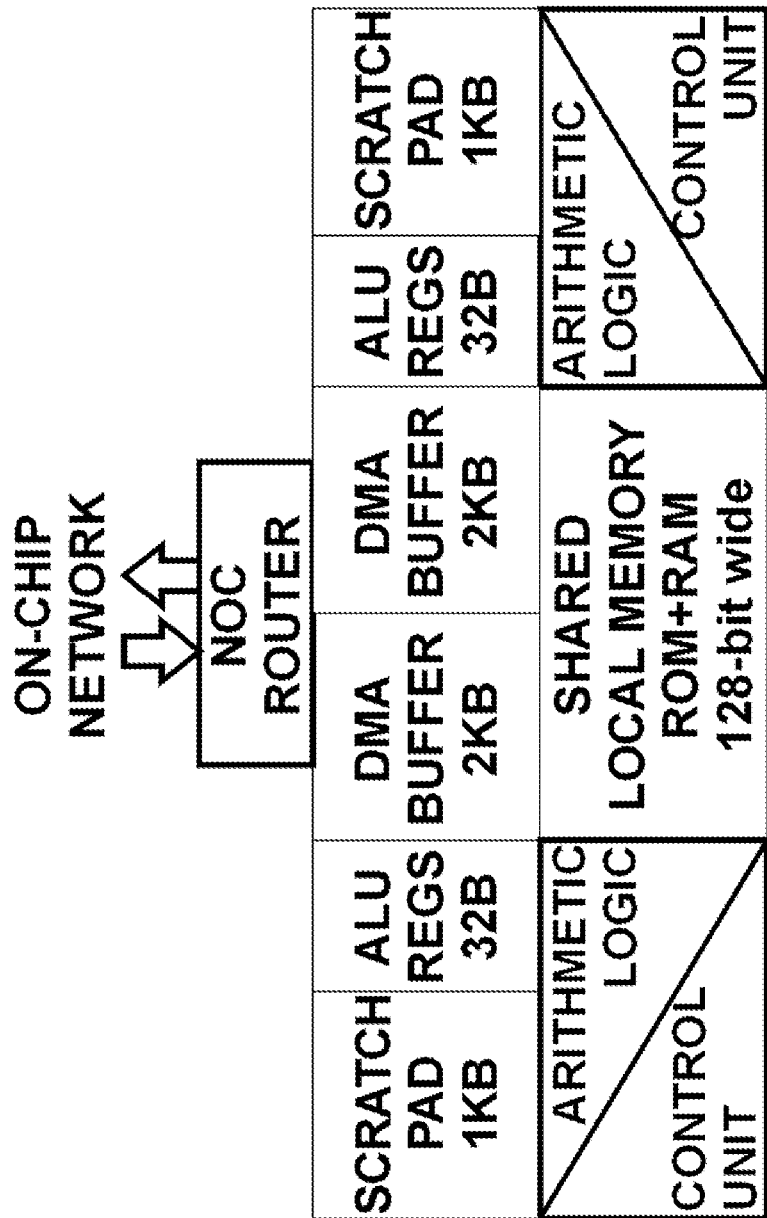
FIG. 15C is a schematic diagram illustrating an example of a dual-core tile according to an embodiment.

FIG. 15C is a schematic diagram illustrating an example of a dual-core tile according to an embodiment. In this example, each core is based on a control unit that is configured to execute microcode stored in a shared local memory.

Each core corresponds to a Processing Element, which is configured to execute the microcode to control the execution, by the arithmetic logic within the core, of a dedicated part of the arithmetic work of the overall data flow application. In this example, there is a NoC router, but this may be replaced by a multi-port switch that connects several dual-core tiles to the NoC. Each core includes at least two local data buffers for input data and/or kernel parameters. In this example, the kernel may be stored in ALU REG(s), e.g. to be convolved with input data stored in another data buffer such as a scratchpad. By way of example, the arithmetic logic can directly read and write in all its RAM blocks. Data can be streamed at high speed between scratchpad, local memory and DMA buffer.

Suitable Width of Transfer

By way of example, calculations show that the average vector depth in RefNet pointwise layers is 187 elements (bytes), and that we, with the planned scratchpad design, for such average vectors do 14.6 MAC operations per element (byte) that we read from CM.

A dot product of two such vectors is usually converted to a single activation data byte before being transferred to CM, but its computation requires e.g. 187 MAC operations and thus requires on average 187/14.6=12.8 bytes to be read from CM.

Thus, on average, each PE reads from CM 12.8 times as many bytes as it writes to CM. The data transfer path from CM to PE therefore does not need as high bandwidth as that of the other direction.

We could definitely read the full CM width, 128 bits, in parallel from CM to PE (based on MACs per byte to scratchpad, number of scratchpads, and expected ratio of max frequencies for scratchpad and CM), but writing can be done through a narrower channel. It should be a suitable subdivision of 128 bits, and CC could collect these narrower partial words to form full 128-bit words to write in CM.

However, while reading always needs long sequences of consecutive bytes, this is not the case for writing. The data to write will be created one byte at a time, and there will be many cycle times between the output elements. The PE may assemble 16-byte words to write, but even if that is done, we can save area by making the data channel from PE to CC narrower and transfer only a suitable part of the full CM word width at a time. This part should be more than one byte (otherwise the total write data transfer time would be longer than the total read transfer time); it should be at least 2 but perhaps 4 or 8 bytes.

Since an element size of 1 byte must be supported (it will be the most common size), we must be able to write single bytes into CM. The least energy-consuming way to do that would be to transfer one byte to CC and let CC write that byte into CM in the proper byte position, not activating the CM outside that byte position. This requires CM SRAM instances to either be 8-bits wide or have byte enable inputs.

If none of these alternatives is suitable, we need to be able to do read-modify-write in the CM. This could be done internally in the CC, or it could be done by first doing a Read via the PE's 128-bit DFM register and then modifying one byte there. The write-back could wait until later, in the common case that the next byte to write will be in the same 16-byte CM word. The CC would in the meantime serve other PEs, which would typically do the same operations. When the PE is through with this CM word, it performs a Write request for one CM word. If the write channel is 2/4/8 bytes wide, this transfer will require 8/4/2 clock cycles for transfer, in addition to one initial cycle for the transfer of the Write request and the CM address.

Four bytes, i.e. 32 bits, seems to be a good choice for the physical width of the write data channel from PE to CC. Two bytes is insufficient for the metadata (request code, address, . . . ) that will use the same physical resources, including the request buffer. Four bytes reduces the time spent on write transfer to one half compared to using two bytes, and to one third of the time spent on the read transfer needed to compute the corresponding output. Eight bytes saves somewhat more time, but that gain is probably not worth the extra hardware needed.

It would be possible to use outward data lines also for inward transfer, but it would not reduce logic. It would save some real estate for wires, but not very much since the inward width is smaller. By way of example, it would save 20%, not 50% as is the case for NoC.

The width of the signal transfer is therefore typically 128 bits outward from CC (the Distribution Network) and 32 bits inward toward CC (the Collection Network).

Distribution Network

The Distribution Network must be efficient both for Local Broadcast and individual Read. In both cases a new CM word of 128 bits is transferred from CM in every CC clock cycle. For Local Broadcast, all the PEs in the cluster receive the same 128 bits, while for Read, the register in the Polling mechanism, often acting as a round-robin counter when the PEs operate in near synchrony, may advance in every clock cycle and point out one PE that should receive the word.

Figure 16A:
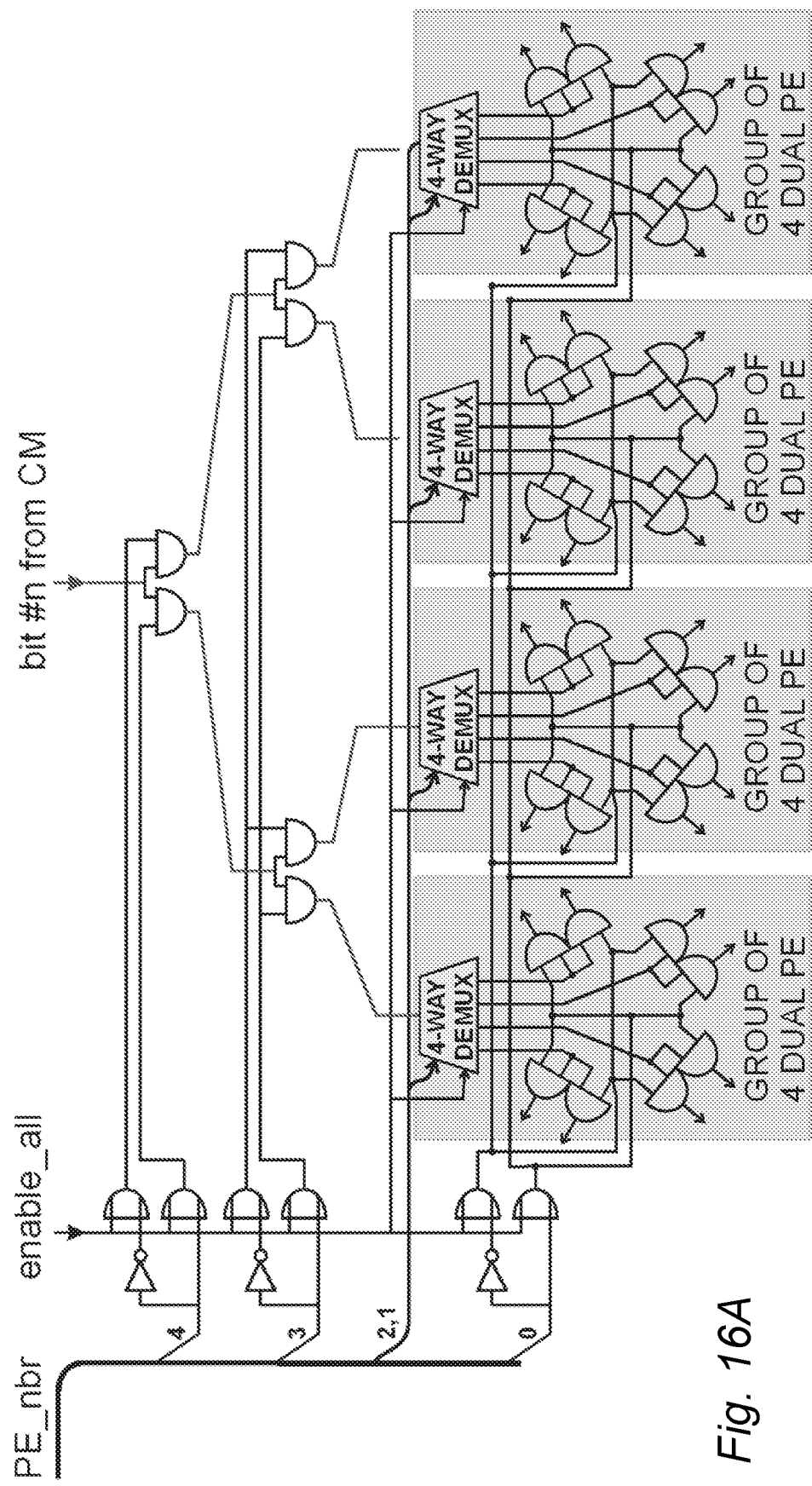
FIG. 16A is a schematic diagram illustrating an example of relevant parts of a distribution network.

FIG. 16A is a schematic diagram illustrating an example of relevant parts of a distribution network. The figure shows a schematic of the logic in one half of the distribution network, i.e. the tree to the left or right of the CC. The lines forming a tree in the layout of FIG. 15 correspond to the signal lines in the schematic of FIG. 16A. Note that in this example, the schematic shows one bit position of 128 bit positions. The schematic is the same for each position. The logic to the left, which decodes the 5 least significant bits of the PE number and enables all paths when needed, is shared by all 128 positions, and thereby draws negligible power. The control signals to the gates in the network arrive ahead of the data bits, such that the energy caused by the transitions between the transferred data bits is limited to the enabled path. Some power can be saved by letting the PE unit number advance in a Gray code sequence, i.e. changing only one counter bit position at a time.

In the case of Local Broadcast, all the gates in the network open, as shown in the schematic (signal enable_all is true), such that the data reaches all PEs simultaneously.

Collection Network

Figure 16B:
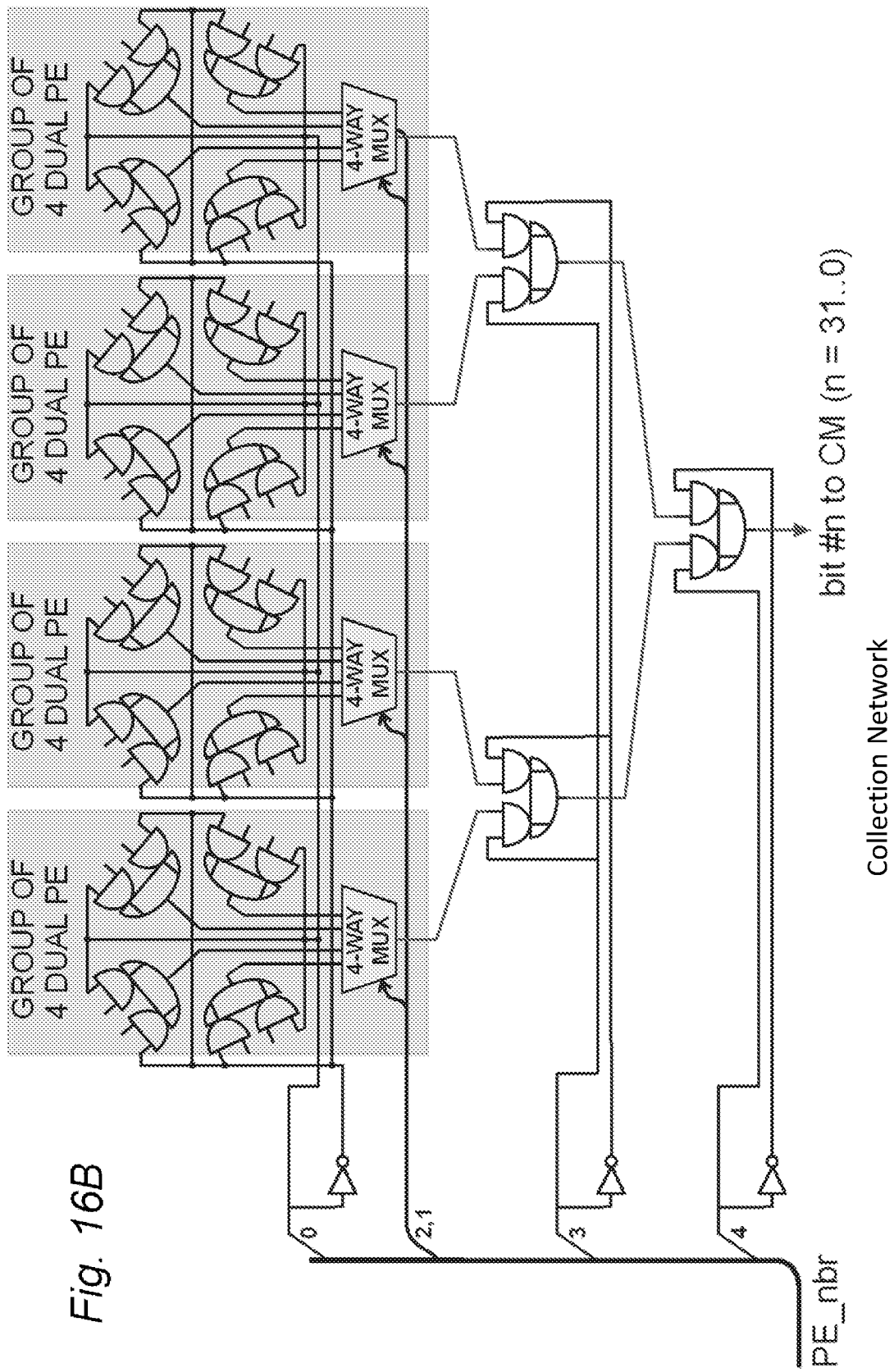
FIG. 16B is a schematic diagram illustrating an example of relevant parts of a collection network.

FIG. 16B is a schematic diagram illustrating an example of relevant parts of a collection network. By way of example, the 32 inward data lines from each one of the 64 PEs form the Collection Network.

It is used for transfers of both Requests to the CC and data to write in CM. The gates selecting the data are distributed in a similar way as those of the Distribution Network, i.e. in each 32-PE array there are four 4-input 32-bit wide multiplexors (MUXES), one at each meeting point of corners in a group of 4 dual PE tiles, then two 2-input 32-bit wide MUXES that combine these to two bundles of signals, then one 2-input 32-bit wide mux that selects the signals that go to the final 2-input 32-bit wide mux that selects between the two 32-PE arrays. More generally, this corresponds to a hierarchy of MUXES in levels.

In addition, there is one REQ signal from each PE and two ACK signals to each PE.

Examples—Data Transfer Between CM and PE

Distribution Network (Read or Local Broadcast)

Data, e.g. 128 bits in parallel, is read from the CM during one CM clock cycle and transferred to a PE during the next cycle through drivers in several levels. In the physical implementation these drivers could be AND gates, as in the figure, but the detailed design should be optimized for efficiency. There is a tree of drivers for each bit position, with the CM data bit entering at the root.

In the case of a simple Read transfer, one path through the gates is enabled during the cycle of the transfer. The path is selected according to the PE unit number, and the bit is delivered to the corresponding bit input of the DFM register of that PE. In the case of Local Broadcast to all PEs, the paths to all PEs are enabled.

The advantage of this design-compared to simply driving all destinations all the time—is that power is consumed only along the paths that are actually used.

Collection Network (Request, and Data in Case of Write)

In the case of a Request, the source of the Request code is a field in the microinstruction. The CM address is taken from one of the memory address counters in the PE (corresponding to one of the four sets of MEM address counters in IM3000).

Data to write is transferred in the cycle or cycles following the transfer of the Request code and parameters. The indicated number of words is more than zero, and this will cause the Request Arbiter to leave the control register for the Collection network unchanged until the specified number of words have been transferred. This is controlled by the same mechanism that is used for multi-word broadcast and read.

For example, data to write may be four words, i.e. one CM word, which is transferred in four parts. It is usually taken from the register set ALUREGS or the scratchpad, copied to the DTM (Data To Memory) register in MDR, and from there fetched by the Collection Network.

Examples—Requests from PE

By way of example, the requests are coded as 32-bit words. These are collected through the 32-bit wide Collection Network when the CC has detected a raised request flag from the PE. Bits are numbered 31 . . . 0. Bits #29, 13 and 6 are spare bits, allowing extension of any of the fields if needed. Bits 5 . . . 0 are used only by the CB request.

Requests can possibly be chained, such that a series of requests can be served together before the turn goes to the next PE. This will require a bit in the request word. There is space for this; currently only two bits are used of the three that are reserved for the request type code. The 128-bit words delivered through the Distribution Network after Multi-word broadcast and multiword read requests are chained, and so is the transfer over the Collection Network of the five 32-bit words constituting a write request with its data.

The request code may first be decoded already at the input to the Request FIFO, but only for the purpose of selecting the source for bits 5 . . . 0 to the FIFO. For the CB request the Collection Network bits are selected, but for all other request codes the contents of the unit number register are selected. When data words are received, following the Write (WR) request, the Collection Network bits are selected.

The requests, including the data words following the WR request, pass through the FIFO, and at its output they are decoded and processed as described below.

Example—Cluster Broadcast (CB Request; Same Data Block to Many PEs)

| 0 | 1 | 15-bit CM address | Word count-1 | Nbr of requestors-1 |
|---|---|---|---|---|

If CC reads this request from the Request FIFO when CB status is false, then the CC sets CB status and loads its broadcast counter from the "nbr of requestors-1" field.

If CC receives this request when CB status is true, then if the broadcast counter is =0 it executes the request, else it decrements the broadcast counter.

Executing this request means to load the "ADDR CTR FOR PE" from the "CM address" field and a word counter (not shown in the block diagram) from the "word count-1" field and then read the requested number of words from CM, at full clock frequency, starting in the given address, sending each word simultaneously (in the cycle when the next word is accessed) to all PEs over the Distribution Network (although only the requesting ones will enable loading of their respective DFM register, by using their "enable broadcast" FF), and when all this is done reset CB status. The two counters are incremented and decremented, respectively, for each transferred word.

Notes:
1. It is the last CB request that triggers the service, but they are all identical and the order in which they come into the CC therefore does not matter.
2. The receiving PEs will know when they have received the sequence. They detect this when their DFM has been loaded and then not loaded again in the next cycle; this sets a condition FF in the PE, which is tested and then reset by the microprogram.
3. If the requested number of words is one, i.e. "word count-1" is zero, then only one word is transferred from CM to the PEs. This is not really a special case for CC, but it is for PE: If it has requested such a single-word broadcast, it can let its microprogram continue until it needs the broadcast word and then wait only if it still has not arrived. This is different from multiword transfers, since the microprogram then needs to be prepared for the high-frequency burst of words, which it has to transport, immediately as it arrives, to internal destinations in the PE.

Use of this Request:

For example, a PE issues this request when it needs to receive microcode or data that other PEs will also need and should receive at the same time. When issuing the request, the PE also sets a flipflop that tells the MDR block that broadcast is expected. If this flipflop is not set, i.e., the PE is not participating in the broadcast, the DFM register will not be loaded when the broadcast is executed.

By way of example, Cluster Broadcast request (CB) may be used when a block of 128-bit words in CM—microcode or kernel elements—is to be transferred to all participating PEs. Normally, this block has previously been transferred to CM by broadcast transfer on the NoC (but there might also be other use cases). These two transfers are separate; other transfers may be done between them. Blocks transferred from root to CM will often be big and will be transferred to PEs in small portions, either by the Cluster Broadcast or the Read function. The Root is not involved at all in these transfers locally within the cluster.

With Cluster Broadcast, each PE can receive several memory words in sequence, one word per clock cycle, and must then be able to transfer those words at that rate to their destinations. The microcode buffer and the scratchpad are the important destinations for broadcast of memory word sequences. CC does not need to know how and where PE transfers the received words internally; this will be described in the PE section.

When a PE is ready for CB, it will inform CC of that fact by a CB request, and then issue no more request until CB has been done. For simplicity, the PE should do nothing until then. It must be OK for it that its DFM suddenly is being loaded, and that limits what it could be allowed to do. Even more limiting is that the broadcast will be a multiword transfer to microcode buffer, scratchpad or ALUREGs, and in those cases DFM will be loaded in each of several cycles, and the PE control logic must then be prepared to immediately do the internal transfers needed.

The CB request has three parameters. They include CM address and number of words to transfer just like the Read request. A parameter that is special for CB is one that specifies the number of PEs that should receive the broadcast. It could be all 64, but it could also be fewer, down to 2. There might be PEs that are not involved, and they should be able to do their work without unnecessary disturbance. All PEs that should receive the Cluster Broadcast transfer issue identical requests, i.e., it does not matter in which order they are received by CC.

The Request FIFO stores incoming requests, and those that exit from the FIFO are processed in order. CB is either active or not, as indicated by a status flipflop in CC that is set by the first CB request and reset by the last one. If not active, and an CB request is output from the FIFO, then CC sets CB status to active, and starts counting CB requests. No other action is taken. When CB is active and another CB request is received from the FIFO, then the counter is decremented. Other requests are served as usual, also when CB is active. When a CB request makes the counter reach zero, this CB request is executed—i.e., Data is read from CM and transferred over the Distribution Network—and the status flipflop is reset.

The PEs that have requested CB have set a flipflop indicating this, and the Distribution Network distributes a signal to all PEs telling them that this is an CB transfer. This signal is needed anyway throughout the Network; it is the signal named "enable all" in the figure. It is input to the 4-way DEMUX in a corner of every dual PE tile. Only PEs that have their own flipflop set will load the broadcast data word.

When CC has decoded the request, it will load its PE-side word counter (which must be separate from its NoC side counter since PE and NoC transfers are independent and will overlap) with the word count parameter from the request. It will then decrement this counter for each word that is transferred. When the counter reaches zero, the processing of the request is finished, and the "CB active" and "enable_all" flipflops are reset.

The words are received in the DFM register of the PE. If they are more than one, they must immediately (i.e., in the next clock cycle) be moved within the PE. The scratchpad, the ALUREGS, the microprogram memory and the configuration register are the normal destinations for the CB transfer. The transfer within PE only concerns PE and will be described in the PE section below.

Example—Read (RD Request; PE Loads Data Block)

| 1 | 0 | 15-bit CM address | Word count-1 | Reserved for unit # |
|---|---|---|---|---|

Executing this request means to read the requested number of words from CM starting in the given address, sending each word to the requesting PE over the Distribution Network. The two counters are loaded and used in the same way as for CB. All paths through the Distribution Network, except for the one needed, are kept idle, to save energy, and only the receiving PE enables the clocking of its DFM register.

Notes 2 and 3 for the CB request above apply for this request as well.

Use of this Request:

The PE outputs a Read request (RD) code with a CM address and a word count, like with CB. The address is delivered from one of the four address registers in the PE. The PE then waits, ready to receive a stream of 128-bit words at full CM clock frequency.

CC stores the request, together with the unit number of the requesting PE, inserted in the rightmost positions, as one word in the Request FIFO. When this word exits the FIFO and is decoded, a CM read cycle is performed and the data word from CM is output through the Distribution Network, where the path to the requesting PE is enabled. No other paths are enabled, since the enable all signal, used by CB, is false.

A sequence of words is read from CM and transferred to the requesting PE as described for CB above. The counting of words is done the same way.

The words are received in the DFM register of the PE. If they are more than one, they must immediately (i.e., in the next clock cycle) be moved within the PE. The scratchpad, the ALUREGS, the microprogram memory and the configuration register are the normal destinations for the RD transfer. The transfer within PE only concerns PE and will be described in the PE section below.

Example—Write (WR Request: PE Stores Data Word) to CM

| 1 | 1 | 15-bit CM address | 0 | 0 | 0 | 0 | 1 | 1 | Reserved for unit # |
|---|---|---|---|---|---|---|---|---|---|

When this request is received from the FIFO, the CC checks whether it has at least four more words in the FIFO. If not, it waits. When the condition is true, it loads the given address into its "ADDR CTR FOR PE" from the "CM address" field and it reads four 32-bit words from the FIFO. For counting these words, it can use the word counter used for CB and RD. The "word count-1" field therefore contains 000011, i.e. the number 3. These four words are loaded into a 128-bit "data-to-CM" register, which is to be inserted between the FIFO and the "WRITE DATA MUX" in the block diagram. A CM write access is then performed.

Use of this Request:

The PE outputs a Write request (WR) code with a CM address. The address is delivered from one of the four address registers in the PE. This will cause four 32-bit words to be transferred over the Collection Network, and inserted into the FIFO, directly following the request word, which is complemented with the unit number when inserted into the FIFO, just as with other requests. The PE Request Arbiter is held on the unit number, and Collection Network is thereby holding the path from the PE open, until all five 32-bit words have been inserted into the FIFO. One or more extra cycles may be needed since the FIFO may not have room for all five words immediately. In this situation the CC logic must not be stopped from (i.e. must be available/enabled for) continuing the reading and processing of earlier requests from the FIFO.

When the CC logic has read all five words from the FIFO, it writes the 128-bit data given by the four 32-bit words into CM at the given address.

It then signals the PE that the write has been performed.

There are at least two ways of doing the write, depending on how the CM is implemented. If it uses 32-bit wide SRAM instances, then each one of the four 32-bit words can be written into the proper SRAM instance as it is read from the FIFO. If CM is built of 128-bit wide SRAMs, then a register is needed, where the 128-bit word is assembled from the four smaller words.

Example—Read-Modify-Write (PE Stores Part of Word)

It will often be of interest to write less than one 128-bit word in CM. There is a general way to do this, by using RD followed by WR, with any (microprogram controlled) modification of the DFM contents being done in between.

It may be desirable to do it with less data transfer activity, e.g., by just including a data byte and byte location together with the request code and address and let the read-modify-write be executed locally near the CM. This could involve the 128-bit register mentioned at the end of the description of WR above. The CC logic would then fill this register from CM, except for a selected byte position that will instead get its contents from the transferred data byte, and then write the assembled word back to CM.

Examples—Processing Element (PE)

In a particular example, the PEs (cores) are arranged in pairs. For example, the microprogram memory may be shared between the two PEs in the pair, and clock drivers may be shared between, e.g., four pairs of PEs. There are multiple novel features, including clock generation being shared by the cores.

Figure 16C:
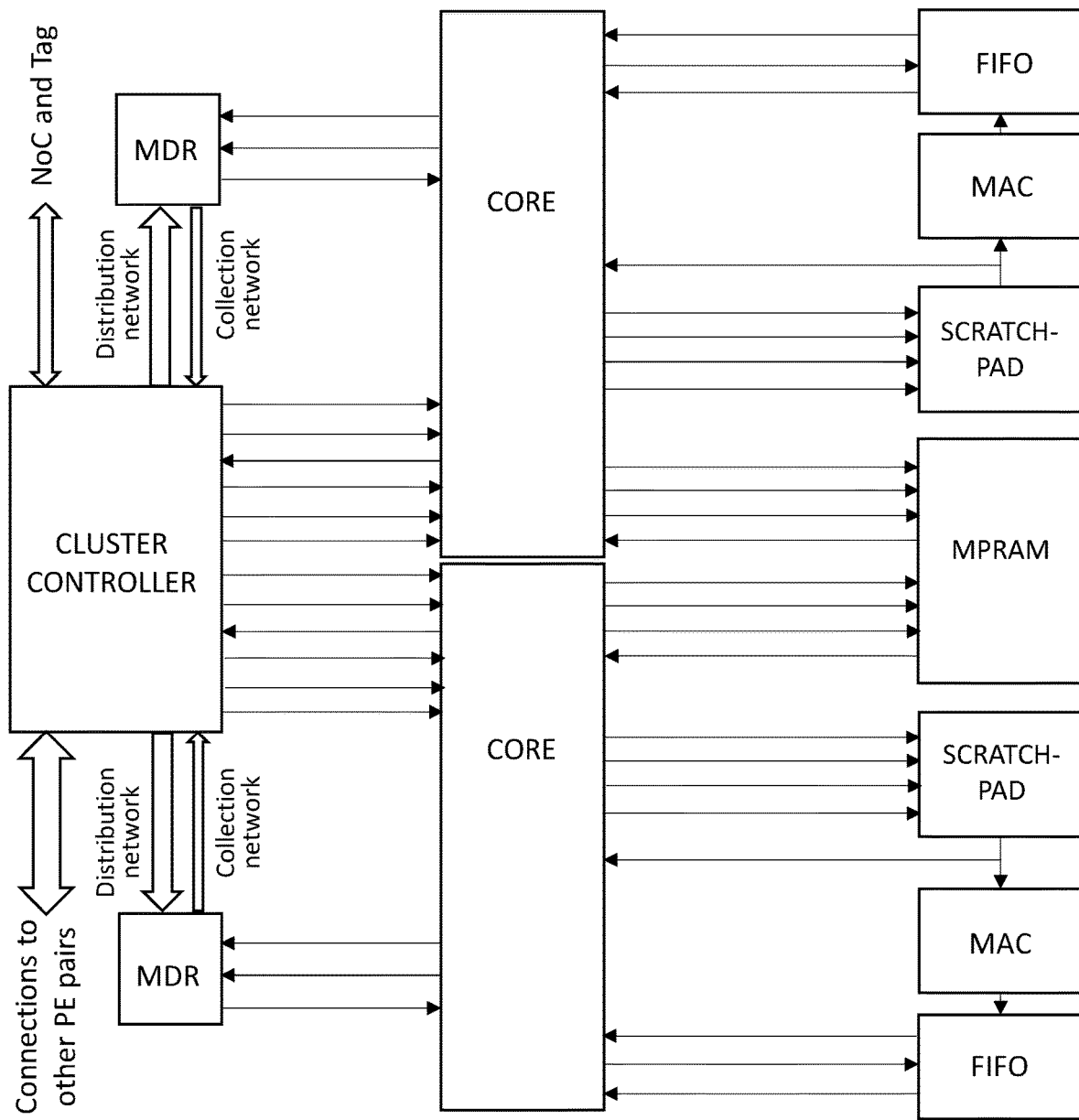
FIG. 16C is a schematic block diagram illustrating an example of a system with a PE pair, and it also shows how the PEs (cores) are connected to the Cluster Controller.

FIG. 16C is a schematic block diagram illustrating an example of a sub-system with a PE pair (i.e. dual cores), and it also shows how the PEs (cores) are connected to the Cluster Controller through a set of signal interfaces.

Each core interfaces and/or cooperates with one or more Memory Data Registers (MDR), which in turn are connected to the cluster controller via the collection and distribution networks.

In this example, the two cores share a microprogram memory. Each core further interfaces and/or cooperates with a scratchpad (also referred to as a local buffer) for data and/or application parameters, MAC circuitry (comprising one or more MAC units), and a FIFO buffer for receiving the output of the MAC circuitry.

FIG. 16D is a schematic block diagram illustrating an example of a PE core, focusing on the new so-called vector engine, with two MAC blocks, and also the details of the address counters used (they are identical and are controlled independently).

Figure 16E:
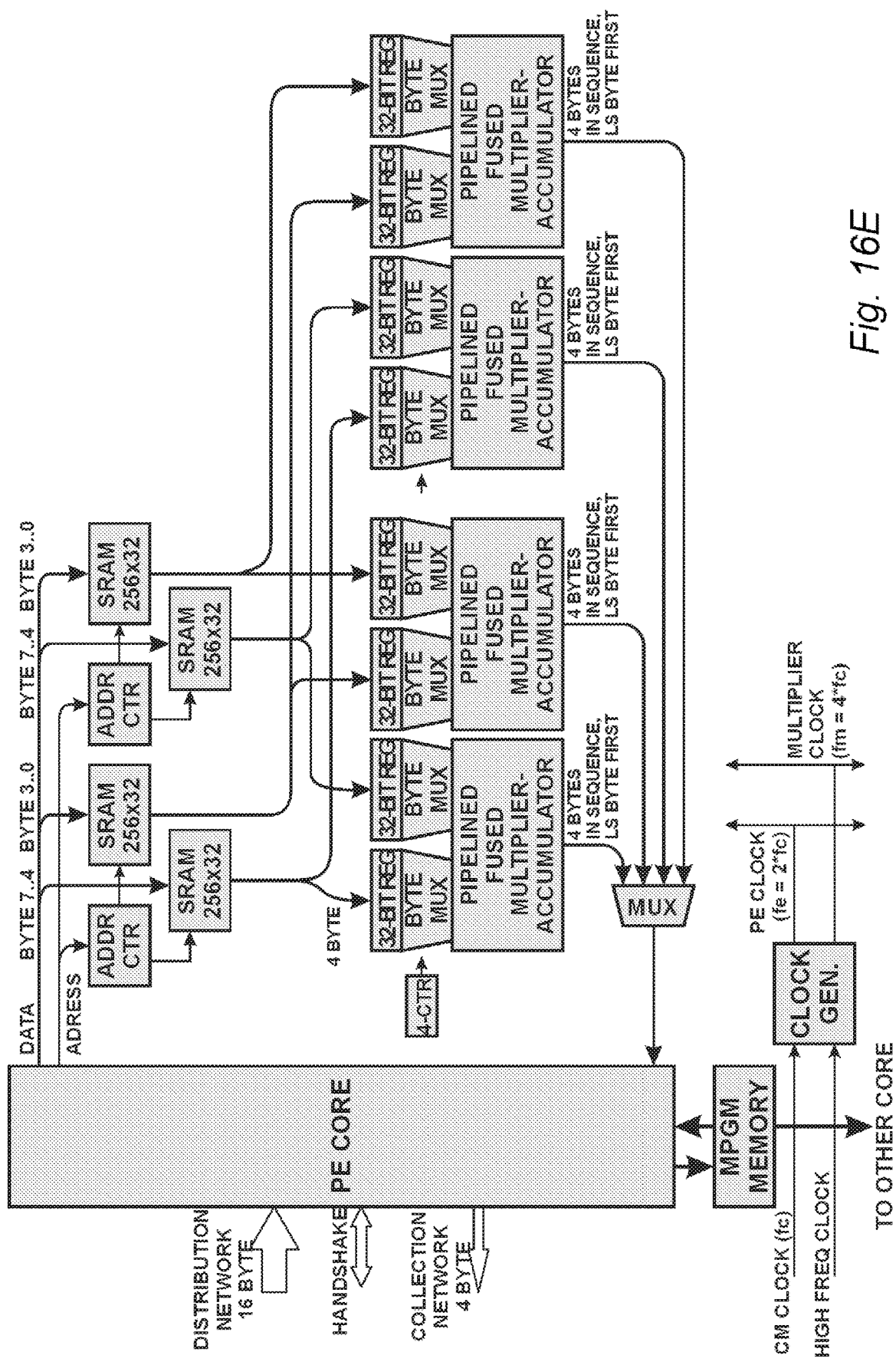
FIG. 16E is a schematic block diagram illustrating an example of a PE core, also focusing on the new so-called vector engine, here with four MAC blocks.

FIG. 16E is a schematic block diagram illustrating an example of a PE core, also focusing on the new so-called vector engine, here with four MAC blocks.

Examples—a New Vector Multiplication Resource (Scratchpad+MAC)

Scratchpad SRAM with Address Counters

As an example, it is here assumed that the Cluster Controller (CC) and Cluster memory (CM) are clocked at fc=1.2 GHZ and PE at 2*fc=2.4 GHz. Each multiplier starts multiplications at a frequency of 4*fc=4.8 GHz. In a FPGA version the frequencies will be lower but have the same relationships.

For example, each one of the two address counters points at one 32-bit word. The most significant address bit can select either the upper or lower of the two SRAM instances that the corresponding half (left or right) of the scratchpad consists of. This is done when data is read out to the multipliers (if there are two multipliers). When writing into scratchpad from the cluster memory, however, both SRAM instances are enabled, so that two 32-bit words are written at the same time. For example, if four multipliers are used, then this is also done when reading data to the multipliers.

The term "scratchpad" corresponds to a local data buffer, and is therefore sometimes referred to as a "data buffer" or simply "buffer".

The counter can step using two different step sizes, which are stored in registers. An address in the counter can also be stored in a shadow register and later retrieved.

Example—Writing a Block of Data from CM into the SRAM

The block will be transferred either to the left or to the right half of the scratchpad (we transfer either data or kernel (coefficient) bytes, not both at the same time). We will write simultaneously in the upper and lower SRAM instance of that part. Writing in the other half will be done in the corresponding way. The two SRAM instances we are not accessing should not have their clock active.

The data block consists of 16-byte words, and is transferred from the DFM register. In the common case of multi-word transfer, this is done at full CM clock frequency. PE thus has two PE clock cycles in which to move each word to its final destination. In the first of these cycles it will read bytes 7 . . . 0 in DFM and transfer byte 3 . . . 0 to the upper SRAM and byte 7 . . . 4 to the lower SRAM in the same half. See FIG. 16D/E. It will also step the address counter (which addresses both SRAM instances in this half). In the second cycle it will read bytes 15 . . . 8 in DFM and transfer byte 11 . . . 8 to the upper SRAM and byte 15 . . . 12 to the lower SRAM in the same half, and again step the address counter.

Then this will be repeated with a new 16-byte word in DFM. It is shown how this word is written into the same SRAM instances. The process continues until the end of the block.

Example—Multiplying the Vectors

In the following, terms like "vector", "rows" and "vector elements" will be used with the meaning normally assigned to them by the skilled person in the art.

The multiplier (of "modified Booth" type) forms partial product rows based on overlapping groups of three multiplier bits, thereby reducing the number of rows compared to simple binary multiplication. The rows are then added together by an adder tree like in other multipliers, and the design is fused with a 32-bit wide accumulator. The multiplier-accumulator (MAC) unit is optimized for multiplying signed 8-bit numbers, but has modes for other number formats, e.g. bfloat16, which requires two bytes for each vector element. Other number formats can be used, without requiring changes of the hardware outside the multiply-accumulate units.

The unit is divided into pipeline stages and is clocked at higher frequency than other parts of the PE.

Two of the four SRAM instances are accessed simultaneously, but in a different way compared to writing; one SRAM instance in each half (left and right) is accessed. We alternate between the two uppermost and the two lowermost instances, such that we read the data and coefficients (kernel elements) in the order in which they were stored. The frequency of reading will then, seen from any of the SRAM instances, be one half of the PE clock frequency, i.e., 1.2 GHz. The two 32-bit words from the read access will be held in registers for two PE clock cycles, i.e. four multiplier cycles.

In the case of four multipliers, we clock all the SRAM instances with full PE clock frequency, but we still keep the data in registers for two PE clock cycles. We therefore need two sets of four registers, which are clocked alternatingly. We let two multipliers use the set of registers that takes its input from the upper two SRAM instances and the other two use the set that takes its input from the lower two.

Each multiplier has 4-way byte-wide multiplexers on the two inputs, and a 4-counter controls the muxes to select the four bytes of each register in order. The data for the multipliers is stable in the registers for two PE clock cycles, and the counter, which is clocked by the multiplier clock and synchronized to the cluster clock (i.e. every other PE clock cycle), divides this time in four equal parts, for byte #0, 1, 2 3 in the two registers of the set. Each multiplier thereby reads and multiplies two pairs of bytes for each PE cycle.

Both address counters are stepped, together, not just one as is the case when writing. The addressing pattern for one of them (the one used for data) may also be different than that of the other (the one used for coefficients).

In the case of four multipliers, one pair of multipliers starts at even PE cycles and the other at odd cycles. The results at the output of the accumulator will also appear in alternate cycles like this, but they appear only once in every N multiply cycles, i.e., N/2 PE clock cycles, where N is the number of byte elements in each vector. The results, the accumulated sums, i.e., the scalar products (or "dot products"), will be, e.g., 4 bytes wide, and they will be output from the MAC one byte at a time, with the least significant byte first.

Thus, product byte #0 from the two MACs will arrive together. In the case of four MACs, byte #0 from the other pair of MACs will then arrive. Then byte #1 will arrive in the same way, followed by #2 and #3 for both, or all four, MACs.

The result bytes are transferred to the ALU in the PE core and processed under control of the microcode.

Example—PE Core(s)

In a particular example, apart from the novel parts, basic conventional functionality of the core may be based on the well proven Imsys processor core, stripped of functions not needed for the PE. This stripping may result in removal of most connections to the core, leaving only those shown in the block diagram(s) of FIG. 16C-E. Some comments to these signals and their connections are given below, starting in the upper left of FIG. 16C:

In this example, the DRAM interface is not used, instead the core transfers read/write requests, containing CM address, to a 4-byte wide DTM (Data To Memory) register, which is also used for data to write. Requested data from CM is received in a 16-byte wide DFM (Data From Memory) register. The two memory data registers are included in the new block MDR (Memory Data Registers). Normally, each core has a set of MDR registers.

Reset and clock signals are received from CC. The two cores get their clocks from a common block that generates and drives the reset and clock signals for four dual-PE tiles.

The two cores work independently of each other but they share the microprogram RAM (MPRAM), which contains the code that controls both cores. The loading of microcode is handled only by one of the cores. Transfer of 128-bit wide microinstructions from DFM to MPRAM are done in two PE cycles, i.e., one CM clock cycle, in a similar way as data is transferred to scratchpad.

"Normal" microinstructions take two clock cycles to execute. The two cores take turns reading them from MPRAM and can thereby execute independently of each other although they share the MPRAM resource. The core has been modified to allow microinstructions that can use more clock cycles. This is useful for operations on multibyte operands. This accelerator uses a very fast pipelined multiplier solution, allowing one microinstruction to execute in each clock cycle the same set of operations, involving multiply-accumulate operations, hundreds of times, without loop overhead time.

The scratchpad or local input buffer is different from earlier Imsys processor designs. It is 32 bits wide and has, e.g., 2 KB or 4 KB capacity (optimum depends on the number of MAC units etc.) and is divided into two halves, which have separate address counters. Each half is further divided into two, depth-wise, such that it is made of (at least) two SRAM instances, which can be accessed individually or as one memory.

Example—Memory Data Registers (MDR)

This consist of the 128-bit wide DFM register, which receives data from CM through the Distribution Network, and the 32-bit wide DTM register, which sends commands to CC and data to CM through the Collection Network.

The PE has means for copying the entire 16-byte DFM contents to its scratchpad in one CM cycle (two PE clock cycles), and thus it is able to receive multiple words at full CM clock frequency. The 16-byte word is placed in either the data or kernel half of the scratchpad, at any location starting with a byte address that is a multiple of 16. The scratchpad is addressed by address counters, which can be loaded from the microinstruction and stepped in various ways. One of the cores in each pair can similarly copy the DFM to the microprogram memory.

Example—Reading and Writing in the Scratchpad

We will here, as an example, assume that we read to the multiplier and that we write from the DFM register (which we have loaded from CM).

FIG. 17A-D are schematic diagrams illustrating an example of how a new pair of bytes is transferred from scratchpad to MAC unit for each MAC cycle. In this example, the SRAM cycle, while multiplying, is twice as long as the MAC cycle, but four bytes are read from each half of the scratchpad in each SRAM cycle if we have two multipliers. Note that each half consists of two SRAM instances, one upper and one lower, and that they are accessed alternately. If we have four multipliers, we clock the SRAMs at full PE clock frequency (this should be possible anyhow, since it is desirable to do it when writing), and we normally read simultaneously from all four parts of the scratchpad.

By way of example, only one half of the scratchpad is loaded at a time. The other half is loaded at other points in time. Note that, when looking at one of the halves, we load 4 bytes in one SRAM cycle, while we when reading data to the MAC from this half read only 2 bytes per SRAM cycle. Thus, we load twice as fast and therefore achieve the higher utilization calculated above.

We could increase this kind of MAC utilization by using 2-port SRAM, since we then can then fill the scratchpad while the multipliers are working, but this may cost more than going to 4 KB single-port SRAM. The FPGA system will give us opportunity to test both 2-port and doubling of capacity, since the BlockRAMs we use for scratchpad will actually have twice the capacity we intend to use and they can also be configured to support 2-port interface.

FIG. 17E is a schematic diagram illustrating an example of reading from local data buffers for the multiplication phase of the MAC units. As previously indicated, it is possible to read from all four local data buffers (e.g. SRAMs) in every PE clock cycle. In this example, we start multiplication in two MAC blocks every PE clock cycle: MAC 0.1 in even cycles, and MAC 2.3 in odd cycles. EACH MUL register is loaded once every two PE clock cycles. The multipliers are normally clocked by twice the PE clock frequency, and they each read one pair of bytes in each multiplier clock cycle, i.e. four pairs for each input load cycle. Some cycles after the start of the multiplication process (the delay caused by the pipeline depth of the MAC units), each MAC will accumulate two new element products in every PE clock cycle.

ALU

By way of example, the ALU may have 8 different functions, controlled by a 3-bit field in the microinstruction. This field may be increased to 4 bits, and more functions will be added. These include max and min and an activation function that is controlled by a parameter register, which will select among the relevant functions, which include ReLU and sigmoid. The latter, and other nonlinear functions common in neural networks, will be accomplished by a lookup table in a small ROM or SRAM.

ALUREGS

By way of example, this is a register set comprising 64 eight-bit registers. The microcode can specify moves or 1- or 2-operand operations to be performed on data, of different lengths in bytes, in ALUREGS and/or scratchpad and/or the DFM register, and the destinations for the results, which can be ALUREGS, scratchpad, or the DTM register.

For example, a move (i.e., copy) of data from DFM to ALUREGS is done by one microinstruction, which loads 1 to 16 consecutive bytes from DFM. Fields in the microinstruction specify starting byte position in DFM and in ALUREGS, as well as the number of bytes to transfer and the direction of byte position stepping in ALUREGS.

Control Unit

The control unit inherits its logic from earlier Imsys processors, although the microinstruction word is increased to 128 bits, to allow for the control of the new functionality described here. The unit contains a loop counter and a subroutine stack. It also contains provisions for debugging, which will be included in their entirety in the GPP processor but will be simplified in the PEs.

Control Store (CS)

This unit contains a control store (CS), also known as microprogram memory, e.g. an SRAM that stores 128-bit wide microinstructions. CS need not be very deep; 16 or 32 words may be sufficient if it is only DNN inference we need to do. If we see the need for more, we can add a bigger ROM in parallel with a smaller SRAM; ROM is several times denser than SRAM.

By way of example, the core should be able to do initial load of its microcode SRAM. If a ROM is used, this is not a problem, and this solution is used for the GPP. If the PE does not have a ROM, then the short microinstruction sequence needed for the loading of a number of microinstructions from a fixed address (=0) in the Cluster Memory is generated by a block of synthesized gate logic.

Both GPP and PE will use Imsys' patented method of sharing control store and, for GPP, sharing also its primary memory.

New Functionality: Unified Memory

This feature is usually more relevant for GPP than for PE, and has therefore already been described in connection with the GPP. It should though be understood that the unified memory concept may be generally applicable to any processor.

Microinstructions

A microinstruction controls what PE should do during a microinstruction cycle.

An ordinary microinstruction cycle consists of two clock cycles. The address to the next microinstruction to execute is determined during the first clock cycle, based on control bits in the current microinstruction (stored in the pipeline register) and selected conditions, and during the second clock cycle that microinstruction is read from CS and stored in the pipeline register. Control of the sequencing only uses a small part of the 128 bits of a microinstruction; the others are used to control the resources of the PE, i.e. select a function for the ALU, addresses in scratchpad and ALUREGS where to read and write, etc.

An ordinary 2-clock microinstruction can, e.g., read data at one address in scratchpad and then write that data at another address, and at the same time do an ALU operation on two bytes in ALUREGS and store the result, and also do any kind of sequence control function, e.g. one of several kinds of loop, a subroutine call, or a multi-way (decode) branch.

New Functionality

The main part of the accelerator work will be executed by an extraordinary type of microinstruction, the function of which is repeated for each clock pulse until a stop condition (normally from the loop counter) is reached. The pipeline register will be loaded only once, and no next address needs to be determined while repeating.

Next address after the repetition will be determined normally. The microinstruction has the normal fields for sequence control, which can specify e.g. a branch or a return from subroutine; the "extraordinary type" is specified in addition to those microinstruction fields.

This new special repeat type may be used not only for vector operations but also for simple ALU operations, e.g. add, on multibyte operands. Addresses to operands will then be sequenced automatically under control of new bits in the microinstruction and new small counters.

When a microinstruction in this way controls a process that takes many clock cycles but engages only part of the arithmetic logic in the processor, e.g., the calculation of the scalar product of vectors having hundreds of elements, then an additional improvement will contribute to higher utilization of the hardware and thereby shorter higher throughput: The microinstruction bits that would control the part that executes this particular process are then not connected directly but instead via a register, which is loaded from the microinstruction word. This allows the microprogram to continue with other work while the process is executed.

Start of Microcode Execution

When PE starts executing a new transformation (e.g. a CONV layer or part of a layer), it always starts reading microcode from address 0 in its CS.

The microcode will often use subroutines. These are stored at higher addresses in CS, the most generally useful ones at the highest addresses. When replacing a microprogram, or part of it, new code is stored from address 0 and as many words as needed, overwriting earlier code. When running, the new code can utilize already stored subroutines (or other sections of code) that have not been overwritten. To utilize this technique, the compiler needs to keep track of the CS contents throughout the process. It is of course not necessary; one can for simplicity replace the entire contents for each new transformation. For big models it will not make much difference, since the data structures are much bigger than the microcode and the number of operations is very much larger than the number of microprogram words to load.

Examples—Requesting Transfers Between Entities in PE and its CC Interface

By way of example, this is done by the microcode, by placing a request word in the DTM register and raising the request flag signal to the Cluster Controller (CC).

Transfers to/from Scratchpad

These requests have been previously described. In the case of CB or RD request, the PE detects when the requested data arrives and transfers it to scratchpad. In the case of WR request, the PE writes the 32-bit data into the DTM register together with the request code and CM address. The PE will get a signal from CC when the word has been written into CM. This signal will set a flag that the microprogram can test.

Loading of Microcode

By way of example, a CB or RD request type may be used, but PE normally transfers the received data directly from the DFM register to the microprogram memory instead of to the scratchpad.

The loading normally starts in address 0 in CS and continues until a desired count has been reached. One 128-bit word is loaded in each CC clock cycle, i.e. two PE clock cycles.

When a PE starts after a reset, e.g. due to system start, it outputs a CB request to CC. If the PE pair doesn't have ROM, this must be done by logic not controlled by microcode, since there is not yet any microcode to read in CS SRAM. The automatic request after reset specifies the maximum length, i.e. the entire CS will be loaded. The loop counter in the PE control unit is used for addressing CS while loading, and it will stop at zero when the first loading is completed. Control then passes to the CS SRAM. Address 0 contains the first microinstruction to be executed.

Examples—Important Primitive Operations

We will here concentrate on the "CONV" layers, which are the most common and most demanding layers used in Deep Neural Networks.

Each layer transforms a tensor into another tensor. The tensors are 3-dimensional data structures with x-index=0 .... X−1, y-index=0 ... Y−1 and z=0 ... Z−1, where X, Y, Z are width, height and depth, respectively, measured in number of elements.

We assume that the scalar elements are single bytes. The system can handle other number formats efficiently if the MAC unit in the PEs is equipped for it. We plan to develop it to optionally handle important formats, without adding too much to its area. Multibyte formats will then take more time to operate on, but transport of the operands will also be slower, and the design can therefore still be well balanced in its utilization of the hardware.

The operands are stored in "z-major order", i.e. the elements of each z-vector are stored sequentially in natural order. The vectors are then stored in x-coordinate order and the horizontal x/z levels are then stored in y-coordinate order.

Processing of the CONV Layers

A tensor can be seen as:
1) a 2-dimensional array with width=X and height Y, where each array element is a 1-dimensional vector, here called a "z-vector", with Z scalar elements along the depth dimension of the tensor.

Alternatively, the tensor can be seen as:
2) Z "feature maps", which are 2-dimensional x/y arrays of scalar elements, one for each z coordinate of the tensor.

A convolution multiplies a small part, most often a z-vector, of the input tensor with a filter kernel, which is a data structure of the same size and shape, having constant elements (parameters). The multiplication is a "dot product", i.e. a scalar product consisting of the sum of the products of corresponding elements of the two vectors.

A "point-wise" (1-dimensional) CONV layer uses 1-dimensional kernel vectors, one per output feature map. It uses the number 1 view (above) for the input and output of its transformation. A pointwise layer can be pruned, in which case many of the kernel elements are zero.

A "depth-wise" (2-dimensional) CONV layer has small 2-dimensional kernels, usually having 3×3 elements, one kernel for each z coordinate. It uses the number 2 view for its input—the elements for each MAC accumulation, i.e. each output element, are fetched from one and the same input feature map. The depth of input and output will therefore be the same.

Note that the scalar products produced by the MAC units are here not dot products of two linearly arranged vectors, but instead of two small matrices. Still they are sums of products, even though the addressing patterns are not just simple sequences. These patterns necessitate loading data from (usually) three different ranges far apart in CM. The kernel elements are of course stored in simple sequence order.

Neighbouring accumulations overlap in the x/y plane, and this is why clusters need to exchange data ("fringe data") for the edges of its region. Remember that each tensor is divided in x- and y-dimensions into an array of regions, one for each cluster.

A 3-dimensional CONV layer is similar to a pointwise, the difference being that it calculates scalar products of 3-dimensional data structures consisting of a number of z-vectors, within a small x/y range, instead of a single z-vector at an x/y point. These layers have one 3-dimensional kernel for each output feature map (i.e. for each z coordinate in the output). The convolutions overlap in x- and y-direction, just as with the depthwise convolution. The kernels can be pruned, just as with the pointwise convolution.

Figure 18:
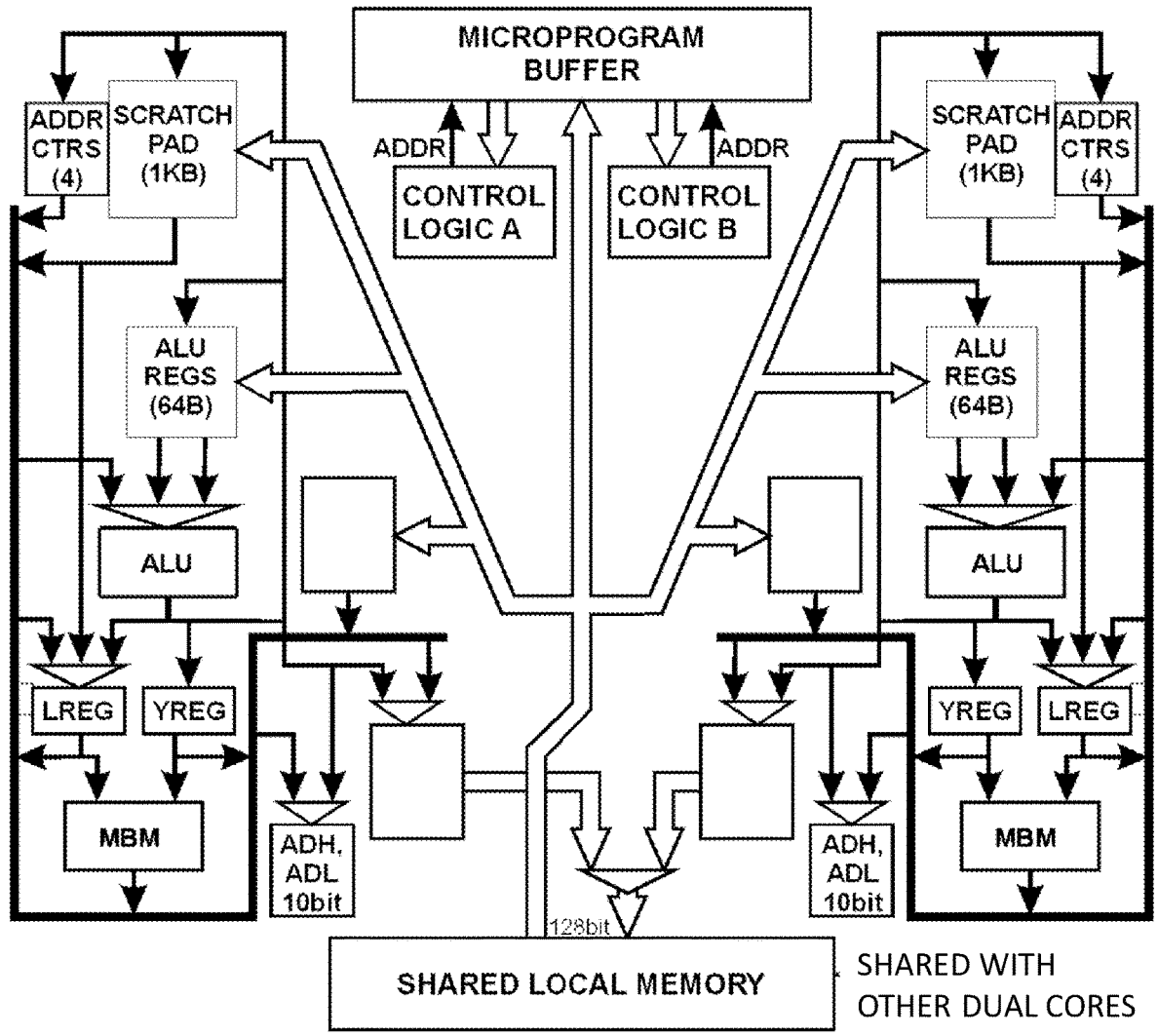
FIG. 18 is a block diagram illustrating an example of a PE pair.

FIG. 18 is a block diagram illustrating an example of a PE pair. By way of example, the PE may be a variant of the same dual-core design that is used in the GPP. Debug has been simplified and timers, I/O bus, peripheral interfaces, etc. have been removed, and the interfaces to primary memory and DMA buffer have been combined and redesigned as an interface to the shared cluster memory. Microprogram memory has been reduced to a small buffer, shared by a dual-core pair. Note, however, that the two cores are independent and not necessarily accessing the same words in the buffer.

The PEs have hardwired initial ID numbers, and they have command and status registers that communicate with the root. There is no direct connection, so such communication passes through the CC. It can use the Tag Network or, alternatively, it can use the CM, using the PE-CM interface and the NoC. In the latter case some simple handshaking is needed, and that can use the Tag Network.

For test of the PEs, the GPP can broadcast a self-test microprogram into the cluster memories, start the PEs, and read the results. It can also use this for debugging an individual PE (like using its debug port), change its ID number, turn it on/off, etc.

The cluster memories receive, via the NoC, microcode when needed. This code is special microcode optimized for the layer to be processed and is usually broadcast together with the parameters for that layer. Special microcode is much more efficient than using ordinary CPU instructions, since those must be fetched and decoded and must only utilize registers and scratchpad in a more restricted way that is in line with the Instruction Set Architecture (ISA). The PEs in the clusters are basically compatible with the GPP, and if needed, they may be capable of executing ISAL instructions and bytecode for Java and Python.

However, it is more useful for the PEs to utilize special code, or possibly selected parts of the microcode developed for the instruction set, e.g. just the execution code for certain arithmetic instructions when these are needed. For example, the ISAL instruction set contains 52 instructions for addition and 34 instructions for multiplication and corresponding numbers of instructions for subtraction, division, logical and shift operations for all standard data types. IEEE 754 float and double are included.

The accelerator will need operations also on data formats that usually have no optimized support by processors. These operations can be microcoded as needed and will then be just as efficient as standard operations. An example is multiplication of complex numbers that have real and imaginary components in Q15 format. This has been developed and verified (as part of FFT) and will execute in 50 nanoseconds with 1200 MHz microinstruction frequency. A variant with one operand in Q15 and the other uint16 has also been developed. Execution time can be further reduced by sacrificing conventional rounding. Much higher speed-up can be achieved by utilizing new features in the PE, which in some cases, e.g. vector operations, double the rate of operations to 2400 MHZ.

By way of example, the new Bfloat16 format will be supported with extra efficiency, though a hardware change limited to the MAC logic. It will execute, e.g. 1200 million MAC operations/second per PE. This should give the accelerator competitive performance also for training, which requires higher precision than is needed for inference.

Examples—Initialization, Debug, Etc

PE Microcode

By way of example, the CC may keep its PEs in reset until it has been properly initiated, which includes having the initial microcode for all PEs stored in CM, starting in address 0.

When a PE starts after a reset, e.g. due to system start, it outputs a CS_load request to CC. This must be done by logic not controlled by microcode, since its Control Store (CS) is not yet loaded. The CS_load request has a parameter specifying the number of words that should be loaded. The automatic request after reset specifies the maximum, i.e. the entire CS will be loaded. The microprogram counter is used for addressing CS while loading, and it will stop at zero when the first loading is completed.

When PE starts executing a new transformation (e.g. a CONV layer or part of a layer), it always starts reading microcode from address 0 in its CS.

The microcode will often use subroutines. These are stored at higher addresses in CS, the most generally useful ones at the highest addresses. When replacing a microprogram, write new code from address 0 as long as needed. When running, the new code utilizes already stored subroutines that have not been overwritten. The compiler needs to keep track of the CS contents throughout the process.

It will be appreciated that the methods, procedures and arrangements described herein can be implemented, combined and re-arranged in a variety of ways.

The steps, functions, procedures, modules and/or blocks described herein may be implemented in hardware using any conventional technology, such as discrete circuit or integrated circuit technology, including both general-purpose processor technology, customized microprocessor technology, and/or application-specific circuitry.

Alternatively, or as a complement, at least some of the steps, functions, procedures, modules and/or blocks described herein may be implemented in software such as a computer program in any computer code including also machine code and/or microcode for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

It is also possible to provide a solution based on a combination of hardware and software. The actual hardware-software partitioning can be decided by a system designer based on a number of factors including processing speed, cost of implementation and other requirements.

Figure 19:
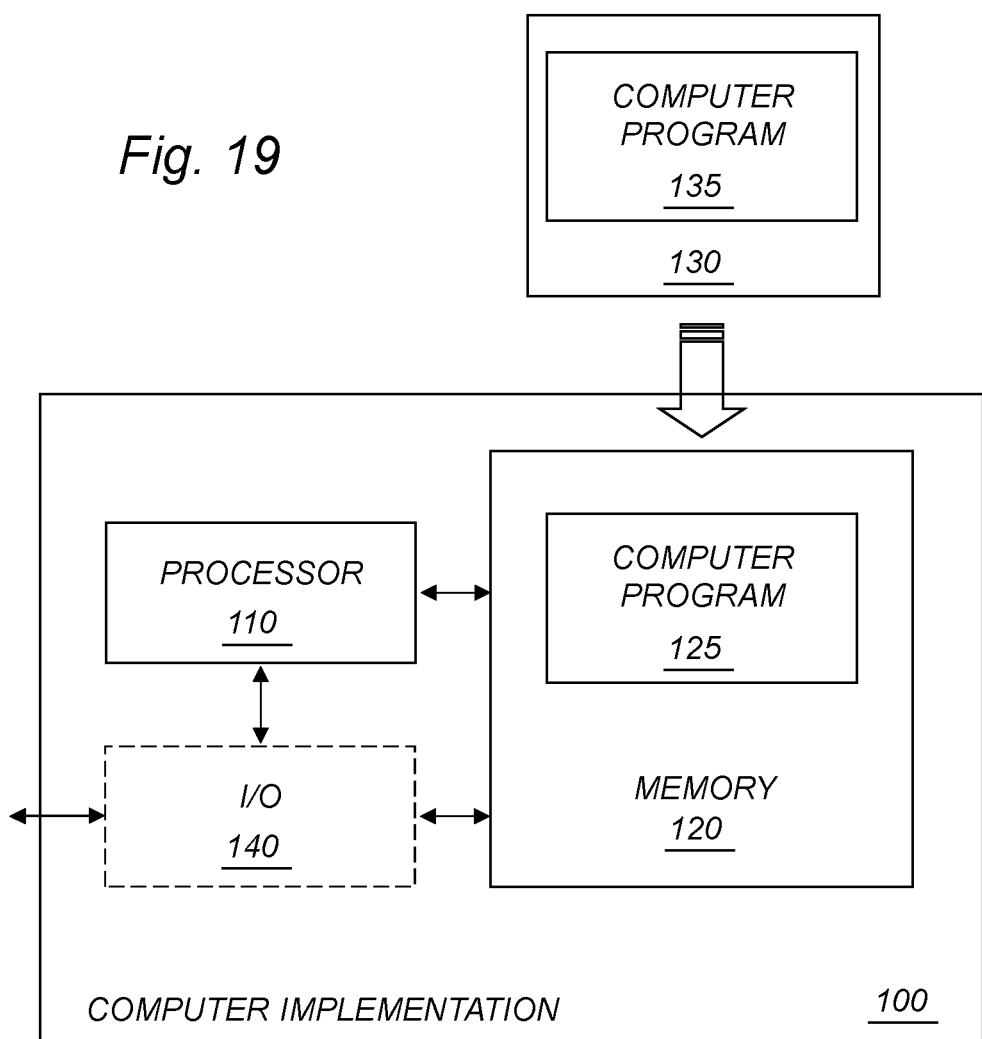
FIG. 19 is a schematic diagram illustrating an example of a computer-implementation according to an embodiment.

FIG. 19 is a schematic diagram illustrating an example of a computer-implementation according to an embodiment. In this particular example, at least some of the steps, functions, procedures, modules and/or blocks described herein are implemented in a computer program 125; 135, which is loaded into the memory 120 for execution by processing circuitry including one or more processors 110. The processor(s) 110 and memory 120 are interconnected to each other to enable normal software execution. An optional input/output device 140 may also be interconnected to the processor(s) 110 and/or the memory 120 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 110 is thus configured to perform, when executing the computer program 125, well-defined processing tasks such as those described herein.

The processing circuitry does not have to be dedicated to only execute the above-described steps, functions, procedure and/or blocks, but may also execute other tasks.

In a particular embodiment, the computer program 125; 135 comprises instructions, which when executed by the processor 110, cause the processor 110 or computer 100 to perform the tasks described herein.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a non-transitory computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The procedural flows presented herein may be regarded as a computer flows, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Alternatively, it is possible to realize the function modules predominantly by hardware modules, or alternatively by hardware, with suitable interconnections between relevant modules. Particular examples include one or more suitably configured processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

1. Efficient High-Speed On-Chip Global Interconnects, Linköping Studies in Science and Technology, Dissertation No. 992, Peter Caputa, Linköping University 2006.

APPENDIX A

Numerical Examples—Very High Throughput is Needed for the Inference Machine

The numbers here are not exact, nor limiting in any sense, but representative for an automotive application.

Problem 1: The inference task requires 40 billion multiplications and is repeated 25 times/second, i.e., we need to perform 1 000 000 000 000 multiplications per second. We have a multiplier design that can calculate c=a*b at a rate of 500 000 000 multiplications per second.

Solution: Use 1 000 000 000 000/500 000 000=2000 multipliers. This is now possible with modern CMOS fabrication technology.

Problem 2: Get 2 000 000 000 000 input operands (a and b) per second to the multipliers and deliver 1 000 000 000 000 products (c) per second. This is the challenge that requires innovation because the access patterns are complex and different for different dataflow models.

We need to look closer at these models, and we then find that it is virtually impossible to design a configurable system that can utilize all the multipliers all the time. We therefore need to create a system that has more multipliers, and for part of the time can use more than 2000 multipliers, to compensate for the time it will use less than 2000 multipliers. To limit the cost of the system we need to limit the number of physical multipliers, i.e., we need to keep the utilization high for the multipliers we have.

Examples—Hardware for the Inner Loop

All multiplications are part of an "inner product", a.k.a. "dot product", i.e. $\Sigma(a_i \cdot b_i)$, where $a_i$ and $b_i$ are elements of two data structures, e.g., vectors. They will sometimes be 2- or 3-dimensional data structures, but that does not matter for how we need to design the hardware.

Figure 20:
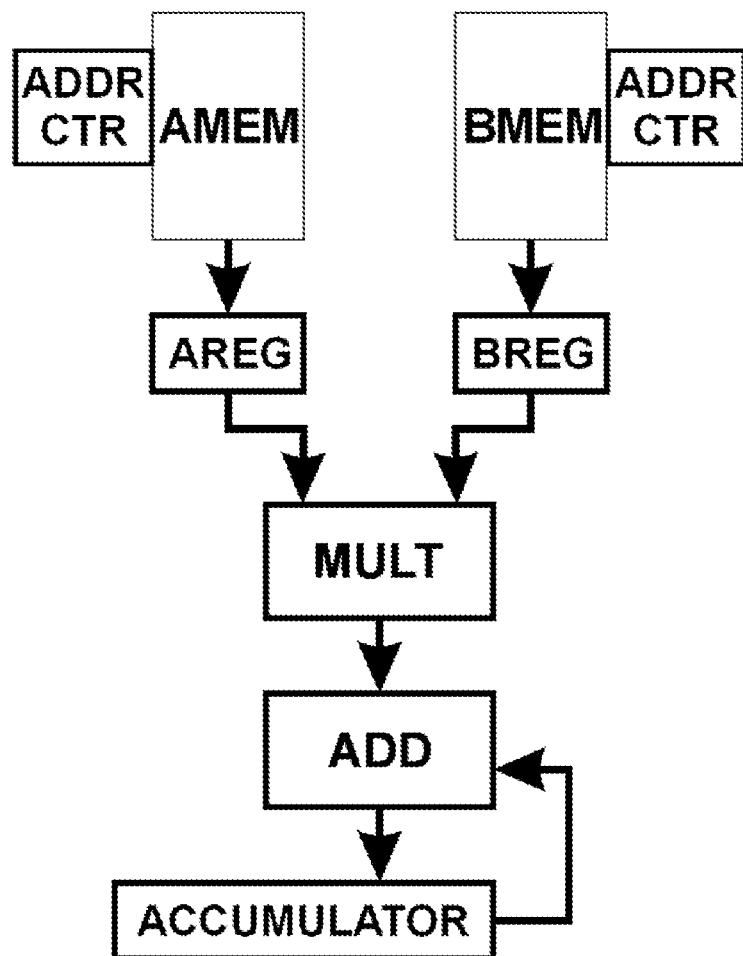
FIG. 20 is a schematic diagram illustrating an example of some of the MAC resources.

FIG. 20 is a schematic diagram illustrating an example of some of the MAC resources.

As an aspect solution or part solution, it is feasible to connect each multiplier output with an adder and accumulator register (longer than the a and b operands, to avoid overflow when the sum gets larger). We then reduce the need to move products to their destination; we only need to move the accumulated sums. Moving c is then no longer a matter for the inner loop.

It is still relevant to produce a new "a" operand and a new "b" operand for each multiplier in each cycle, otherwise that multiplier is idle in that cycle and this must be compensated for by having more than 2000 multipliers doing work at another point in time.

Operands a and b, which come from different sources, must be ready at the multiplier's inputs when it starts its multiplication. Thus, they have to be produced during the preceding cycle. The cycle is only 2 ns, meaning that each operand must come from a separate local memory instance. Registers between these and the multiplier inputs must hold the operands for the multiplication, while the memories produce the next set of operands.

In the following, an example of a possible way to allocate and arrange these resources will be described. The two memories are the scratchpad and the ALUREGS, and the MULT, ADD and ACCUMULATOR are contained in the MBM block of the envisioned processors.

The multiply-accumulate (MAC) block can operate with all standard number formats. With int8, uint8 or Q7 format it does one MAC operation in every machine cycle. Longer formats take more cycles. It will be possible to do a bfloat16 operation every two machine cycles. This increase is consistent with the doubling of the number of input bytes, i.e., doesn't require any change outside the MAC block.

Possible Improvements:

The memory instances AMEM and BMEM can be optimized for high frequency, and the MAC logic then redesigned to match that frequency, even if that requires additional pipeline steps (a simple way is to insert a register between the MULT and ADD blocks), and even if this high frequency cannot be used outside this little system. It will be shown here that such change can definitely be worthwhile.

In addition to optimizing the SRAM instances, we can make two accesses per microinstruction—this is not difficult; in fact, each microinstruction can already do two consecutive accesses in these memories, although this has not yet been used to deliver operands twice to the multiplier. The multiplier must of course be redesigned to be able to receive operands at shorter intervals, but that can be done with more pipeline steps (we don't need to bother about the latency here).

As an additional step in this direction, AMEM and BMEM can be modified such they each can deliver two consecutive bytes per read cycle, such that two MAC units can work in parallel. Their accumulators would then be added together after they have both completed their summation. This principle could of course be extended (albeit with diminishing return) with more MAC units.

Other Operations:

Sometimes layers are added, element-wise, and sometimes partial sums from the accumulator need to be accumulated. Operations are also needed for bias addition, quantization, and activation functions. These operations are much less frequent that the multiply-accumulate (MAC) operation. In addition to the arithmetic resources shown here, there is an ALU block in the core, and existing microcode can use this for a wide selection of operations.

Problem 3: Transfer data to the two input buffers shown as AMEM and BMEM in FIG. 20 and do the remaining processing of the result in the accumulator.

To get high utilization it may be desirable to load the input data buffers in a way that takes very little extra time compared to the time we use what we load. It can be shown that this requirement may indeed be fulfilled. Let's first look at the inner loop of the processing of the first layer in RefNet, a 3-dimensional convolution layer.

Figure 21C:
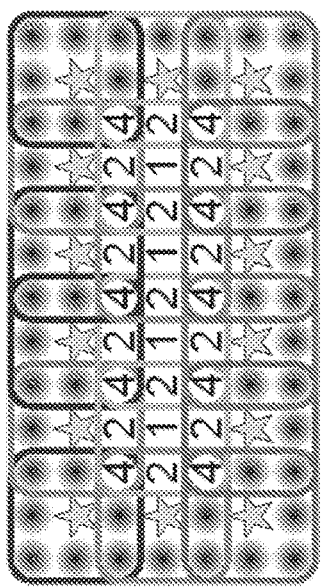
FIGS. 21A-C are schematic diagrams illustrating an example of two- and three-dimensional CONV: overlapping 3×3 ranges in the x/y plane.
Figure 21B:
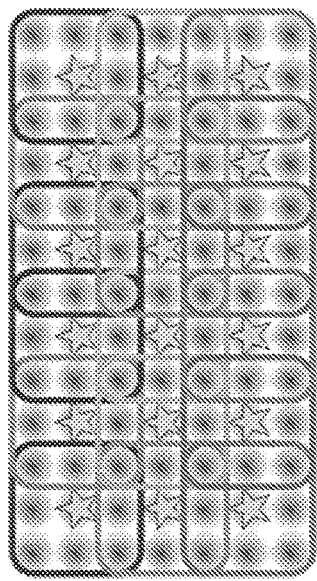
Figure 21A:
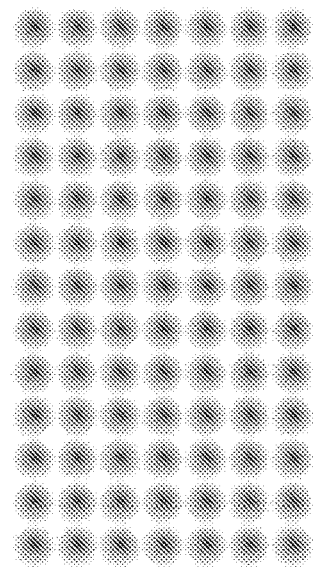

FIG. 21A.C are schematic diagrams illustrating an example of two- and three-dimensional CONV: Overlapping 3×3 ranges in the x/y plane.

FIG. 21A shows pixels in the input image. Each pixel normally consists of 3 elements (red, green, blue) in RGB coding, i.e. there are 3 channels in the input tensor.

FIG. 21B shows the same pixels, but with stars indicating the x/y positions of corresponding elements in the output. Each star represents 32 output elements, because there are 32 channels in the output tensor. The 3×3 pixel areas that surround each star and are marked by bolder contours are the ranges within which the output marked by the star gets its input values. As can be seen here, these ranges overlap each other, and most pixels are therefore part of not only one but instead either 2 or 4 areas.

FIG. 21C shows this more clearly. The dots and the stars have here, in the center, been replaced by numbers showing how many different product summations each pixel is part of. The average is $(4+2+2+1)/4=2.25$. However, such summations are done 32 times, with different kernels. Each input data element is therefore used on average $32*2.25=72$ times.

In an example design, we can load 2 bytes to the scratchpad in one machine cycle. (The source can there be local or external memory or the DMA buffer.) The time spent on loading a byte is thus 0.5 cycle, and the byte is then used in 72 cycles—the loading time is 0.7% of the time the byte is operated on. We can improve this further. The existing memory interface and DMA buffer may be replaced by the cluster memory interface.

The situation is, in fact better than described here, because in this layer (only), each input data element is not one, but two bytes (i.e. each pixel is $3*2=6$ bytes). The kernel elements are still one byte. A one-by-two-byte multiplication needs two cycles, so the loading time for data elements is 0.35% of the operating time.

However, we also need to look at the kernel elements, i.e. the stream of operands that go to the other multiplier input. The kernels consist of 3×3×3 elements, and these are all single bytes. There are 32 different kernels, one for each output channel.

We now need to decide which is which of the two input buffers.

By way of example, the capacity of the scratchpad may be 1024 bytes, while that of the ALUREGS may be only 32 bytes. It is possible to put data in scratchpad and kernel in ALUREGS. However, that leads to certain limitations for the subdivision of the image for maximum utilization. Some improvements of the core are considered, which will favor placing data in ALUREGS and kernels in scratchpad, for this specific layer we are discussing here.

One such improvement is doubling of the size of the scratchpad. Another improvement is to enable loading several (perhaps as many as 16) bytes in parallel into ALUREGS.

Either one of these improvements will make it preferable to place data in ALUREGS and kernels in scratchpad. As an example, we will here assume the size of ALUREGS is 64 bytes.

In a particular example, each pixel consists of 3 elements, which here (nowhere else) are 2 bytes each. One summation needs $3*3$ pixels=$3*3*2=54$ data bytes and $3*3*3=27$ kernel bytes. To calculate all output elements for one x/y position, we need the 54 data bytes for the 3*3 pixel region centered at that position, and we need (27 bytes)*(32 output channels)=864 kernel bytes. Thus, we should load these 54 data bytes in ALUREGS, and these 864 kernel bytes in scratchpad, and then calculate the 32 output elements based on this. The multiply-accumulate operations will need $27*2*32=1728$ machine cycles. Loading the $54+864=918$ bytes takes $918/2=459$ machine cycles. However, all kernel bytes can be reused. After calculating one output vector (the 32 output elements for this x/y location), we move to the location of the next. Let's move in the positive x-direction, i.e. from one star in the figure above to the next star to the right. We keep the 32 kernels, and we can also keep the rightmost column in the 3*3*3 data volume we used for the previous calculation, because that will now become the leftmost column in the new 3*3*3 data volume. Thus, we need only load 3 pixels, i.e. 18 bytes, before we can start the next summation. This can go on until we hit the rightmost edge of the image.

Thus, neglecting the bigger load in the beginning, we load 18 bytes and then operate for 1728 cycles. This is a utilization factor of 99%. It requires switching between three different microprogram loops, with different permutations of the indexing. We may consider that not being worthwhile, in which case we need to load 54 instead of 18 bytes once per output element. Utilization will then be 97%. Note that the initial load of the kernels cannot even reduce utilization by a tenth of a percent, since it is done only once for the entire image (3.4 million pixels).

Other Layers

We will examine all the other types of layers in this detailed way, to make sure that the hardware described here can reach very high utilization also for those. Until then, we assume this to be the case.

Layer Fusion

Some convolution layers produce tensors with many channels-we can allow them to reach such depth that we cannot stored them locally, and still avoid storing them remotely. The in-line arrangement of regions can often be utilized for "fusing" of the layers, thereby avoiding the need for expensive off-chip transfers. This is because the regions—even when having depth-wise subdivisions—can be processed through more than one layer without—or with very limited—exchange of data. The big output tensor of an "expansion" layer will then be processed together with a "compression" in a following bottleneck layer, one depth subdivision at a time. The big tensor will then never need to be stored in its entirety, and local storage in the CM will suffice.

Bottleneck Sequence

In the CNN model we are studying, a "bottleneck" sequence of three CONV layers is repeated many times—it is responsible for 24.9 billion (79.7%) of the 31.2 billion MAC operations needed for one inference execution.

We therefore begin our study by focusing on this important sequence. Our goal is to show how we can reach high utilization, while minimizing the need for intermediate storage outside the array of tiles and especially outside the IC.

Fusing the Bottleneck Sequence

The three convolutions (point-wise/depth-wise/point-wise) of the bottleneck sequence can be fused, meaning that they are executed together. We can then reduce the need for data transfer and storage; in fact, we can handle even bigger tensors than the two big ones in FIG. 22 without the need to transfer any part of them out from the array of PEs.

| Transformation # (Layer #) | Description | Input tensor (produced by preceding transformation) | | | Kernel | | |
|---|---|---|---|---|---|---|---|
| | | Width (x dimension) | Height (y dimension) | Depth (z dimension) | Dimensions | Width (x dimension) | Height (y dimension) |
| 19 | Pointwise, stride = 1 | 512 | 104 | 48 | 1 | 1 | 1 |
| 20 | Depthwise, stride = 1 | 512 | 104 | 288 | 2 | 3 | 3 |
| 21 | Pointwise, stride = 1 | 512 | 104 | 288 | 1 | 1 | 1 |

| Transformation # (Layer #) | Kernel | | | Output tensor (result from this transformation) | | |
|---|---|---|---|---|---|---|
| | Depth (z dimension) | Elements (if not pruned) (=inputs/ neuron) | Number of kernels used (one per output channel) | Width (x dimension) | Height (y dimension) | Depth (z dimension) |
| 19 | 48 | 48 | 288 | 512 | 104 | 288 |
| 20 | 1 | 9 | 288 | 512 | 104 | 288 |
| 21 | 288 | 288 | 48 | 512 | 104 | 48 |

Figure 22:
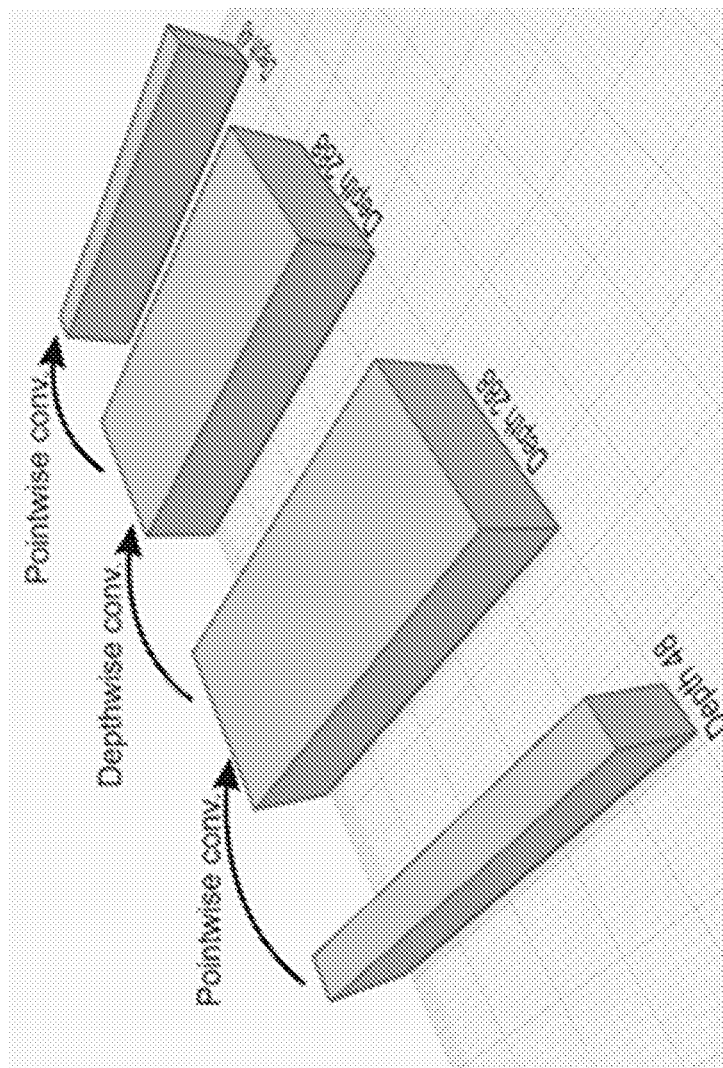
FIG. 22 is a schematic diagram illustrating an example of fusion of three layers.

FIG. 22 is a schematic diagram illustrating an example of fusion of three layers . . .

There are two things we need to think of: One is that we should distribute the work such that nearly 100% of our PEs contribute with useful work all the time. The other is that we should avoid unnecessary duplication of work.

The two point-wise convolutions dominate the sequence, with each 45.7% of the MAC operations. They both need 48*288=13824 bytes for kernels in their local memories. The kernels are broadcast from the root when they are needed. The inner loop of the first convolution performs 48 MAC operations 288 times. Corresponding loop in the last convolution performs 288 MAC operations 48 times.

An Example Processor

Figures 23A, 23B:
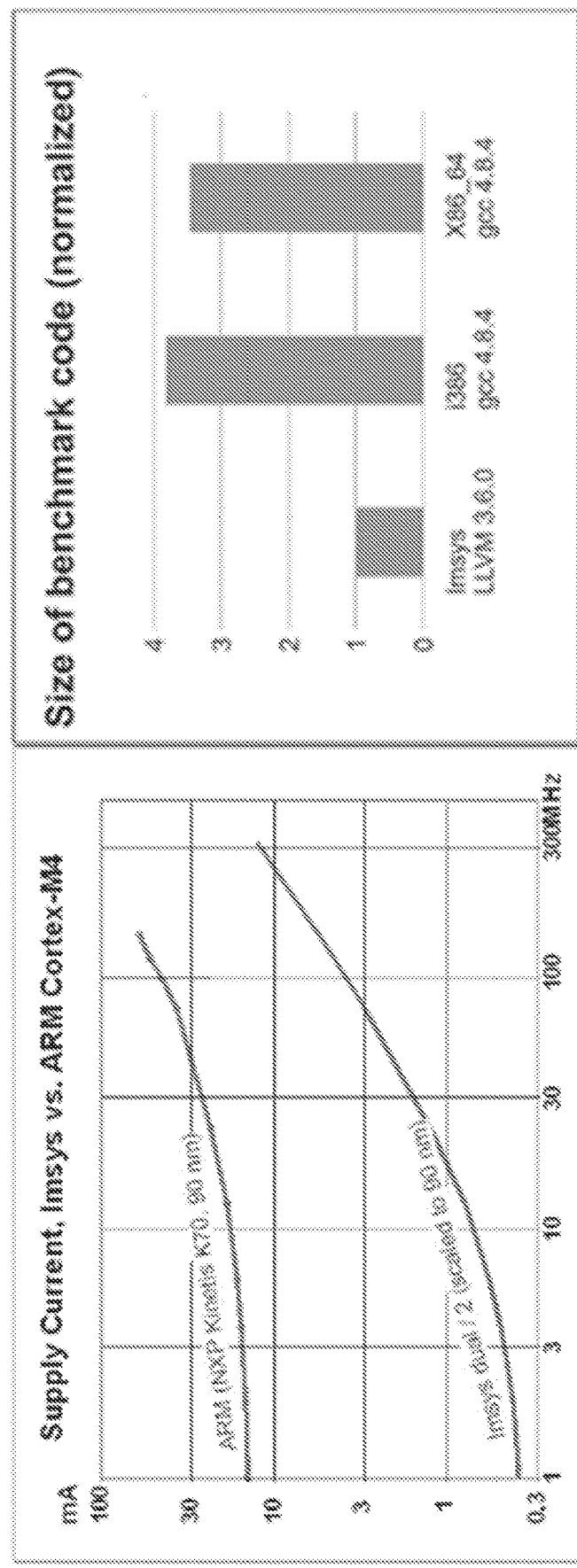
FIG. 23A-B are schematic diagrams illustrating a comparison of the efficiency of the core design with some well-known processors.

FIG. 23A-B are schematic diagrams illustrating a comparison of the efficiency of the core design with some well-known processors. The comparison relates to power consumption, processing speed, and code density.

FIG. 23A shows a comparison with respect to power consumption (compared to ARM Cortex-M4), and FIG. 23B shows a comparison with respect to code size (compared to Intel x86).

In the table below, the Java performance compared to ARM 920T is shown.

| JVM byte code group | Speed ratio Imsys/ARM |
|---|---|
| Array copy | 8.9 |
| Array access | 0.8 |
| Byte arithmetoc | 1.3 |
| Int arithmetic | 0.2 |

| JVM byte code group | Speed ratio Imsys/ARM |
|---|---|
| Float arithmetic | 3.0 |
| Double arithmetic | 1.9 |
| Others | 0.2 |
| GEOMETRIC MEAN, ALL | 1.1 |
| GEOMETRIC MEAN, float add/sub/mul/div | 3.0 |

Figure 24:
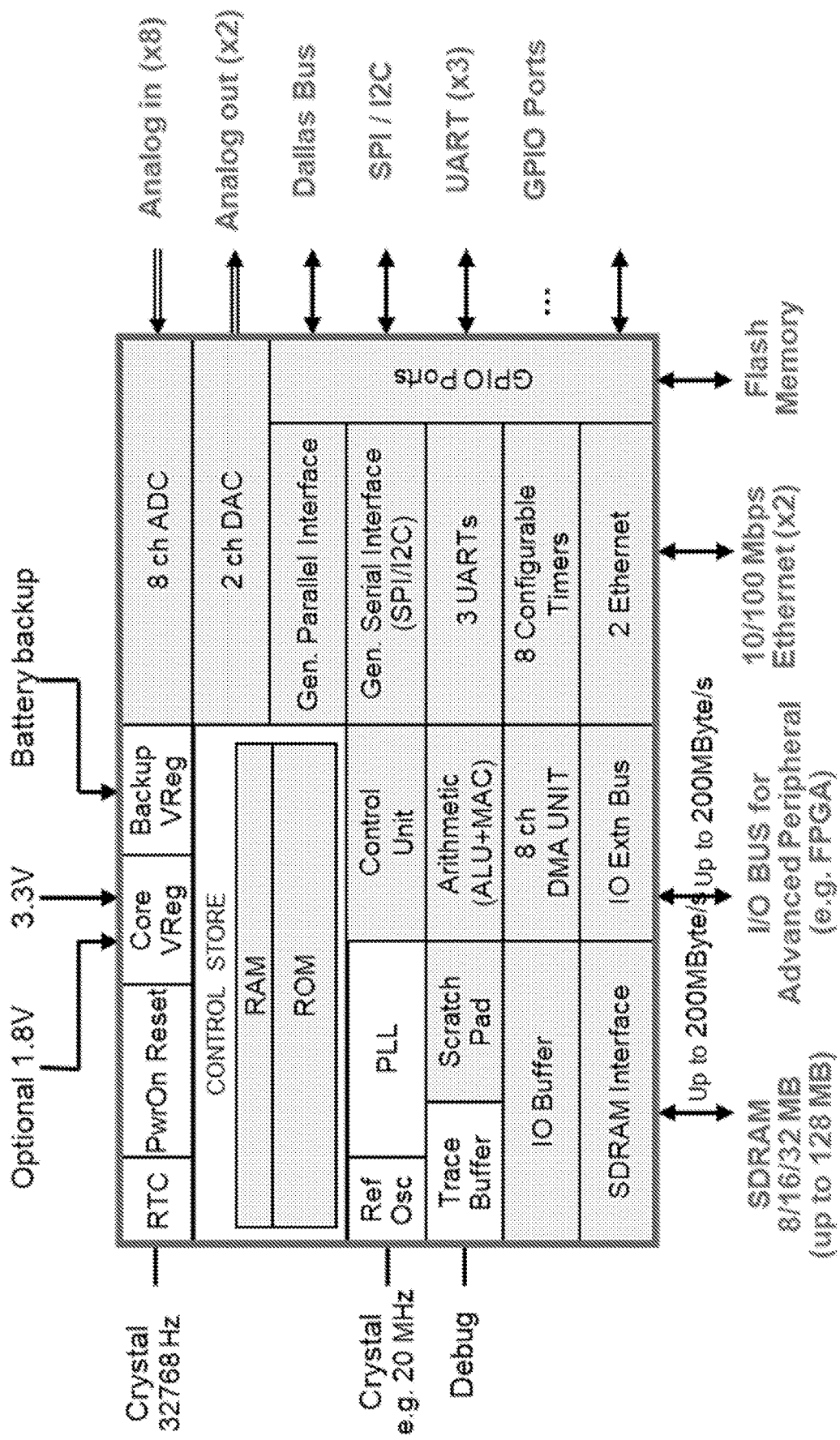
FIG. 24 is a schematic diagram illustrating an example of the IM3000 processor.

FIG. 24 is a schematic diagram illustrating an example of the IM3000 processor. By way of example, the GPP can be equipped with all resources that are available in the IM3000 (except for the analog parts, which cannot be migrated as they are).

Figure 25:
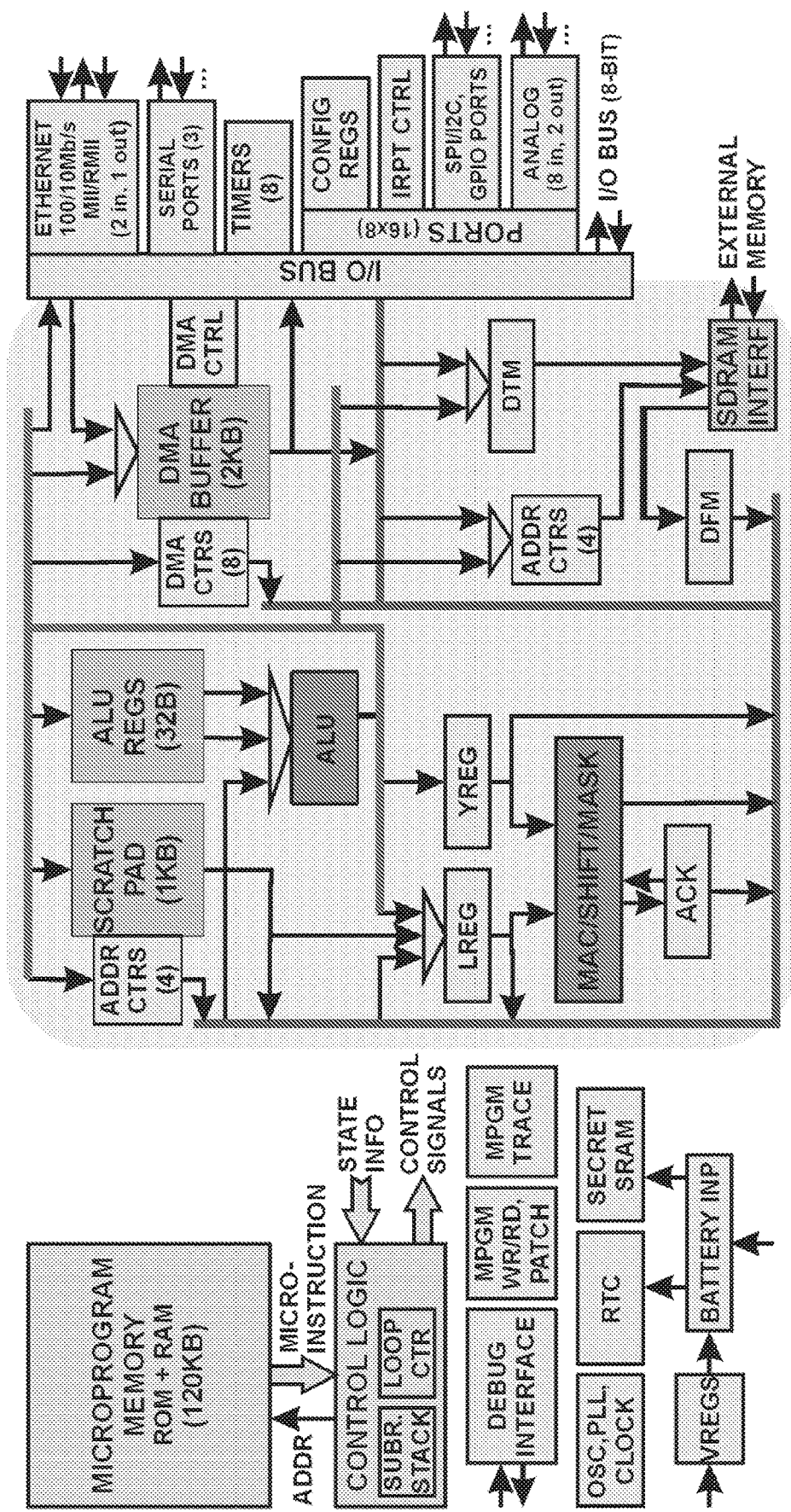
FIG. 25 is a schematic diagram illustrating an example of the internal organization of a dual-core processor system, focusing on the arithmetic part.

FIG. 25 is a schematic diagram illustrating an example of the internal organization of a dual-core processor system, focusing on the arithmetic part. The GPP may for example use a dual-core version of this design, which has been silicon verified in 65 nnm technology.

By way of example, software instructions may be fetched and executed by the Arithmetic unit under control by microinstructions in the Control unit, one per machine cycle. Each such microinstruction can control most resources independently of each other, saving cycles and thereby time and energy. A microinstruction can therefore perform, in one machine cycle, the equivalent of a sequence of instructions of a simpler CPU. A one-cycle example is to fetch two 8-bit numbers, step up/down their addresses, multiply the numbers, add the product to an accumulator, step the destination address, and decrement and test the loop count. Another example of flexibility and efficiency is floating-point arithmetic, with efficiency for different formats, where a short format leads to fewer cycles.

Figure 26:
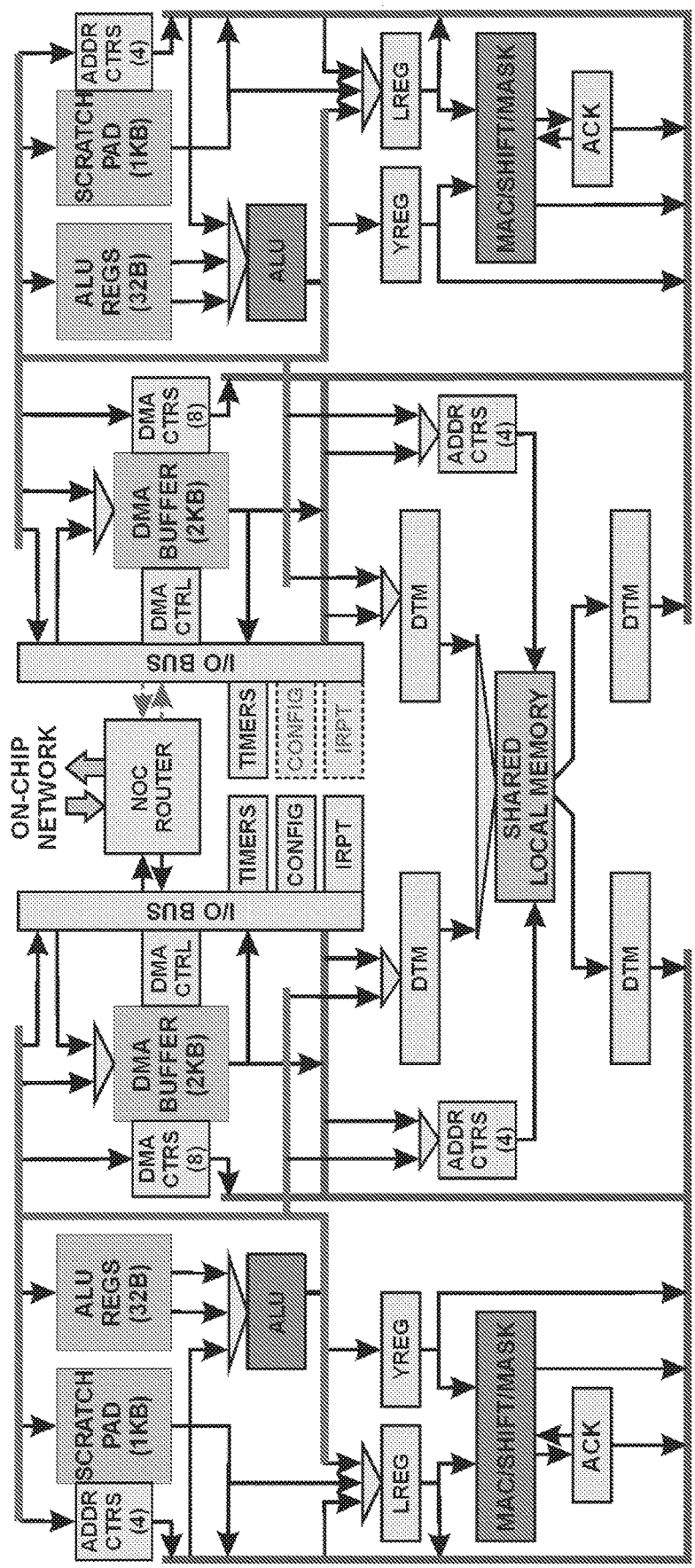
FIG. 26 is a schematic diagram illustrating an example of an overall dual-core system, excluding control units.

FIG. 26 is a schematic diagram illustrating an example of an overall dual-core system, excluding control units. In FIG. 26, the arithmetic part of this dual-core chip is shown. Each core also has a control unit like the one shown in the left-hand part of FIG. 25, except that the microprogram memory (called Control Store) is shared-one core uses even cycle, the other uses odd cycles.

Reference can be made to co-owned U.S. Pat. No. 8,060,727, which is incorporated herein by this reference.

This example processor has functions like high resolution graphics and image compression/decompression, which are important, e.g. in pathology imaging systems. These functions are also well suited for the many-core system of the present invention.

The processor core combines flexible microprogrammed control with a lean (narrow data width) arithmetic unit. This is very unusual, perhaps unique, among processors, and is a perfect fit for Processing Elements (PE) of a many-core accelerator for neural network and massive signal processing.

An important characteristic is the partly writable internal microcode, which can utilize the hardware resources also in combinations and sequences that have not been thought of before, to make many different operations in high frequency loops.

By way of example, a complete 64-point radix-4 FFT algorithm can be executed inside a single core—without accessing memory for instructions or temporary data. This, together with the compact size, is very useful not only for massive signal processing, e.g. in a radar data extractor, but also for a processing element (PE) in an AI accelerator.

Such an application has been studied and some results are described below.

Competitors have no proven cores with similar characteristics. They use simpler processing elements without the flexible control of the microprogramming tools.

Characteristics of the proposed technology include one or more of the following:
area efficiency (it flexibly utilizes lean hardware in different ways for all tasks, reducing the need for expensive specialized hardware blocks),
flexibility (its hardware is controlled by microcode with many degrees of freedom, offering efficiency unattainable by a standard instruction set),
energy efficiency (for the reasons above).
Example advantages for DNN may come from:
higher throughput-higher utilization of the MAC blocks and their associated memory blocks, due to flexibility of microprogrammed control,
lower cost—the lean arithmetic unit allows more cores per unit silicon area, and
higher energy efficiency through reduced need for data transfer activity, especially in off-chip transfers.
High MAC utilization may come from:
flexible partitioning of the workload for efficient distribution to all or almost all MAC units,
ability to do most of the necessary transfers during the unavoidable cycles that also utilize the MAC blocks.
Reduced data transfer activity may come from:
scratchpad to reduce activity for the feeding of each MAC unit,
local memory per cluster to reduce impact of overlapping sub-matrices,
flexible control to eliminate much of long-distance transfer through layer fusion.
These advantages are possible by one or more of the following:
flexible microprogrammed processor cores in the processing elements (PE),
scalable hierarchical tree Network-on-Chip (NoC), and
NoC to PE connection indirect through cluster memory (CM).

For the execution of general applications, it may be necessary to switch efficiently between different memory address ranges for, e.g., bytecode, interpreter, stack, and heap. Such random address switching can be difficult not only due to the internal DRAM row access delay but also for the narrow data path having to use several cycles for the wide DRAM addresses.

To speed up the most common jumps between different address ranges, it is possible to use a number of alternative registers for the higher part of the address, including the part which determines the DRAM row address.

Dataflow processing, like general computing, often needs to efficiently read data sequences from a few different address ranges. The above alternative address registers are useful for this, in the same way they are useful for switching back and forth between different row addresses in DRAM.

Common computers solve the problem of slow random addressing by having cache memory, which is not desirable to have in a compact processor (because these typically use more area than the processor core itself). Instead (without cache) it is important to use the scratchpad to compensate for lack of data cache, and extensive microcode to compensate for instruction cache. Scratchpad and microcode are both very useful for the accelerator PE, for which normal cache memory is definitely not an option.

The PE and CM

Figure 27:
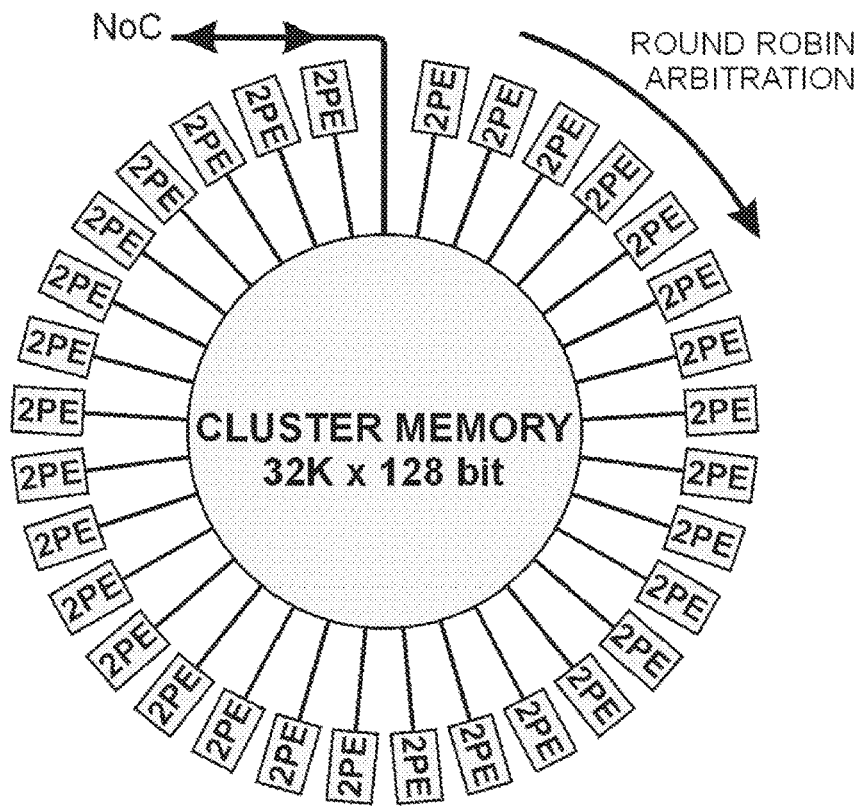
FIG. 27 is a schematic diagram illustrating an example of cluster memory-PE connection.

FIG. 27 is a schematic diagram illustrating an example of cluster memory-PE connection. In this example, the Cluster Memory (CM) is not a DRAM, but there are similar potential problems both with delay for first access of a sequence and with frequent address range switching, because the CM is shared and is wider than the processor datapath. By way of example, there may be 64 PEs sharing the CM, and if they need to access different addresses in the same SRAM instance, they cannot do it simultaneously. When a PE needs to access individual data (i.e. not accessing the same address as the others do), it faces both of the difficulties mentioned above for the IM3000—it must wait for its turn, each time it wants to access a byte in a new memory word.

Additional Notes on Hardware Development

We have seen that a small system defined by MAC and its input buffer memories works completely independently when it does the main part (almost all) of its work, which is also practically all arithmetic work that is performed in the accelerator. This is the typical task:
1. Load code, parameters, and data (if not already present; often only new data or new parameters are needed)
2. Then do the MAC work, which dominates execution time if utilization is high
3. Then execute activation function etc and deliver results.

This is normally repeated many times during the inference process, each time with many MAC operations. The full execution sequence-a total of many billions of operations in the thousands of PEs—is known and fixed beforehand; nothing is data dependent.

The data loaded into the PE input buffers may come from the cluster memory in the cluster the PE belongs to. The result produced by the PE is delivered to that same memory. The PE can, itself, control these transfers through its microcode, which is stored in ROM+RAM. The ROM code may include the control needed to load microcode in RAM from the cluster memory (the size of the code that is loaded is very much smaller than that of data and kernels).

In a particular example, each PE has a "mailbox register", MDR (Memory Data Register), like an extended version of the IM3000 DFM (Data From Memory), 16 bytes long, for receiving data from the cluster memory, and uses the same register also as DTM (Data To Memory) for the cluster memory to fetch output data.

By way of example, the MAC unit may have a simple interface, reminding of a piggy bank. When enabled it receives two bytes (an operand pair) per clock, that's almost all. After all operand pairs for a vector multiplication has been transferred to it, the input is disabled and the result is (after a few additional cycles) available at its output (the piggy bank can be emptied), until the input is enabled again.

The MAC unit may also be optimized at the physical level for best energy efficiency at a frequency that is matched with the maximum scratchpad frequency.

Examples—Requirements and Preliminary Description of the PE

All CONV layers essentially consist of multiplications of corresponding elements in two data structures, one containing actual data, usually the output from the preceding layer, and the other containing constants. We can call the two multiplication operands "data" and "kernel" elements, respectively.

Both structures are stored in the shared cluster memory CM, and parts of them have to be copied from there to local SRAM in the 64 PEs, since the multiplications in these, together, are to be done at a rate of perhaps 128 multiplications for each CM read cycle.

This high ratio is possible because every data element is to be multiplied by many kernel elements and every kernel element is to be multiplied by many data elements. Utilizing both of these facts can make the time for loading of both kinds of elements negligible in relation to the time for multiplying the elements.

The PE needs two fast local SRAMs, which can be addressed independently. Each of them should have sufficient size to enable good reuse of the contents of the other SRAM.

We use single-port SRAM (dual-port is twice as large), which means that we cannot write while the multiplier reads. The SRAMs could have been organized for wider write than read, to reduce the time the multiplier have to wait while SRAM is loaded. Making it possible to load more than two bytes in parallel in the normal case seems, however, not worthwhile, when considering the area and energy consumption of different SRAM configurations.

Two SRAMs, each having 512 words of 16 bits, seem to be an optimum choice. Since the elements of both data structures are almost always to be used in sequential address order, we can read 2+2 bytes in every other multiplication cycle and use them for two successive multiplications.

For loading, we could make it possible to load four bytes in one write cycle, two bytes to each SRAM. Note, however, that we can only load two bytes if we have data from only one data structure. The normal case is that we need to replace data in only one of the SRAMs-usually the one that contains kernels.

In the common cases discussed below, we prefer to replace kernels, since those are the same for all 64 PEs and therefore can be distributed by broadcast. There are other cases where it is appropriate to broadcast data and let the PEs work with different sets of kernels, and the hardware allows that too. The data and kernel parts of the scratchpad then switch roles.

The data we write in SRAM comes from MDR (Memory Data Register), which has been loaded from CC the Cluster Controller) due to an earlier request. MDR contains 16 bytes. It will therefore take 8 write cycles to transfer its contents to one of the SRAMs.

As previously described, the input data may have to be rearranged and/or transformed for enabling efficient computation/parallelization.

Figure 28:
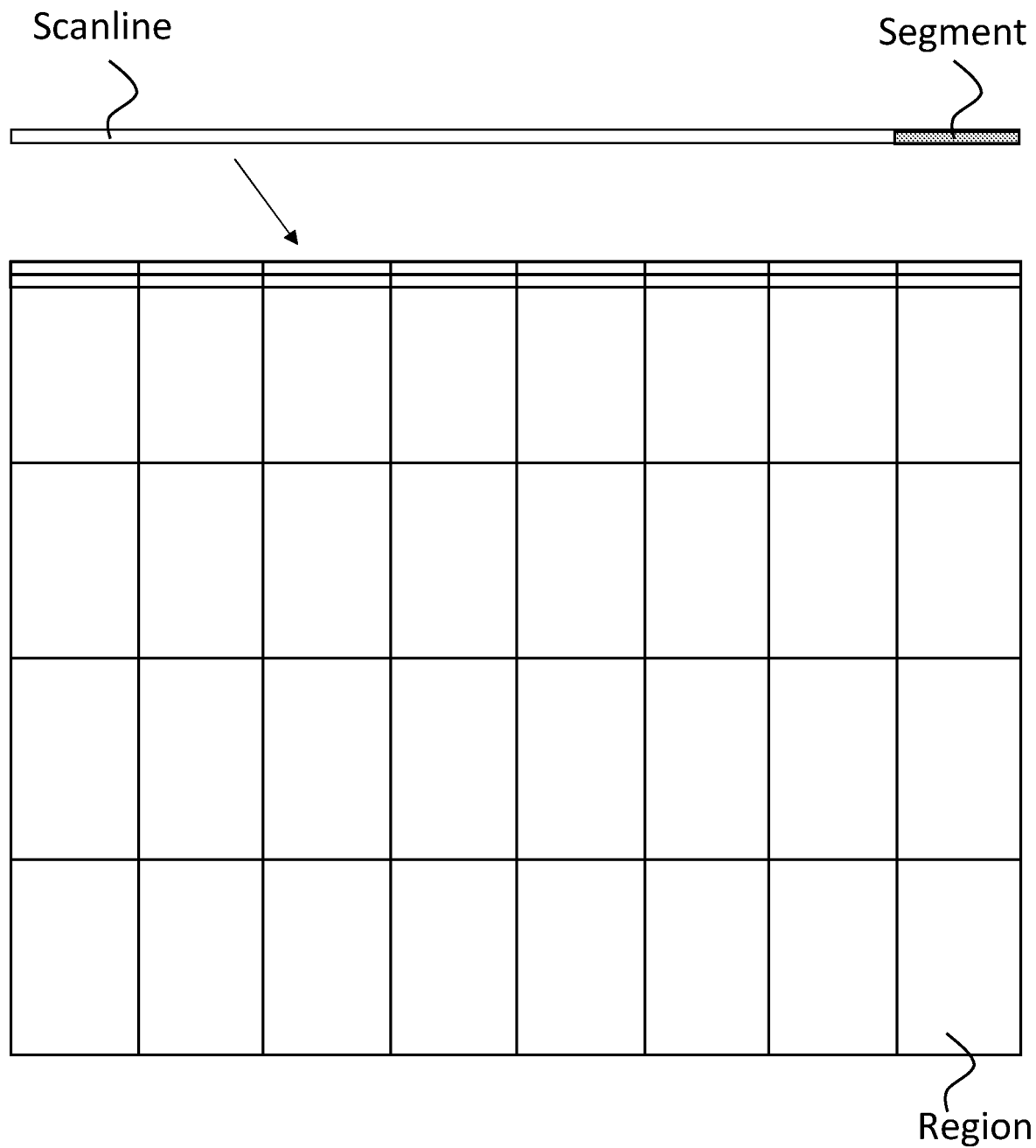
FIG. 28 is a schematic diagram illustrating an example of an overall input image divided into regions.

FIG. 28 is a schematic diagram illustrating an example of an overall input image divided into regions.

The proposed technology provides an image data rearrangement and/or transformation process adapted for multi-core parallelization.

Figure 29:
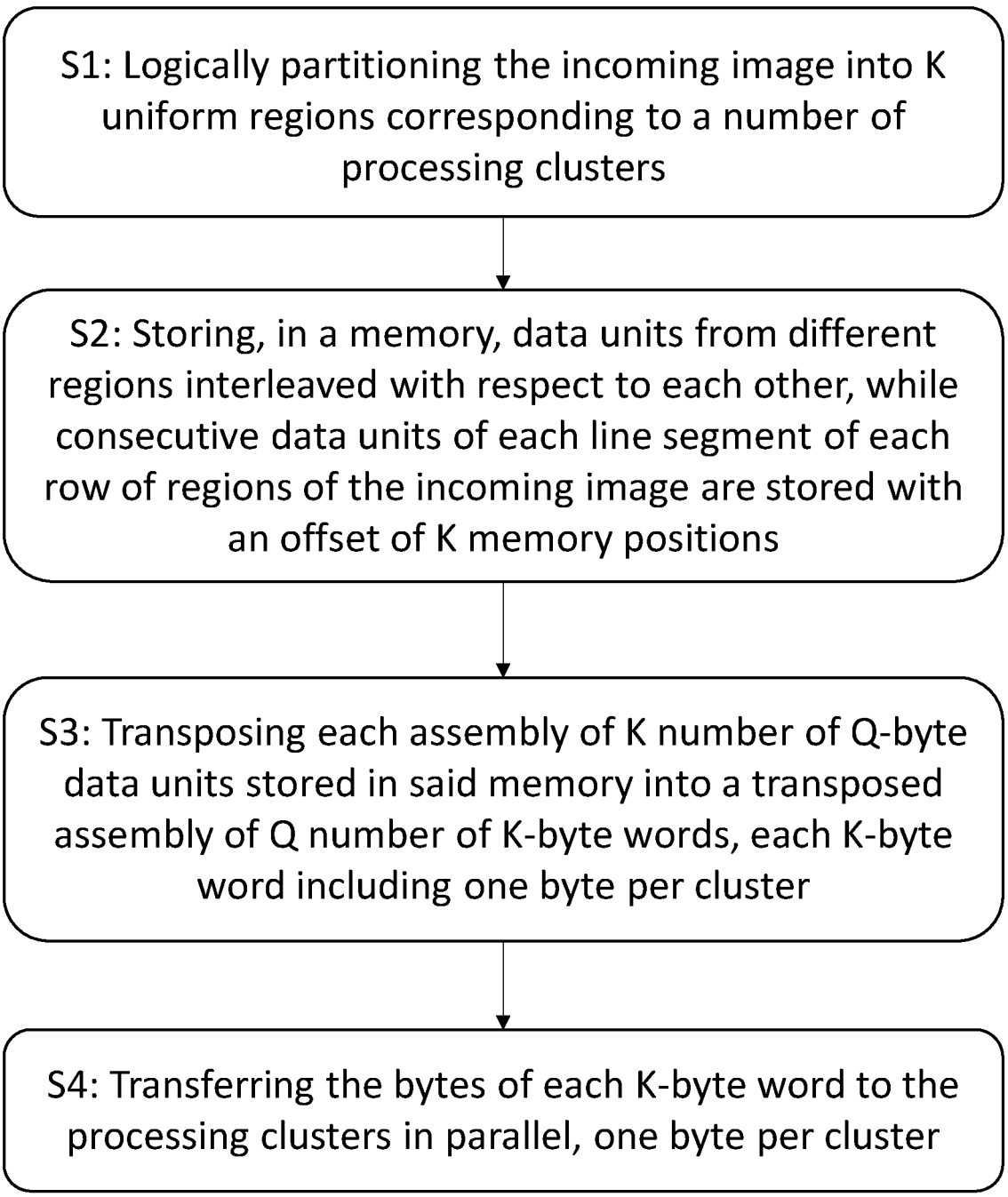
FIG. 29 is a schematic flow diagram of an example of a method for rearranging and distributing data of an incoming image for processing by a number of processing clusters.

In a particular example, with reference to the schematic flow diagram of FIG. 29, there is provided a computer-implemented method for rearranging and distributing data of an incoming image for processing by a number, K≥4, of processing clusters. The incoming image has a number of scanlines, each scanline being arrangeable as a plurality of data units.

An example of a basic procedure for an input image may be summarized briefly as follows:
Step S1: logically partitioning said incoming image into K uniform regions corresponding to the number of processing clusters, wherein said K regions are defined by a number, R≥2, of rows and a number, C≥2, of columns, by:
  dividing each scanline into a number, C≥2, of uniform line segments, the length of a line segment being equal to the width of a region;
  dividing each line segment into a number, W≥2, of data units, each having a number, Q≥2, of bytes, i.e. Q-byte data units; and
  defining a region height of a number, H≥2, of scanlines for each region;
Step S2: storing, in a memory having memory positions corresponding in size to said data units, data units from different regions interleaved with respect to each other, while consecutive data units of each line segment of each row of regions of the incoming image are stored with an offset of K memory positions such that the consecutive data units are stored K memory addresses apart;
Step S3: transposing each assembly of K number of Q-byte data units stored in said memory into a transposed assembly of Q number of K-byte words, each K-byte word including one byte per cluster;
Step S4: transferring the bytes of each K-byte word to said processing clusters in parallel, one byte per cluster.

FIG. 30 is a schematic block diagram illustrating an example of rearrangement and transposing of an incoming image into transposed output data for transfer to the clusters.

The overall system 200 involves a processor or equivalent control circuitry 210 for performing controlled transfer of data blocks/units into specific memory addresses of a memory 220. The overall system 200 further involves a transpose block 230 configured to perform the required transpose operation and forward the transposed data for subsequent transfer to the clusters.

Through one or more optional suitable interfaces the data units are stored in the memory 210 such as a DRAM according to a set of rules that are based on logically partitioning the incoming image into K uniform regions corresponding to the number of processing clusters. The K regions are defined by a number, R≥2, of rows and a number, C≥2, of columns.

As mentioned, each scanline is divided into a number, C≥2, of uniform line segments, the length of a line segment being equal to the width of a region, and each line segment is divided into a number, W≥2, of data units, each having a number, Q≥2, of bytes, i.e. Q-byte data units, and a region height of a number, H≥2, of scanlines is defined for each region.

The data units are stored in the memory 220 such that data units from different regions are interleaved with respect to each other, while consecutive data units of each line segment of each row of regions of the incoming image are stored with an offset of K memory positions such that the consecutive data units are stored K memory addresses apart.

The system is further configured to transpose each assembly of K number of Q-byte data units stored in the memory 220 into a transposed assembly of Q number of K-byte words, each K-byte word including one byte per cluster. For example, this may be performed by the transpose block 230.

The system is further configured to transfer the bytes of each K-byte word to the processing clusters in parallel, one byte per cluster.

In other words, the input image is logically partitioned into K uniform regions, one region per processing cluster (for processing by the respective processing cluster).

In a particular example, for efficient partitioning of a camera image (still or video), during each frame cycle (e.g. 50 ms), one frame of video data is transferred to memory (e.g. DRAM), and placed there according to certain rules (based on the logical partitioning of the image). Each group of e.g. 16 bytes is stored in an address that depends on its location in the region, but also on the horizontal and vertical position of the region.

The stored image is processed during the next frame cycle. For example, the processing starts with transfer from memory via the Transpose block. Each cluster will then receive its part of the complete image, in the correct order.

The invention claimed is:

1. A data processing system comprising:
  a control processor having access to memory; and
  a plurality of Processing Elements, PEs, organized in multiple processing clusters, each cluster comprising a multitude of said Processing Elements,
  wherein said multiple processing clusters are arranged in a Network on Chip, NoC, connected, via a switch block, to said control processor, which is provided as a central hub, i.e. a root, for the Network on Chip, and said multiple processing clusters of Processing Elements being arranged at peripheral nodes, also being referred to as cluster nodes, of the Network on Chip;
  wherein the Network on Chip is a network having multiple data channels connecting the switch block with said multiple processing clusters, with a point-to-point channel for each processing cluster,
  wherein said multiple processing clusters are logically organized as an array with specific locations for said processing clusters in said array, and wherein said switch block is configured for enabling exchange of data between processing clusters of neighboring locations in said array via said switch block.

2. The data processing system of claim 1, wherein said multiple processing clusters are logically organized to have specific locations in an array with rows and columns, and wherein said switch block is configured for enabling i) each cluster node to send to its nearest neighbor to the right and receive from its nearest neighbor to the left in the array of columns and rows, or vice versa, and/or ii) each cluster node to send to its nearest neighbor below and receive from its nearest neighbor above in the array of columns and rows, or vice versa.

3. The data processing system of claim 1, wherein said data processing system is configured for receiving and performing data processing of input data, and said multiple processing clusters are configured for operating on respective subsets or regions of said input data, one region per processing cluster, and
  wherein said data processing of said input data involves sharing specific data between neighboring regions, and said switch block is configured for enabling transfer of said specific data between the processing clusters-responsible for said neighboring regions.

4. The data processing system of claim 3, wherein said specific data includes a specific subset of the input data of one region to be shared with at least one neighboring region.

5. The data processing system of claim 3, wherein said specific data is overlapping edge data between regions needed for performing multi-dimensional convolutions.

6. The data processing system of claim 3, wherein said input data is an input image, which is logically partitioned into a plurality of uniform regions, one region per processing cluster for processing by the respective processing cluster.

7. The data processing system of claim 3, wherein said switch block is configured to operate based on at least a subset of the following data transfer settings:
first setting—normal setting;
second setting—move to next region in positive x direction if outbound, else opposite, or move to next region in negative x direction if outbound, else opposite; and
third setting—move to next region in negative y direction if outbound, else opposite, or move to next region in positive y direction if outbound, else opposite.

8. The data processing system of claim 7, wherein said processing clusters are configured to send data to said memory and/or an associated NoC register via said switch using the normal setting, and said switch block is configured to activate the second setting and/or third setting such that data is transferred back through the switch block to desired destinations.

9. The data processing system of claim 1, wherein the Network on Chip is a star network connecting the switch block with the processing clusters, with a point-to-point channel for each processing cluster.

10. The data processing system of claim 1, wherein said control processor is configured to control transfers of data between the root and the clusters of said Network on Chip.

11. The data processing system of claim 1, wherein said data processing system further includes a data bus interconnecting said control processor, said memory, said Network on Chip and/or one or more Input/Output (I/O) interfaces.

12. The data processing system of claim 1, wherein said switch block includes a multitude of switches and control logic for controlling the multitude of switches to support a set of different transfer modes over said data channels of the Network on Chip.

13. The data processing system of claim 1, wherein said data processing system includes an NoC register for temporarily holding data to be distributed to the processing clusters via said switch block, and for holding data from the processing clusters.

14. The data processing system of claim 13, wherein said NoC register is connected between i) said switch block and ii) a data bus for interconnection to said control processor, said memory, and/or one or more Input/Output (I/O) interfaces to enable data to be stored in the NoC register from any of said control processor, said memory, and/or one or more Input/Output (I/O) interfaces and to enable data to be transferred from the NoC register to any of said control processor, said memory, and/or one or more Input/Output (I/O) interfaces.

15. The data processing system of claim 1, wherein said Processing Elements are programmable processing elements, the functionality of each programmable Processing Element being defined by internal microcode in a microprogram memory associated with the Processing Element.

16. The data processing system of claim 1, wherein said switch block is configured for enabling a hypercube type of data exchange between processing clusters of neighboring locations in said array.

17. The data processing system of claim 16, wherein said switch block is configured to operate based on a number of data transfer settings such that a processing cluster is able to receive data from multiple neighbours in a multi-dimensional hypercube.

* * * * *